United States Patent
Janse van Rensburg et al.

(10) Patent No.: US 10,057,863 B2
(45) Date of Patent: Aug. 21, 2018

(54) APPARATUS, COMPUTER PROGRAM, AND METHOD FOR SETTING A POWER OF A CELL NODE BASED ON CELL NODE GRADIENT INFORMATION

(71) Applicant: Futurewei Technologies, Inc., Plano, TX (US)

(72) Inventors: Cornelius Dawid Janse van Rensburg, Wylie, TX (US); Shu-Shaw Wang, Arlington, TX (US); Azeem Ahmad, Allen, TX (US); Chin Chiu, Allen, TX (US); Igor Syromyatnikov, Murphy, TX (US); Hanli Wang, Andover, MA (US); Suman Das, Colonia, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/289,045

(22) Filed: Oct. 7, 2016

(65) Prior Publication Data

US 2018/0103442 A1    Apr. 12, 2018

(51) Int. Cl.
*H04B 7/00* (2006.01)
*H04W 52/42* (2009.01)
(Continued)

(52) U.S. Cl.
CPC ......... *H04W 52/42* (2013.01); *H04W 52/143* (2013.01); *H04W 52/241* (2013.01)

(58) Field of Classification Search
CPC ............ A61K 2039/505; C07K 16/243; C07K 2317/34; C07K 2317/73
(Continued)

(56) References Cited

U.S. PATENT DOCUMENTS

| 8,964,868 B2 * | 2/2015 | Shin ...................... H04W 52/42 370/311 |
| 9,036,608 B2 * | 5/2015 | Chen .................... H04B 7/0689 370/310.2 |

(Continued)

FOREIGN PATENT DOCUMENTS

| CN | 103391608 A | 11/2013 |
| CN | 103974402 A | 8/2014 |

OTHER PUBLICATIONS

Stolyar, A. L. et al., "Self-Organizing Dynamic Fractional Frequency Reuse Through Distributed Inter-cell Coordination: The Case of Best-Effort Traffic," May 29, 2008, pp. 1-27, retrieved from http://ect.bell-labs.com/who/stolyar/publications/be_dffr.pdf.

(Continued)

*Primary Examiner* — Tan H Trinh
(74) *Attorney, Agent, or Firm* — Futurewei Technologies, Inc.

(57) ABSTRACT

An apparatus, computer program, and method are provided for setting a power of a cell node based on cell node gradient information. Cell node gradient information is generated based on a multiple-codeword channel quality indicator (CQI), utilizing a multiple-input-multiple-output (MIMO)-capable cell node in a network configured for communicating with a plurality of MIMO-capable user equipment. Additionally, other cell node gradient information is received that is generated for a plurality of other MIMO-capable cell nodes. The generated cell node gradient information and the other cell node gradient information are processed. Further, a power of the MIMO-capable cell node is set, based on the processing.

31 Claims, 30 Drawing Sheets

(51) Int. Cl.
  *H04W 52/24* (2009.01)
  *H04W 52/14* (2009.01)
(58) Field of Classification Search
  USPC .......... 455/452.2, 522, 69, 67.13, 63.1, 500,
          455/501; 370/252, 267, 260, 311, 312,
          370/329, 345, 330, 315; 375/260, 267
  See application file for complete search history.

(56) References Cited

U.S. PATENT DOCUMENTS

| | | | | |
|---|---|---|---|---|
| 9,661,579 B1* | 5/2017 | Zhang | ................... | H04W 52/04 |
| 9,749,893 B2* | 8/2017 | Zhou | ................... | H04W 24/10 |
| 9,800,284 B2* | 10/2017 | Papadopoulos | .......... | H04B 1/40 |
| 2002/0016179 A1* | 2/2002 | Baker | ................... | H04W 52/50 |
| | | | | 455/522 |
| 2007/0109955 A1* | 5/2007 | Moorti | ................. | H03G 3/3042 |
| | | | | 370/206 |
| 2008/0212714 A1* | 9/2008 | Varanasi | .............. | H04B 7/0632 |
| | | | | 375/299 |
| 2009/0280856 A1 | 11/2009 | Ohwatari et al. | | |
| 2010/0322227 A1* | 12/2010 | Luo | ........................ | H04B 7/024 |
| | | | | 370/345 |
| 2012/0178494 A1* | 7/2012 | Haim | ................... | H04W 52/365 |
| | | | | 455/522 |
| 2012/0189077 A1* | 7/2012 | Seo | ........................ | H04B 7/024 |
| | | | | 375/267 |
| 2012/0202431 A1* | 8/2012 | Hawryluck | ........... | H04B 7/024 |
| | | | | 455/63.4 |
| 2012/0221871 A1* | 8/2012 | Suryanarayanan | ... | G06F 1/3243 |
| | | | | 713/320 |
| 2013/0114434 A1* | 5/2013 | Muruganathan | ...... | H04W 16/14 |
| | | | | 370/252 |
| 2013/0195161 A1* | 8/2013 | Hammarwall | ......... | H04B 7/063 |
| | | | | 375/224 |
| 2013/0208587 A1* | 8/2013 | Bala | ..................... | H04W 16/14 |
| | | | | 370/230 |
| 2014/0024388 A1* | 1/2014 | Earnshaw | ............... | H04L 5/0073 |
| | | | | 455/452.2 |
| 2014/0056282 A1* | 2/2014 | Sun | ..................... | H04W 52/143 |
| | | | | 370/330 |
| 2014/0161048 A1* | 6/2014 | Attar | ................... | H04W 52/243 |
| | | | | 370/329 |
| 2014/0286219 A1* | 9/2014 | Siomina | ............... | H04J 11/0023 |
| | | | | 370/311 |
| 2015/0139000 A1* | 5/2015 | Matin | ................... | H04W 24/10 |
| | | | | 370/252 |
| 2015/0141027 A1* | 5/2015 | Tsui | .................... | H04W 52/243 |
| | | | | 455/452.1 |
| 2015/0201326 A1* | 7/2015 | Kazmi | .................. | H04W 28/18 |
| | | | | 370/329 |
| 2015/0289141 A1* | 10/2015 | Ghasemzadeh | ........ | H04W 16/14 |
| | | | | 370/330 |
| 2015/0319718 A1* | 11/2015 | Yang | ..................... | H04W 28/18 |
| | | | | 370/252 |
| 2015/0326287 A1* | 11/2015 | Kazmi | ............. | H04W 52/0216 |
| | | | | 375/267 |
| 2015/0341091 A1* | 11/2015 | Park | ...................... | H04B 7/0456 |
| | | | | 375/267 |
| 2015/0358102 A1* | 12/2015 | Ko | ....................... | H04J 11/0053 |
| | | | | 370/252 |
| 2016/0006549 A1* | 1/2016 | Kim | ...................... | H04L 1/0026 |
| | | | | 370/252 |
| 2016/0087694 A1* | 3/2016 | Vilaipornsawai | ...... | H04B 7/024 |
| | | | | 370/329 |
| 2016/0087708 A1* | 3/2016 | Kang | .................... | H04B 7/0619 |
| | | | | 370/312 |
| 2016/0100383 A1* | 4/2016 | Simonsson | ........... | H04L 5/0046 |
| | | | | 455/450 |
| 2016/0165548 A1* | 6/2016 | Mohlmann | ........ | H04B 7/15535 |
| | | | | 455/522 |
| 2016/0219457 A1* | 7/2016 | Nammi | ................ | H04B 1/1036 |
| 2016/0226709 A1* | 8/2016 | Chen | .................... | G01R 29/105 |
| 2016/0242128 A1* | 8/2016 | Loehr | ................. | H04W 52/365 |
| 2016/0277082 A1 | 9/2016 | Janse Van Rensburg et al. | | |
| 2016/0277091 A1* | 9/2016 | Kim | ....................... | H04B 7/065 |
| 2016/0278078 A1* | 9/2016 | Cheng | ............. | H04W 72/0446 |
| 2016/0286579 A1* | 9/2016 | Park | ..................... | H04L 5/0048 |
| 2016/0323887 A1* | 11/2016 | Patel | .................. | H04W 52/365 |
| 2016/0359647 A1* | 12/2016 | Chen | ................... | H04B 7/0413 |
| 2016/0373990 A1* | 12/2016 | Lim | ...................... | H04W 48/16 |
| 2017/0013564 A1* | 1/2017 | Yi | ........................ | H04W 52/146 |
| 2017/0034841 A1* | 2/2017 | Bethanabhotla | .. | H04W 72/1205 |
| 2017/0094544 A1* | 3/2017 | Zhou | .................... | H04W 52/40 |

OTHER PUBLICATIONS

Van Rensburg, C. et al., "Interference Coordination through Network-Synchronized Cyclic Beamforming," IEEE, 2009, pp. 1-5.

Rengarajan, B. et al., "A Semi-autonomous Algorithm for Self-organizing Dynamic Fractional Frequency Reuse on the Uplink of OFDMA Systems,"Dell Labs, Dec. 14, 2009, pp. 1-22.

Renesas Mobile Europe Ltd.,"Interference aware receiver modeling at system level," 3GPP TSG-RAN WG1 Meeting #65 R1-111582, May 9-13, 2011, pp. 1-6.

* cited by examiner

APPARATUS, COMPUTER PROGRAM, AND METHOD FOR SETTING A POWER OF A CELL NODE BASED ON CELL NODE GRADIENT INFORMATION

FIELD OF THE INVENTION

The present invention relates to communication networks, and more particularly to optimizing communication networks.

BACKGROUND

In today's cellular systems, downlink performance is becoming increasingly important with the emergence of downlink-bandwidth intensive applications. For example, efforts are being deployed to provide good user throughput in most of a coverage area. One challenge in those efforts involves setting a power of data communications in a way that allows optimal network utilization. For example, if one particular node communicates with a power that exceeds its needs and does more harm than good (with respect to network usage by an adjacent node), network utilization is not optimized.

SUMMARY

An apparatus, computer program, and method are provided for setting a power of a cell node based on cell node gradient information. Cell node gradient information is generated based on a multiple-codeword channel quality indicator (CQI), utilizing a multiple-input-multiple-output (MIMO)-capable cell node in a network configured for communicating with a plurality of MIMO-capable user equipment. Additionally, other cell node gradient information is received that is generated for a plurality of other MIMO-capable cell nodes. The generated cell node gradient information and the other cell node gradient information are processed. Further, a power of the MIMO-capable cell node is set, based on the processing.

In a first embodiment, the generated cell node gradient information may be generated utilizing fading information including at least one of a wideband channel indicator (CQI) or per MIMO layer information.

In a second embodiment (which may or may not be combined with the first embodiment), the generated cell node gradient information may be adjusted. For example, the generated cell node gradient information may be adjusted if the generated cell node gradient information exceeds a predetermined threshold (e.g. negative predetermined threshold, etc.). As yet another example, the generated cell node gradient information may be adjusted utilizing a factor (e.g. a power utilization factor, a factor that distinguishes a higher power cell node from a lower power cell node, a fairness factor, or an activity factor, etc.).

In a third embodiment (which may or may not be combined with the first and/or second embodiments), the other cell node gradient information may be received, utilizing a backhaul communication between the cell node and the other cell nodes.

In a fourth embodiment (which may or may not be combined with the first, second, and/or third embodiments), the other cell node gradient information may be received via a centralized system that received the other cell node gradient information from the other cell nodes.

In a fifth embodiment (which may or may not be combined with the first, second, third, and/or fourth embodiments), a rate at which the power of the cell node is set may be accelerated. For example, a busyness of the cell node may be identified, such that the rate at which the power of the cell node is set may be accelerated based on the busyness of the cell node.

In a sixth embodiment (which may or may not be combined with the first, second, third, fourth, and/or fifth embodiments), the network may include a long term evolution (LTE) network, an LTE-Advanced network, and/or an advanced permutation of an LTE network.

In a seventh embodiment (which may or may not be combined with the first, second, third, fourth, fifth, and/or sixth embodiments), the network may operate utilizing a frequency division duplex (FDD) protocol.

In an eighth embodiment (which may or may not be combined with the first, second, third, fourth, fifth, sixth, and/or seventh embodiments), at least one of the processing or the setting may be conditionally performed based on a presence of bursty traffic. For instance, the MIMO-capable cell node may operate to freeze at least one state (e.g. a power setting, etc.) based on the presence of the bursty traffic.

In a ninth embodiment (which may or may not be combined with the first, second, third, fourth, fifth, sixth, seventh, and/or eighth embodiments), the MIMO-capable cell node may be further configured to generate the cell node gradient information independent of data packets based on a size thereof. Further, the MIMO-capable cell node may be further configured to reset a cell node power if at least one of a load or utilization drops below a threshold. Still yet, the MIMO-capable cell node may be further configured to inform at least one of the plurality of MIMO-capable user equipment of a new power level when one or more criteria is met. As an option, the one of the one or more criteria may involve a buffer of the at least one MIMO-capable user equipment not being empty, a modulation and coding scheme (MCS) level being above a threshold, and/or the new power level being different than an old power level.

In a tenth embodiment (which may or may not be combined with the first, second, third, fourth, fifth, sixth, seventh, eighth, and/or ninth embodiments), the MIMO-capable cell node may be further configured to perform a combine operation in connection with the multiple-codeword CQI.

To this end, in some optional embodiments, one or more of the foregoing features of the aforementioned apparatus, computer program and/or method may enable improved (and possibly maximized) network utilization in MIMO-capable networks such as LTE, LTE-Advanced, and/or any advancement/permutation thereof. It should be noted that the aforementioned potential advantages are set forth for illustrative purposes only and should not be construed as limiting in any manner.

BRIEF DESCRIPTION OF THE DRAWINGS

FIG. 1C-1 illustrates a first technique for generating the cell node gradient information based on the multiple-codeword channel quality indicator (CQI), in accordance with one embodiment.

FIG. 1C-2 illustrates a second technique for generating the cell node gradient information based on the multiple-codeword CQI, in accordance with another embodiment.

FIG. 1D-1 illustrates a method for generating gradient information based on additional inputs (e.g. wideband CQI, power per layer, etc.), in accordance with one embodiment.

FIG. 2 illustrates an independent power switching method (IPS) information exchange, in accordance with one embodiment.

DETAILED DESCRIPTION

Various embodiments described herein are directed to improving network utility. Such network utility refers to an effectiveness of multiple cell nodes (e.g. base stations) of a network in communicating data (in the form of bits) with various user equipment (UE). Further, such network utility may be improved, and possibly maximized/optimized, by setting a power with which the aforementioned cell nodes are communicating data. In use, such power settings may have both positive and negative effects on overall network utility. For example, if a power is set to be higher for a first cell node, an effectiveness of such first cell node to communicate first data to a first UE may be improved, however, an effectiveness of an adjacent second cell node to communicate second data to a second UE may be degraded (due to interference, etc.). Thus, the abovementioned power settings of the cell nodes are coordinated to increase positive effects and reduce negative effects, so that overall network utility is improved and possibly even optimized. In use, such network utility optimization (through such power settings) may be accomplished by sharing gradient information, as will become apparent.

Figure 1A:
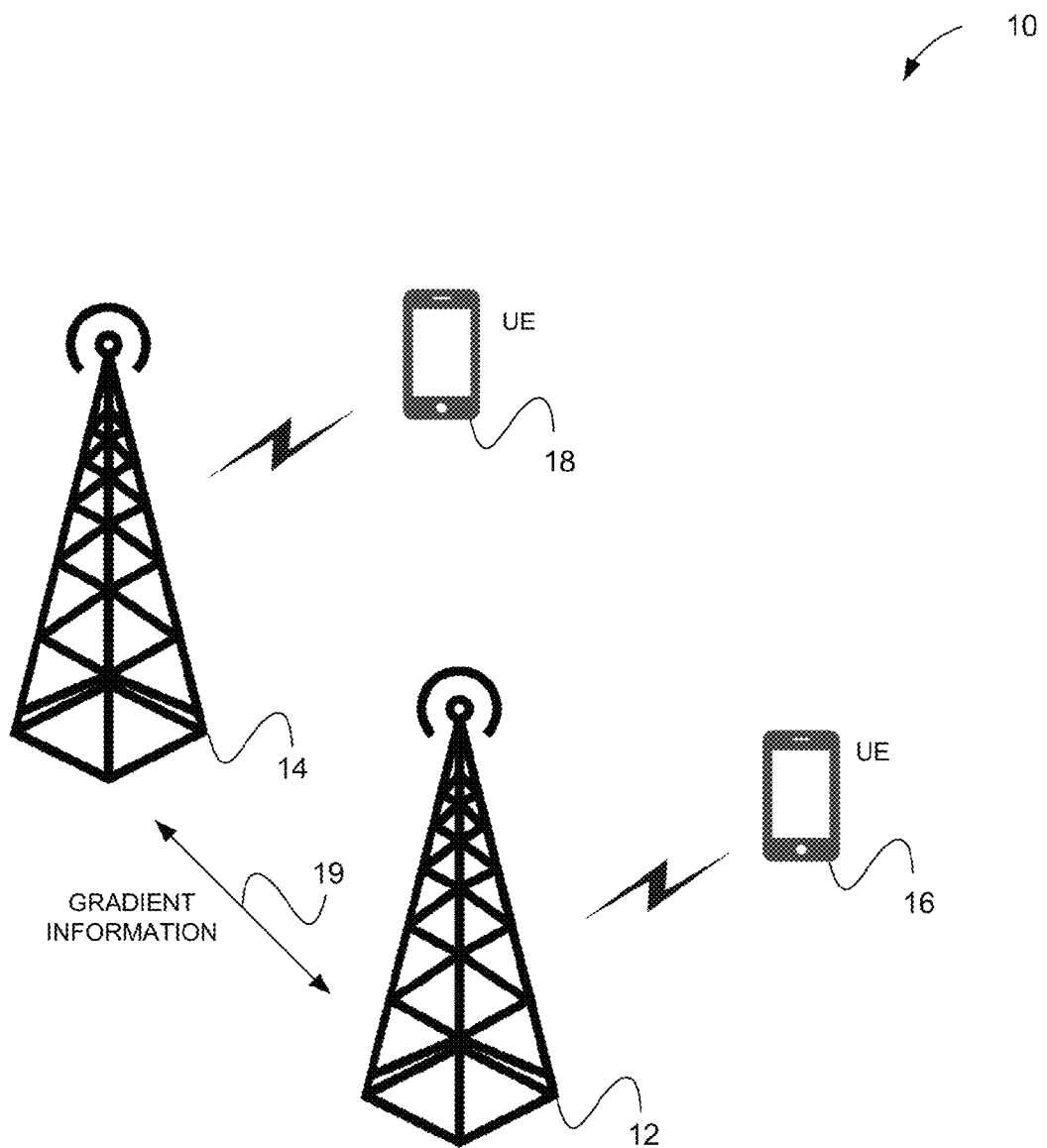
FIG. 1A illustrates an exemplary LTE/LTE-Advanced network including a first cell node and a second cell node that communicate data with a first user equipment (UE) and a second UE, respectively, in accordance with one embodiment.

FIG. 1A illustrates an exemplary LTE/LTE-Advanced network 10 including a first cell node 12 and a second cell node 14 that communicate data with a first UE 16 and a second UE 18, respectively, in accordance with one embodiment. As further shown, the first cell node 12 and the second cell node 14 share gradient information 19 that relates to a gradient.

Figure 1B:
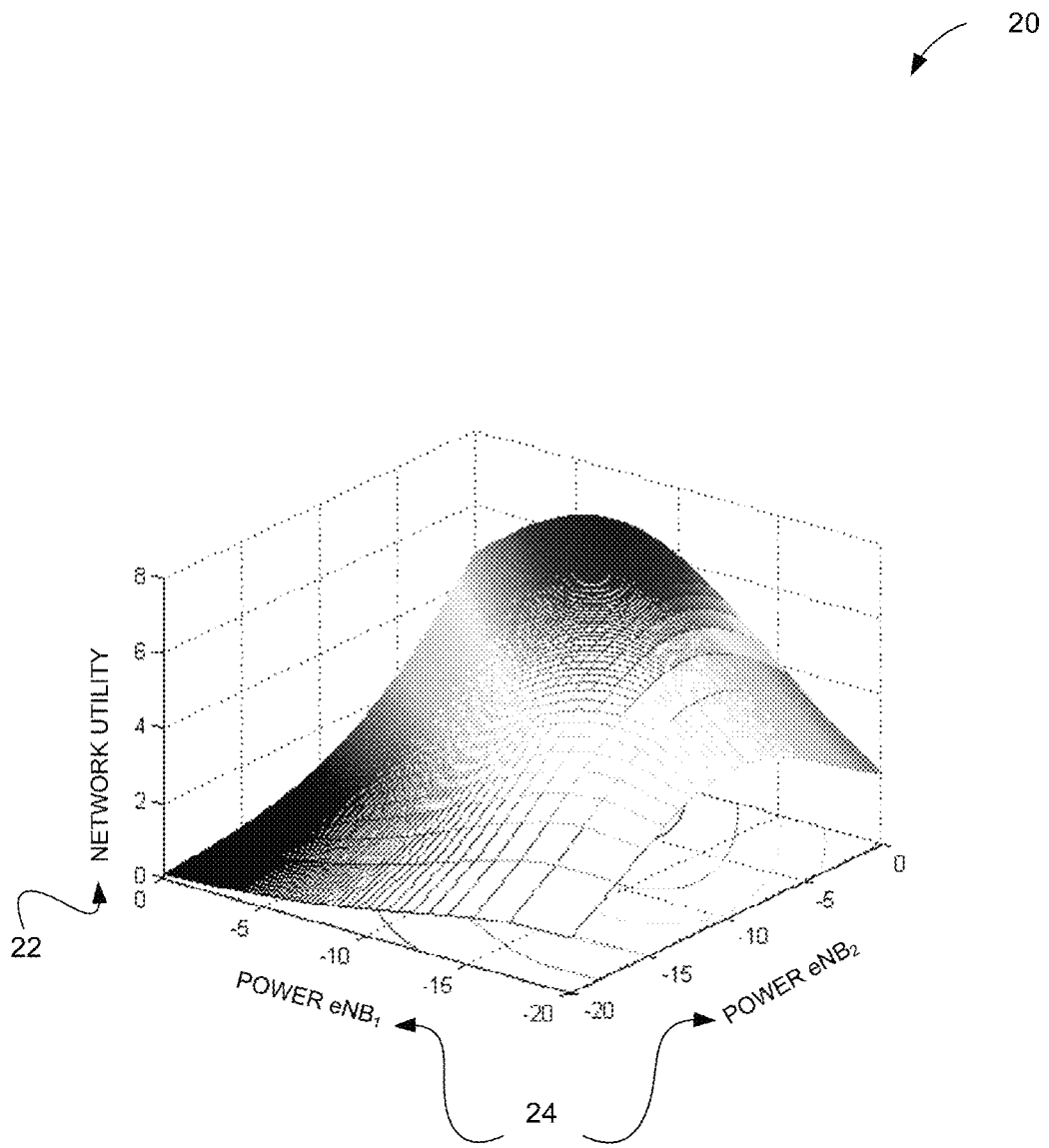
FIG. 1B illustrates a sample network utility curve that shows the overall network utility over all combinations of power settings of the first cell node and the second cell node of FIG. 1A.

While the following description should not be construed as limiting (as gradient/gradient information 19 is specifically defined later), a gradient may, in the current embodiment, refer to a mathematical gradient (e.g. slope, etc.) on a network utility curve that varies as a function of the power settings of the first cell node 12 and the second cell node 14. FIG. 1B illustrates a sample network utility curve 20 that shows the overall network utility 22 over all combinations of power settings of the first cell node 12 and the second cell node 14 of FIG. 1A.

During use in accordance with one embodiment, the first cell node 12 may communicate data with the first UE 16 using a first power, while the second cell node 14 may communicate data with the second UE 18 using a second power. Further, the first cell node 12 may independently calculate where on the network utility curve 20 the first cell node 12 sees itself, as a result of the second cell node 14 communicating data with the second UE 18 using the second power (and any resulting interference). Still yet, the first cell node 12 may further calculate a corresponding first gradient at such first point. Similarly, the second cell node 14 may independently calculate where on the network utility curve 20 the second cell node 14 sees itself, as a result of the first cell node 12 communicating data with the first UE 16 using the first power (and any resulting interference). Further, the second cell node 14 may further calculate a corresponding second gradient at such second point. To this end, the foregoing gradients may indicate a degree of deviation from an optimized network utility (from the perspective of each cell node 12, 14) as a result of a current power setting.

Armed with these calculations, each of the cell nodes 12, 14 may share such gradient (or some sort of information derived therefrom). Thus, the shared gradient information 19 may be viewed as "complaints" shared amongst the cell nodes 12, 14, where a level of the complaint of a particular cell node corresponds with a magnitude of the respective gradient and reflects how negatively the other cell node's power setting is impacting the particular cell node (and its ability to communicate with its UE(s)). In connection with receipt of such negative "complaint"-type gradient information 19 from the second cell node 14, the first cell node 12 also calculates a similar gradient that reflects any positive impact (on communication with its UE 16) based on its own current power setting.

By this design, the first cell node 12 may sum its own positive gradient information 19 with the negative gradient information 19 received from the second cell node 14 (and any other cell nodes). If such sum is positive, the first cell node 12 can assume that its current power setting has a favorable impact on the overall network utility and may, at its discretion, increase power even further. On the other hand, if such sum is negative, the first cell node 12 can assume that its current power setting has an unfavorable impact on the overall network utility and will decrease power. Thus, by the cell nodes 12, 14 iterating through the above technique, overall network utility may be optimized.

Various additional embodiments will now be elaborated upon during the description of subsequent figures where the foregoing framework may be further optimized to support implementation on LTE/LTE-Advanced networks (or permutations thereof) such as the one shown in FIG. 1A.

Figure 1C:
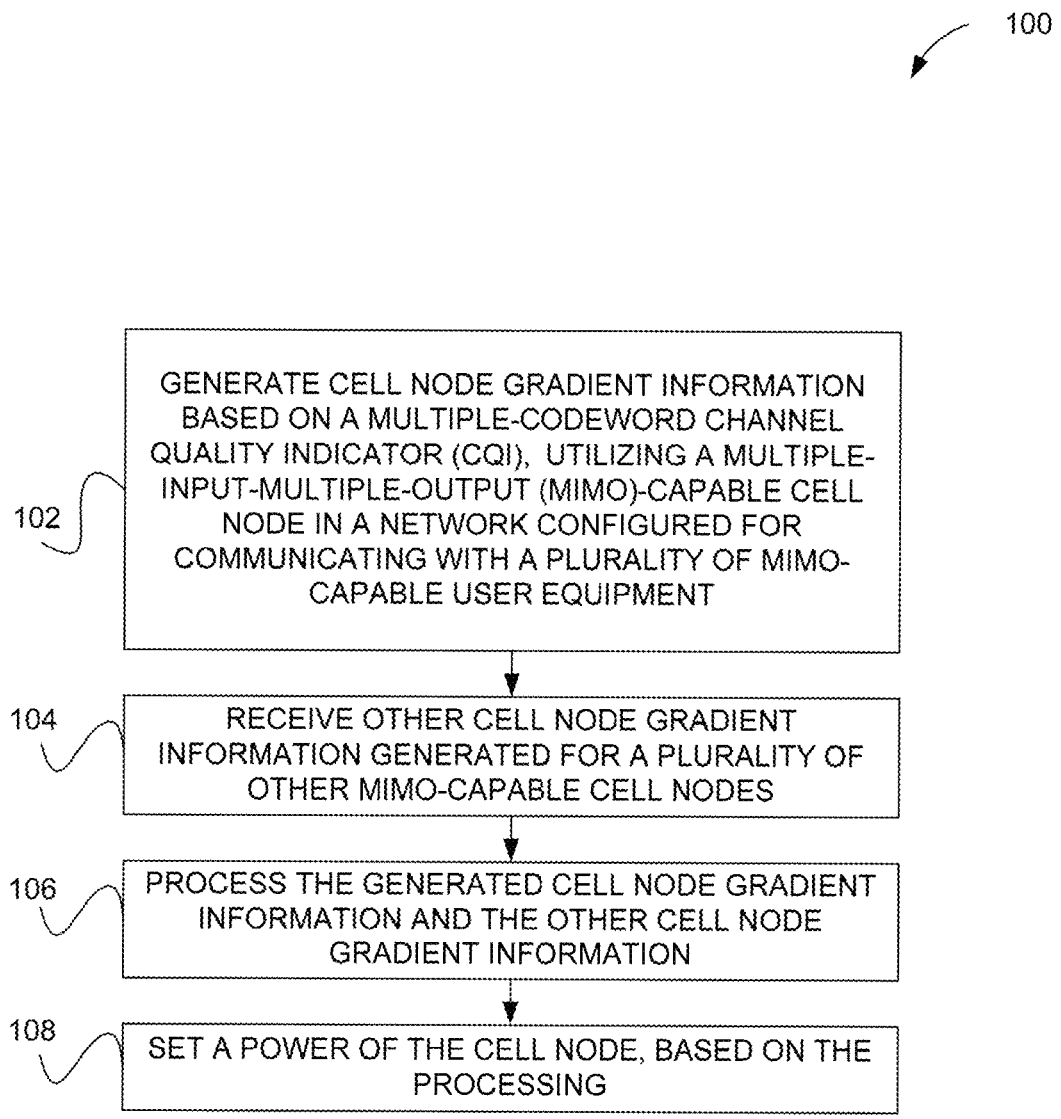
FIG. 1C illustrates a method for setting a power of a cell node based on cell node gradient information, in accordance with one embodiment.

FIG. 1C illustrates a method 100 for setting a power of a cell node based on cell node gradient information, in accordance with one embodiment. The present method 100 may be implemented by a cell node that is configured for communicating with a UE and/or other cell node nodes like that shown in FIG. 1A. In the context of the present description, the aforementioned cell node may include any node configured for cooperating with other cell nodes to afford a wireless network. Non-limiting examples of such cell node include any one of a Node B, base station (BS), radio network node, multi-standard radio (MSR) radio node such as an MSR BS, eNode B, network controller, radio network controller (RNC), base station controller (BSC), relay, donor node controlling relay, base transceiver station (BTS), access point (AP), transmission point, transmission nodes, remote radio unit (RRU), remote radio head (RRH), node in a distributed antenna system (DAS), and/or any other cell node that is configured for communicating with a UE.

Still yet, in the present description, the UE may refer to any type of wireless device configured for communicating with a cell node in a cellular or mobile communication system. Non-limiting examples of the UE may include a target device, device to device (D2D) UE, machine type UE, UE capable of machine-to-machine (M2M) communication, personal digital assistant (PDA), iPAD™, tablet, mobile terminal, smart phone, laptop embedded equipped (LEE), laptop mounted equipment (LME), universal serial bus (USB) dongle, and/or and any other type of wireless device configured for communicating with a cell node over the wireless network.

Even still, in the context of the present description, the aforementioned network may include any one or more networks which are capable of being formed by a plurality of the cell nodes. For example, such network may include a LTE/LTE-Advanced network and/or any other advancement/permutation thereof. In such context, the network may operate utilizing a frequency division duplex (FDD) protocol (i.e. a protocol that uses multiple different radio frequencies, etc.). It should be noted, however, that use of the method 100 with other radio access technology (RAT) networks (e.g. BLUETOOTH, WiFi, etc.) is contemplated, as well.

With continuing reference to FIG. 1C, cell node gradient information is generated based on a multiple-codeword channel quality indicator (CQI) in operation 102, utilizing a multiple-input-multiple-output (MIMO)-capable cell node in a network configured for communicating with a plurality of MIMO-capable user equipment. In the present description, a MIMO-capable node (e.g. cell node, UE, etc.) may include any node that uses multiple antennas in connection with a transmitter and a receiver. In one optional embodiment, a MIMO-capable node may be operable for sending and receiving more than one data signal simultaneously over the same radio channel by exploiting multipath propagation using the aforementioned multiple antennas.

Also in the present description, the aforementioned cell node gradient information refers to any information that describes and/or is derived from a gradient (e.g. an increase or decrease of a property, slope, etc.) associated with any aspect of the cell node. For example, the cell node gradient information may relate to power usage and be used to calculate and determine the aforementioned network utility. Specifically, in one possible embodiment, the aforementioned gradient may refer to a gradient at a point on a network utility curve like that shown in FIG. 1B.

Still yet, in the present description, the abovementioned multiple-codeword CQI may include a report on a quality of a communication channel that includes multiple values as a result of multiple rank MIMO-operation (e.g. rank=2, 3, etc.). In another embodiment, such CQI may further be defined by a technical specification of a LTE/LTE-Advanced network protocol (or permutation thereof).

Further, in operation 104, other cell node gradient information is received that was generated for a plurality of other MIMO-capable cell nodes (i.e. that are separate from the abovementioned MIMO-capable cell node). Such cell node gradient information may be used to indicate which surrounding other MIMO-capable cell nodes are being negatively impacted by the MIMO-capable cell node that is performing operations 102-104. For example, a particular MIMO-capable cell node (that is performing operations 102-104) may receive cell node gradient information from another MIMO-capable cell node, where such cell node gradient information includes negative feedback as a result of the another MIMO-capable cell node being negatively impacted by a power setting of the particular MIMO-capable cell node, as set forth during the description of FIGS. 1A-1B.

Thus, in one embodiment that will be elaborated upon later in greater detail, the cell node gradient information (which is the generated in operation 102) and the other cell node gradient information (which is received in operation 104) may be used to determine an overall impact of power settings among different MIMO-capable cell nodes. Specifically, as shown in operation 106, the generated cell node gradient information and the other cell node gradient information are processed. In one exemplary embodiment, such processing may involve a determination of a positive or negative effect of the MIMO-capable cell node with respect to the other MIMO-capable cell nodes, as described earlier in FIGS. 1A-2B. As mentioned earlier during the description of FIGS. 1A-1B, this may be accomplished by summing the generated cell node gradient information and the other cell node gradient information.

It should be noted that, in the context of the present description, the aforementioned processing may involve any utilization of the generated cell node gradient information and the other cell node gradient information, so as to allow a power of the cell node to be set (as will now be set forth). Based on the processing, in operation 108, a power of the cell node is set. In one embodiment, such power of the cell node may refer to a power level with which the cell node communicates with its UE(s). In other possible embodiments, the power with which the UE(s) communicates may be set, as well.

In this manner, the particular cell node (that is performing operations 102-104) may calculate its benefit to its UEs (that it is serving), receive feedback from other cell nodes as to its negative impact (if any), and use such information to change the power setting for the particular cell node, as set forth during the description of FIGS. 1A-1B. In one embodiment, the method 100 may be used to achieve, by each cell node, improved/optimal network utility, whereby the transfer of bits via all MIMO-capable cell nodes within the network may be improved (e.g. and possibly maximized, etc.), as set forth in FIGS. 1A-1B.

As mentioned earlier, the foregoing method 100 may be further optimized to support use on LTE/LTE-Advanced networks (or permutations thereof) such as the one shown in FIG. 1A. Examples of such possible optimizations will be described below in the context of various optional embodiments, the features of which are described later in the context of different, more specific embodiments described during reference to subsequent figures. It should be noted that the following information is set forth for illustrative purposes and, thus, any of the following features may be optionally incorporated with or without the other features described.

Figures 1, 1C:
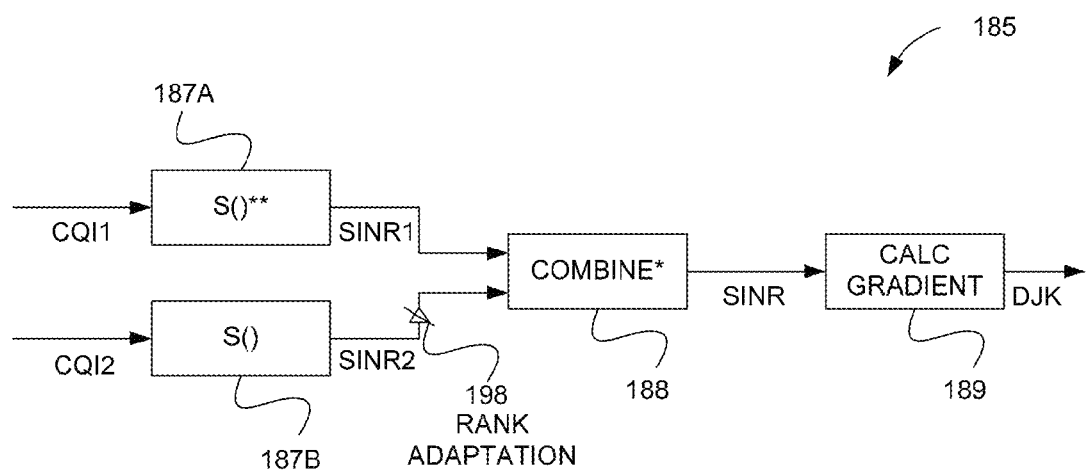
Figures 1, 1C, 2:
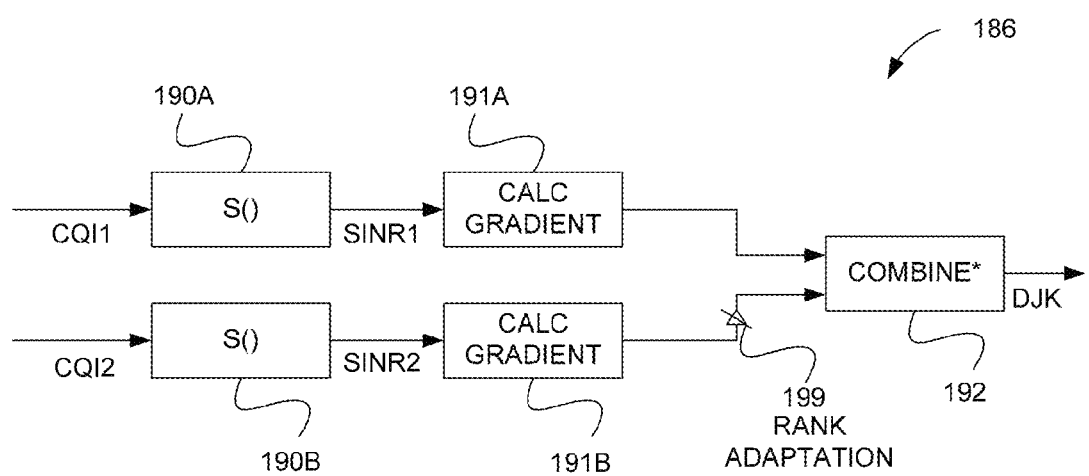

For example, as indicated above, the cell node gradient information is generated based on the multiple-codeword CQI in operation 102. Further, the abovementioned multiple-codeword CQI may include a report on a quality of a communication channel that includes multiple values as a result of multiple rank MIMO-operation (e.g. rank=2, 3, etc.). FIG. 1C-1 illustrates a first technique 185 for generating the cell node gradient information based on the multiple-codeword CQI, in accordance with one embodiment; while FIG. 1C-2 illustrates a second technique 186 for generating the cell node gradient information based on the multiple-codeword CQI, in accordance with another embodiment.

As shown in FIG. 1C-1, in a MIMO-capable environment, a single CQI1 is received when operating in a rank 1 mode operation (e.g. when only one MIMO layer is being employed), and two CQIs (e.g. CQI1, CQI2) are received when operating in a rank 2 mode operation (e.g. when two MIMO layers are being employed). In the case of rank 1 operation, just the single CQI1 may be used to calculate a first (and only) signal-to-interference-plus-noise ratio (SINR1) using a standard CQI-SINR operator 187A. Such SINR may, in turn, be solely used in connection with the gradient generation 189 (per operation 102 of FIG. 1C) without any combine operator 188, since there is no SINR2 to combine with SINR1.

On the other hand, in the case of rank 2 operation, both CQIs (e.g. CQI1, CQI2) may be used to calculate two SINRs (e.g. SINR1, SINR2) using respective standard CQI-SINR operators 187A, 187B. Further, both SINRs (e.g. SINR1, SINR2) are, in turn, used in connection with gradient generation 189 (per operation 102 of FIG. 1C) using the combine operator 188. In one possible embodiment, a switch 198 may be used to incorporate the SINR2 into the gradient generation 189 when rank 2 operation is detected.

In various embodiments, the SINRs (e.g. SINR1, SINR2) may be combined via the combine operator 188 in any desired manner. Specifically, in one embodiment, the two SINRs (e.g. SINR1, SINR2) may be combined by the combine operator 188 by averaging the same. In another embodiment, the two SINRs may be combined using a Shannon capacity formula. More information regarding such embodiment will be set forth later during the description of Equation 53. In any case, it should be noted that, absent an ability to combine the SINRs (during rank 2 (or higher) operation), the SINRs, by themselves (without any combine operator 188), would inaccurately reflect MIMO operation. Specifically, during multiple-rank operation, power is split across two code-words. To this end, using the CQI code words without any subsequent processing would incorrectly assume a weaker SINR, thus improperly influencing gradient generation.

Returning to the second technique 186 of FIG. 1C-2, the combine operator 188 of the first technique 185 of FIG. 1C-1 is shown to be replaced with a combine operator 192 closer to an end of the overall gradient generation process. As shown, in a MIMO-capable environment, a single CQI1 is received when operating in a rank 1 mode operation (e.g. when only one MIMO layer is being employed), and two CQIs (e.g. CQI1, CQI2) are received when operating in a rank 2 mode operation (e.g. when two MIMO layers are being employed). In the case of rank 1 operation, just the single CQI1 may be used to calculate a first (and only) SINR1 using a standard CQI-SINR operator 190A. Such SINR1 may, in turn, be solely used in connection with gradient generation 191A (per operation 102 of FIG. 1C) without any combine operator 192, since there is no SINR2 to combine with SINR1.

On the other hand, in the case of rank 2 operation, both CQIs (e.g. CQI1, CQI2) may be used to calculate two SINRs (e.g. SINR1, SINR2) using respective standard CQI-SINR operators 190A, 190B. Further, both SINRs (e.g. SINR1, SINR2) are, in turn, used in connection with gradient generation using respective gradient calculations 191A, 191B. In contrast to the first technique 185 of FIG. 1C-1, the combine operator 192 is utilized after gradient generation using results of the respective gradient calculations 191A, 191B. By this design, options for implementing the combine operator 192 may be more limited (e.g. just averaging or a similar technique, etc.), since the gradients have already been calculated and the combine operator 192 does not have the benefit of the earlier processed SINRs. Similar to the first technique 185 of FIG. 1C-1, the second technique 186 of FIG. 1C-2 may employ a switch 199 to incorporate the SINR2 and associated gradient information into the combine operator 192, when rank 2 operation is detected.

Again, without an ability to combine the SINRs (during rank 2 (or higher) operation), the SINRs, by themselves (without any combine operator 192), would inaccurately reflect MIMO operation. Specifically, during multiple-rank operation, power is split across two code-words. To this end, using the CQI code words without any subsequent processing (e.g. the combining) would incorrectly assume a weaker SINR, thus improperly influencing gradient generation.

Figure 1D:
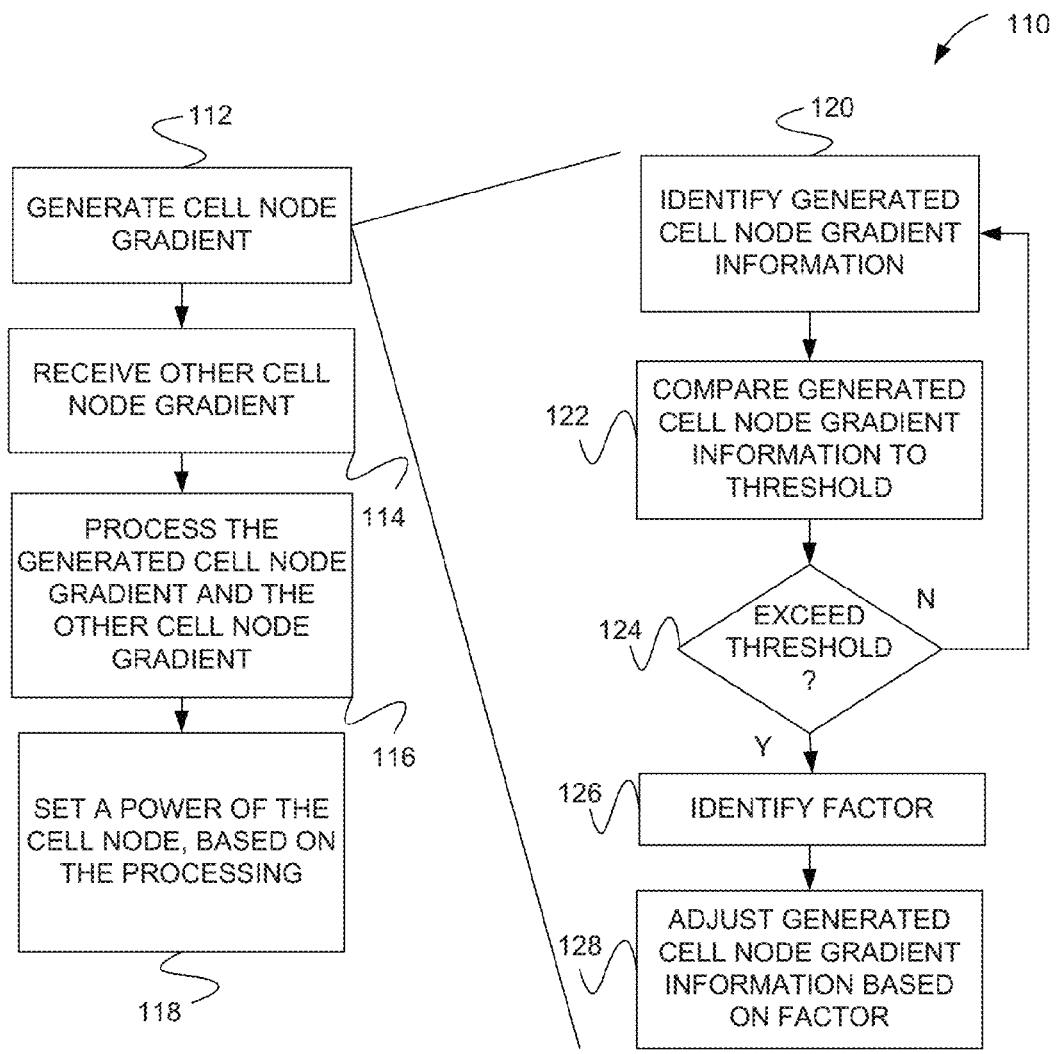
FIG. 1D illustrates a method for adjusting gradient information, in accordance with one embodiment.
Figures 1, 1D:
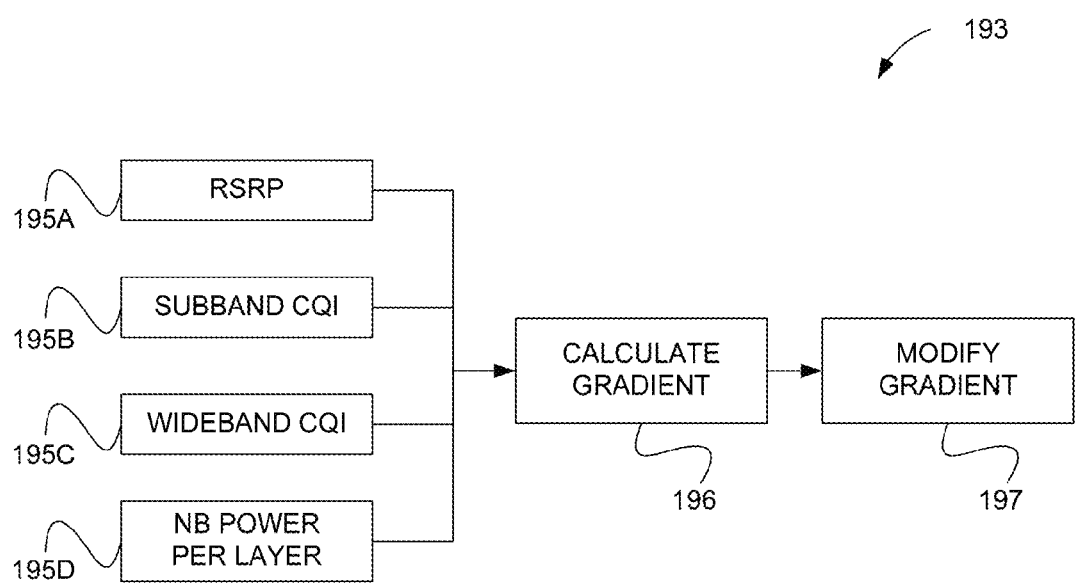

FIG. 1D illustrates a method 110 for adjusting gradient information, in accordance with one embodiment. As an option, the method 110 may be implemented in the context of any one or more of the embodiments set forth in any previous and/or subsequent figure(s) and/or description thereof. For example, the method 110 may be implemented in the context of the method 100 of FIG. 1C and, in particular, operation 102 of the method 100 of FIG. 1C. However, it is to be appreciated that the method 110 may be implemented in the context of any desired environment.

As shown, the method 110 proceeds in a manner similar to the method 100 of FIG. 1C. Specifically, in operation 112, gradient information is generated by the cell node carrying out the method 110, and further, in operation 114, other gradient information is received from other cell nodes. To this end, the gradient information generated and received in operations 112/114 are processed in operation 116 for setting a power level in operation 118.

In contrast to the method 100 of FIG. 1C, however, the method 110 allows for the adjustment of the cell node gradient information generated in operation 112. Such adjustment may, for example, be prompted in scenarios where a particular cell node is serving a UE that is near a boundary of an area that the particular cell node serving. Due to the proximity of the UE to the aforementioned boundary, any communications between the particular cell node and the UE may have a higher likelihood of more significant interference caused by a neighboring cell node. This, in turn, may result in severely negative gradients being reported by the particular cell node to the neighboring cell node which, in turn, may destabilize the method 110 of FIG. 1D. For example, due to the increased time between measurement reporting typical in LTE/LTE-Advanced networks, any sudden negative spike in a gradient value may disrupt the method 110 and frustrate convergence to the optimal network utility.

Thus, in order to prevent such destabilization in such situation, the gradient information (generated in operation 112) may be adjusted if the generated cell node gradient information exceeds a predetermined threshold (e.g. a predetermined negative threshold, etc.). Specifically, the gradient information generated in operation 112 is identified in operation 120, by being received or otherwise made available to appropriate decision logic (implemented using hardware and/or software). Further, in operation 122, such generated gradient information is compared to a predetermined threshold. Such predetermined threshold may be fixed and/or configurable by an administrator based on any desired technique (e.g. using empirical historical data, a look-up table, etc.) to ensure the aforementioned adjustment is carried out in situations where destabilization is a possibility or a probability.

If the comparison of operation 122 concludes that the threshold is not exceeded per decision 124, no adjustment is performed and operations 120-122 are repeated for additional gradient information that is generated thereafter. On the other hand, if the comparison of operation 122 concludes that the threshold is indeed exceeded per decision 124, the method 110 continues as follows.

Specifically, in operation 126, a factor is optionally identified. Such factor may be fixed and/or configurable/selected by an administrator. In various embodiments, the factor may include, but is not limited to a power utilization factor, a factor that distinguishes a higher power cell node from a lower power cell node, a fairness factor, and/or an activity factor. By this design, the gradient information (generated in operation 112) may be adjusted in operation 128 utilizing the aforementioned factor(s). In various embodiments, for instance, the generated cell node gradient information may be reduced (in magnitude) as a function of any one or more of the foregoing factors.

Just by way of example, in one possible embodiment, a degree of the adjustment of operation 128 may be a function of one or more of the foregoing factors. For example, if a fairness factor indicates that a lower power cell node (that is performing the method 110) is the subject of a high "unfairness" factor (as compared to a higher power cell node), the adjustment of operation 128 by augmenting the gradient information generated in operation 112, so as to compensate for the foregoing "unfairness." In particular, any such augmentation may, in one embodiment, shift a result of a summing technique (like that described in FIGS. 1A-1B), thus causing a different result in terms of a cell node power setting.

Still yet, in another possible embodiment where different sub-band resources are used to service one or more UEs, the aforementioned adjustment may involve the use of an average of the measurements (e.g. signal-to-interference ratio (SIR) measurements) across the sub-bands (resulting in a single band-related average value), so as to smooth out the aforementioned negative spike in gradient value. Further information regarding various embodiments that incorporate examples of such factors and overall adjustment will be elaborated upon during the description of subsequent figures and/or equations (e.g. including, but not limited to the descriptions of Equations 9-14, etc.).

FIG. 1D-1 illustrates a method 193 for generating gradient information based on additional inputs (e.g. wideband CQI, power per layer, etc.), in accordance with one embodiment. As an option, the method 193 may be implemented in the context of any one or more of the embodiments set forth in any previous and/or subsequent figure(s) and/or description thereof. For example, the method 193 may be implemented in the context of the method 100 of FIG. 1C and, in particular, operation 102 of the method 100 of FIG. 1C. However, it is to be appreciated that the method 193 may be implemented in the context of any desired environment.

As shown, a gradient calculation 196 is carried out based on input beyond a reference signal received power (RSRP) 195A, and sub-band CQI 195B, for increasing a stability of gradients that are calculated. For example, the gradient calculation 196 may be carried out based on a wideband CQI 195C. In the present description, such wideband CQI 195C provides one CQI value for an entire downlink system bandwidth. In use, the RSRP 195A is reported over a longer period, and the sub-band CQI 195B is reported over a relatively shorter period, thus leading to the wideband CQI 195C and the sub-band CQI 195B becoming mismatched. Specifically, since the RSRP 195A is reported, for example, every 500 milliseconds, whereas the sub-band CQI 195B is reported every 20 milliseconds, there is a factor of 10 to 20 times difference in speed of reporting, thus these two values can become misaligned which, in turn, causes instability in the generation of the gradients. Thus, by using the wideband CQI 195C (in addition to the sub-band CQI 195B), there may be some compensation for the foregoing mismatch and resultant mismatch.

With continuing reference to FIG. 1D-1, the gradient calculation 196 is further carried out based on "per layer" power information 195D. By taking into account power at each layer (e.g. rank layer, etc.), MIMO operation is accomodated, since each antenna during MIMO operation may be viewed as an independent communication mechanism. In other words, to simply look at total power (across all MIMO antennae) would inaccurately reflect what is occurring during MIMO operation on each MIMO antenna. Further, a certain parameter for a channel operating in a rank 1 mode of operation (e.g. when only one MIMO layer is being employed) may be sufficient, while such same parameter may not be sufficient during rank 2 mode operation (e.g.

when two MIMO layers are being employed). Thus, relying on "per layer" power information may provide the granularity necessary to properly interpret and rely on such information specifically in a MIMO context.

Further information regarding various embodiments that incorporate examples of such factors and overall adjustment will be elaborated upon during the description of subsequent figures and/or equations (e.g. including, but not limited to the descriptions of Equations 15-17, etc.). As an option, the method 110 of FIG. 1D may also be employed in operation 197. Specifically, it may be determined whether the current gradient should be boosted and, if so, any desired identified factor may be employed to boost such gradient in operation 197.

To this end, the cell node gradient information (generated in operation 102 of FIG. 1C) may be generated utilizing fading information that is measured utilizing at least one of the plurality of MIMO-capable UEs. In the context of the present description, fading refers to any deviation of a network signal, and fading information may refer to any information that describes and/or is derived from a fading measured in connection with the cell node. In the context of a LTE/LTE-Advanced network, such fading information may be received in the aforementioned CQI reports. Further information regarding various embodiments that incorporate such feature(s) will be elaborated upon during the description of subsequent figures and/or equations (e.g. including, but not limited to FIG. 2 and, in particular, Equation 14, etc.).

Figure 1E:
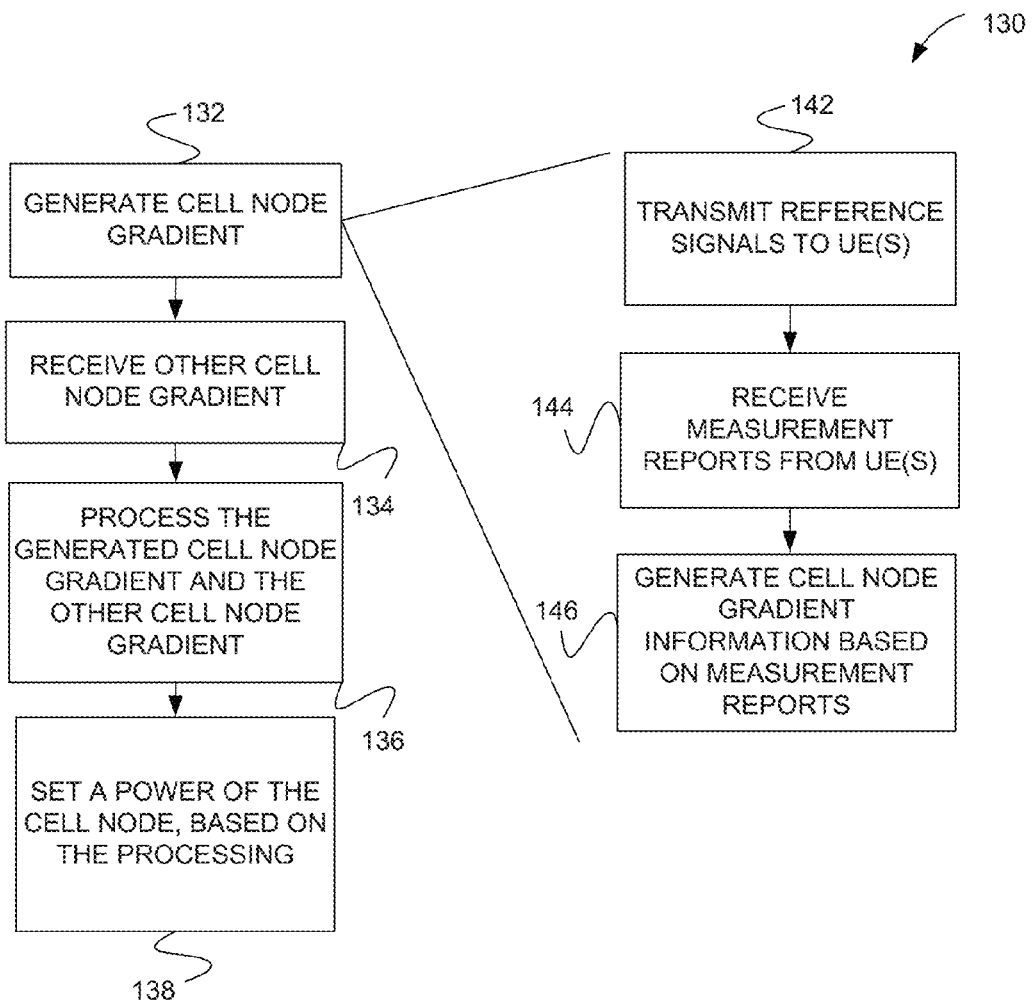
FIG. 1E illustrates a method for generating gradient information using UE signaling measurements, in accordance with one embodiment.

In still other embodiments, additional optional adjustments may be made to the method 100 of FIG. 1C in order to accommodate the fact that LTE/LTE-Advanced networks rely on UEs for signaling measurements. Specifically, FIG. 1E illustrates a method 130 for generating gradient information using UE signaling measurements, in accordance with one embodiment. As an option, the method 130 may be implemented in the context of any one or more of the embodiments set forth in any previous and/or subsequent figure(s) and/or description thereof. For example, the method 130 may be implemented in the context of the method 100 of FIG. 1C and, in particular, operation 102 of the method 100 of FIG. 1C. However, it is to be appreciated that the method 130 may be implemented in the context of any desired environment.

As shown, the method 130 proceeds in a manner similar to the method 100 of FIG. 1C. Specifically, in operation 132, gradient information is generated by the cell node carrying out the method 130, and further, in operation 134, other gradient information is received from other cell nodes. To this end, the gradient information generated and received in operations 132/134 are processed in operation 136 for setting a power level in operation 138.

In the present embodiment, however, the aforementioned gradient information may be generated in operation 132 using the aforementioned UE signaling measurements. Specifically, as shown in operation 142, reference signals may be communicated from the cell node performing operations 132-138 to one or more UEs. Such reference signals may, for example, include pilot signals.

After sending the reference signals, measurement reports are received from the UE(s) in operation 144. In particular, such measurement reports may reflect a quality with which the reference signals are received, thus indicating a quality of an associated channel of communication. For example, in one possible embodiment, the aforementioned UE signaling measurements may take the form of a channel quality indication (CQI) report.

With these measurements, the cell node (performing operations 132-138) may use such channel quality information to generate the gradient information, per operation 146. To this end, if the UE measurement reports indicate that the channel quality is bad, the gradient information may be set to be lower to reflect the same. Conversely, if the UE measurement reports indicate that the channel quality is good, the gradient information may be set to be higher to reflect the same. Further information regarding various different embodiments that incorporate such feature(s) will be elaborated upon during the description of subsequent figures and/or equations (e.g. including, but not limited to FIG. 15 and, in particular, after Equation 73, etc.).

Figure 1F:
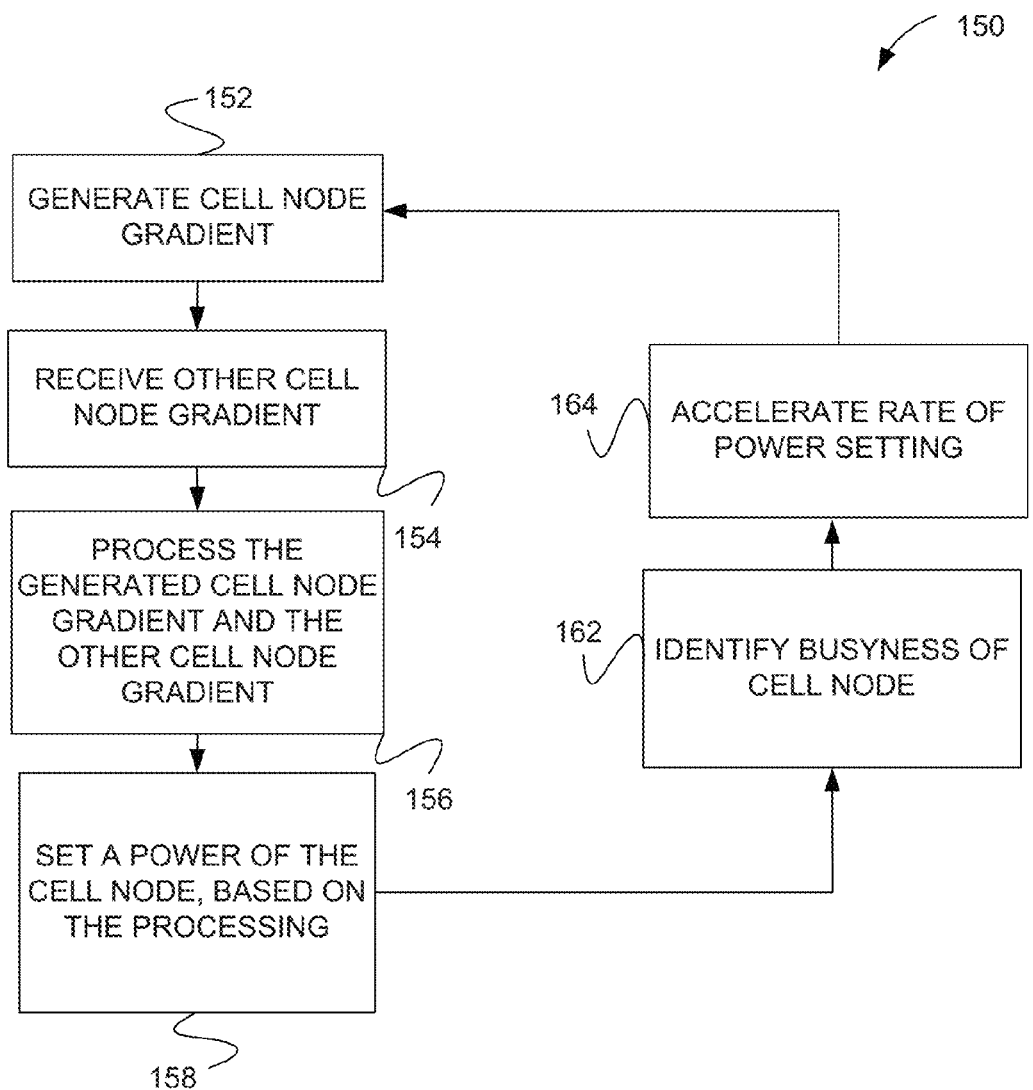
FIG. 1F illustrates a method for accelerating the process of power setting, in accordance with one embodiment.

FIG. 1F illustrates a method 150 for accelerating the process of power setting, in accordance with one embodiment. As an option, the method 150 may be implemented in the context of any one or more of the embodiments set forth in any previous and/or subsequent figure(s) and/or description thereof. For example, the method 150 may be implemented in the context of the method 100 of FIG. 1C and, in particular, may control a rate at which the method 100 of FIG. 1C is carried out (repeated/iterated). However, it is to be appreciated that the method 150 may be implemented in the context of any desired environment.

As shown, the method 150 proceeds in a manner similar to the method 100 of FIG. 1C. Specifically, in operation 152, gradient information is generated by the cell node carrying out the method 150, and further, in operation 154, other gradient information is received from other cell nodes. To this end, the gradient information generated and received in operations 152/154 are processed in operation 156 for setting a power level in operation 158.

The current method 150, however, may differ (from the method 100 of FIG. 1C) in that it may be used to address a scenario where a first cell node (e.g. the first cell node 12 of FIG. 1A, etc.) may be very heavily loaded, and a second cell node (e.g. the second cell node 14 of FIG. 1A, etc.), may be very lightly loaded (in comparison). In such situation, a rate at which the lightly-loaded second cell node converges to an optimal network utility may take a significant amount of time, thereby causing less than acceptable service to its UE(s). To address this, a rate at which the power of the cell node is set (via operations 152-158), may be accelerated. Specifically, a rate which the method 150 is repeated (e.g. periodically or on some other basis) may be increased to facilitate the foregoing convergence.

To accomplish this in accordance with one embodiment, a busyness of the cell node may be determined in operation 162, and the rate at which the power of the cell node is set may be accelerated based on the busyness of the cell node. For example, such cell node busyness may, in one embodiment, be determined by identifying an amount of data in one or more buffers of the cell node and comparing the same to a threshold (or using any other criteria-based logic). Further, if the busyness of the cell node indicates that the cell node is severely underutilized to the extent that the aforementioned unacceptable service may or has already occurred (e.g. as determined by a threshold, criteria, etc.), the power setting rate may be accelerated in operation 164 so that convergence (to an optimal network utility) is reached sooner. Further information regarding various different embodiments that incorporate such feature(s) will be elaborated upon during the description of subsequent figures and/or equations (e.g. including, but not limited to one or more of FIGS. 11-14 and, in particular, Equation 51, etc.).

Still yet, in still an additional embodiment, the network may operate amidst bursty traffic, which includes inconsistent network traffic levels that are prevalent in LTE/LTE-Advanced networks. More information regarding such embodiment will now be set forth during reference to FIG. 1G.

Figure 1G:
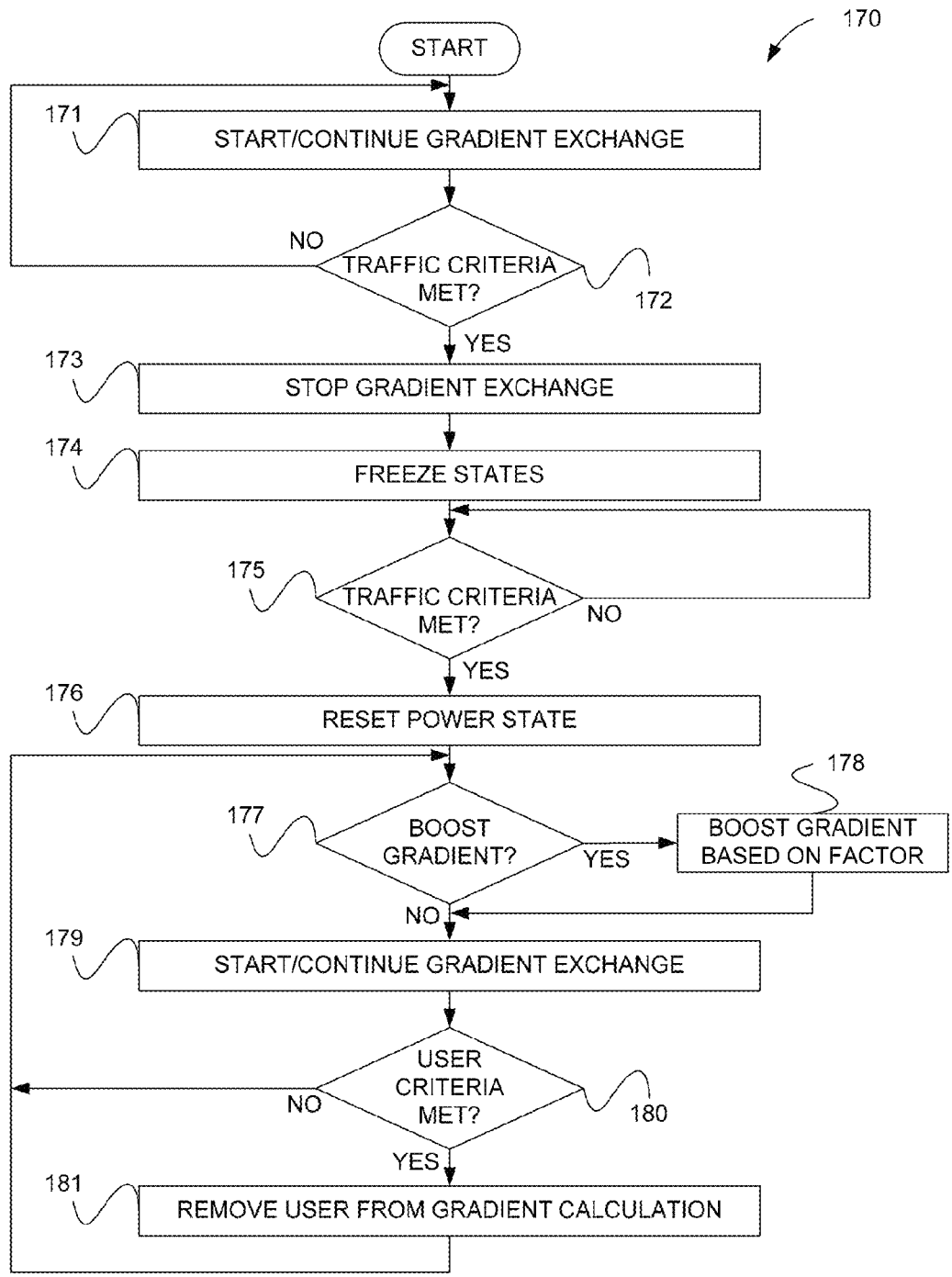
FIG. 1G illustrates a method for sharing gradient information based on traffic conditions (e.g. bursty traffic, etc.), in accordance with another embodiment.

FIG. 1G illustrates a method 170 for sharing gradient information based on traffic conditions (e.g. bursty traffic, etc.), in accordance with another embodiment. As an option, the method 170 may be implemented in the context of any one or more of the embodiments set forth in any previous and/or subsequent figure(s) and/or description thereof. For example, the method 170 may be implemented in the context of the method 100 of FIG. 1C and, in particular, may conditionally deploy the method 100 of FIG. 1C based on the presence of bursty traffic. With that said, it is to be appreciated that the method 170 may be implemented in the context of any desired environment.

As shown, an exchange of gradient information may be initiated in operation 171. Such exchange may be carried out in accordance with operations 102-104 of FIG. 1C, for example. Further, during such gradient exchange, it is determined in decision 172 whether traffic criteria is met. In the context of the present description, such bursty traffic may include a situation where the network traffic is nominal or sustained with bursts or peaks of increased traffic. Further, in the present embodiment, the aforementioned traffic criteria may include any criteria by which bursty traffic is determined to be occurring. For example, in one possible embodiment, the traffic criteria may include a threshold level (e.g. amount, rate, etc.) of traffic (e.g. per cell node, etc.).

Figure 1H:
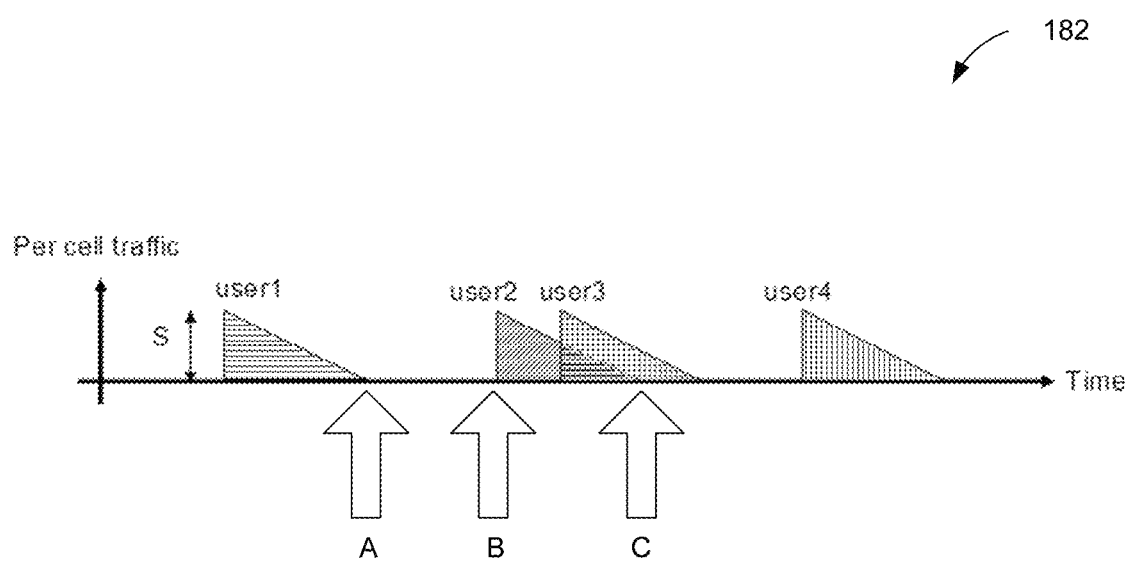
FIG. 1H illustrates an exemplary scenario where the sharing of gradient information is changed based on traffic conditions (e.g. the presence of bursty traffic, etc.), in accordance with another embodiment.
Figure 2:
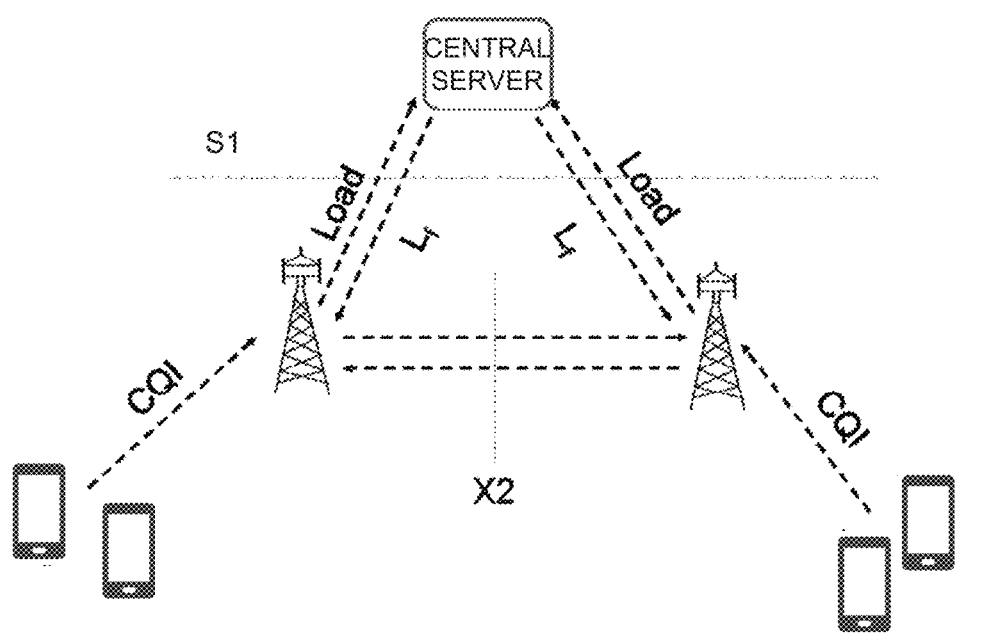

FIG. 1H illustrates an exemplary scenario 182 where the sharing of gradient information is changed based on traffic conditions (e.g. the presence of bursty traffic, etc.), in accordance with another embodiment. As shown, a level of user traffic associated with different UEs is shown over time. Such UE-traffic may be determined, for example, by inspecting UE-specific buffers at the cell node.

As shown, at point A in time, it may be determined, per decision 172, that bursty traffic is present, since none of the UE-specific buffers has any packets to be communicated. In such situation, it may be undesirable to proceed with one or more of the operations 102-108 of FIG. 1C when traffic has fallen below a predetermined amount. Specifically, carrying out such gradient generating/sharing and/or power setting may constitute a waste of resources and may even detrimentally affect the method 100 of FIG. 1C. To illustrate this, consider a situation where the method 100 of FIG. 1C is nevertheless carried out at point A in FIG. 1H. In such case, gradients would continue to be calculated and shared with neighboring cell nodes, which requires power-consuming resources. Further, since there are no active UE buffers at point A and (in some embodiments) the gradient information is generated based on an average network activity over time, any generated/shared gradient would reduce any power setting to the extent that if there is a spike in activity, like that shown at point B, the power setting would be insufficient to accommodate such situation. Further, any gradient correction would take a certain amount of time during which the power setting would remain deficient.

With reference again to FIG. 1G, the aforementioned issues are addressed by temporarily stopping the exchange of gradient information in operation 173 (i.e. conditionally performing one or more of the operations of FIG. 1C) and freezing states in operation 174. Such states reflect the power setting of operation 108 of FIG. 1C. To this end, it may be determined in decision 175 whether the traffic criteria is again met (similar to that mentioned earlier in connection with decision 172). Further, when the traffic criteria is met, the current power state may be reset to a level at which it was frozen in operation 174. By this design, the power level is sufficient (at point B of FIG. 1H) to accommodate any burst (e.g. spike, etc.) in traffic would otherwise be problematic if the power level setting had to recover from a very low level resulting from an extended period of inactivity.

With continuing reference to FIG. 1G, the method 110 of FIG. 1D may also be employed. Specifically, it may be determined whether the current gradient should be boosted in decision 177 and, if so, any desired identified factor may be employed to boost such gradient in operation 178 before generating/sharing gradient information per operation 179. To this end, a starting power level may be, at minimum, at a level equal to that when traffic dropped below a predetermined threshold (at point B of FIG. 1G) and may even vector upward (after point B of FIG. 1G) based on a current activity level.

With reference back to FIG. 1H and, in particular, at point C, it shown that all of the users except one ("user3") has an active buffer. In an embodiment where the generation of gradient information is based on an average of buffer contents across all users, the zero-buffer contents of users1, 2, 4 would outweigh an effect of the contents of the active buffer of user3, resulting in lower gradient information that would, in turn, result in lower power level settings that could potentially negatively impact an ability for the cell node to service user3.

The method 170 of FIG. 1G accommodates the foregoing scenario by determining, in decision 180, whether UE criteria is met. For example, in one embodiment, such UE criteria may be met if there is no active buffer for such UE. In such case, such UE may be removed in operation 181 in connection with the generation of gradient information. Thus, the empty buffers of such UEs (e.g. users1, 2, 4 at point C of FIG. 1H) would not be considered when a particular gradient is generated, thus avoiding any negative impact on the servicing of any active users (e.g. user3 at point C of FIG. 1H).

To this end, the MIMO-capable cell node (that performs the operations 102-108 of FIG. 1C) may operate with an active buffer at a first time and an empty buffer at a second time, to accommodate such bursty traffic, and any of the foregoing negative effects of such bursty traffic on gradient generation may be potentially avoided. Further information regarding various different embodiments that incorporate such feature(s) will be elaborated upon during the description of subsequent figures and/or equations (e.g. including, but not limited to FIG. 7, etc.).

In one embodiment, the aforementioned MIMO-capable cell node may be further configured to generate the cell node gradient information independent of data packets based on a size thereof. For example, the cell node gradient information may not necessarily be generated for data packets that are too small (to contribute significantly to the cell node gradient). Such feature may serve to avoid small data packets (and any effect thereof) from prompting the generation and processing of gradient information, since the size of such data packets do not warrant the resources required for carrying out operations 102-108 of FIG. 1C.

In still other embodiments, different types of communication of the other cell node gradient information (see operation 104) may be employed. For example, in one embodiment, the other cell node gradient information (see operation 104) may be received, utilizing a backhaul communication between the cell node and the other cell nodes. Still yet, in yet another embodiment, the other cell node gradient information (see operation 104) may be received from a centralized system that received the other cell node gradient information from the other cell nodes. Further information regarding various different embodiments that incorporate such feature(s) will be elaborated upon during the description of subsequent figures and/or equations (e.g. including, but not limited to FIGS. 2/16, etc.).

To this end, in some optional embodiments, one or more of the foregoing features may enable improved (and possibly maximized) network utilization in MIMO-capable networks such as LTE, LTE-Advanced, and/or any advancement/permutation thereof. It should be noted that the aforementioned potential advantages are set forth for illustrative purposes only and should not be construed as limiting in any manner.

More illustrative information will now be set forth regarding various optional architectures and uses in which the foregoing method may or may not be implemented, per the desires of the user. For example, the MIMO-capable cell node may be further configured to reset a cell node power if at least one of a load or utilization (e.g. cluster load/average utilization, etc.) drops below a certain threshold. As an option, the cell node power may be reset to a maximum level. Still yet, in another embodiment, the MIMO-capable cell node may be further configured to inform at least one of the plurality of MIMO-capable user equipment of a new power level when one or more criteria is met. As an option, the one of the one or more criteria may involve a buffer of the at least one MIMO-capable user equipment not being empty, a modulation and coding scheme (MCS) level being above a threshold, and/or the new power level being different than an old power level. More information regarding such embodiment will be set forth during the description of subsequent figures and/or equations (e.g. FIG. 15, etc.). It should be noted that the following information is set forth for illustrative purposes and, thus, any of the following features may be optionally incorporated with or without the other features described.

In various embodiments, an independent power switching method (IPS) may be employed as a power coordination strategy without any inter-eNB [Evolved UMTS Terrestrial Radio Access Network (E-UTRAN) Node B or Evolved Node B)] communication. Further, a scheduling algorithm may be provided that does not necessarily require inter-eNB communication, while each eNB still considers its interference effect on its neighbors.

In one embodiment, such algorithm may be based on a specific context where each eNB is given a limited power budget according to its load. The eNB may serve to reduce the consumed power unless it can justify an increase in power. The algorithm thus provides a justification mechanism. For example, a "greedy" scheduler may be utilized. It should be noted that proportional fair and maximum throughput schedulers are both greedy. A eNB may serve a UE population $\{1 \ldots i \ldots I)\}$, where the $i^{th}$ UE may experience an average rate of $X_i$, and $X=\{X_1 \ldots X_I\}$ may be the vector of all average rates. The scheduler may continuously and greedily try to maximize a given Utility function U, by selecting the $i^{th}$ UE in sub-band j that would maximize per the following equation:

$$dU(i, j) = \max_i \{\nabla U_x \cdot r_j(i)\} \qquad \text{Equation 1}$$

where $r_j(i)$ is a "commodity amount generated" or instantaneous rate improvement, in subframe j, if the $i^{th}$ UE is selected. Since both X and $r_j(i)$ are measured in bps/Hz, the "rate" may be proportional to spectral efficiency. Here, $dU(i,j)$ may represent how much the utility U will be improved by making scheduling decision i. Specifically, for a proportional fair scheduler, such as:

$$U = \sum_i \log(X_i) \qquad \text{Equation 2}$$

$$\nabla U_{Xi} = \frac{1}{X_i} = \frac{1}{\phi_i r_i} \rightarrow \frac{UELoad}{r_i} \qquad \text{Equation 3}$$

at steady state where $r_i(j)=r_i \forall j$, $\phi_i$ may represent the probability that the $i^{th}$UE will be scheduled, and where UELoad is equivalent to number of active UE's attached to the eNB. As such:

$$dU(i,j) \rightarrow UELoad \qquad \text{Equation 4:}$$

at steady state. Additionally, a normalized Utility improvement may include the following:

$$dUn(i, j) = \frac{dU(i, j)}{UELoad} \rightarrow 1 \qquad \text{Equation 5}$$

at steady state.

In another embodiment, another factor that this scheduler may consider is Power Utilization, as follows:

$$PU = \frac{\sum_j P_j}{P_{max}} \qquad \text{Equation 6}$$

where $P_{max}$ represents the total maximum power available, and J is the number of sub-bands in a subframe. A heterogeneous (HetNet) cluster has a property that the traffic load may vary significantly among the different cell nodes, especially between macro and pico cell nodes. Therefore, in order to introduce a fairness aspect across cell nodes, a Load factor ($L_f$) may be introduced that each eNB may use, as follows:

$$L_f = \gamma_P \cdot e^{-\frac{UELoad}{MaxLoad}} \qquad \text{Equation 7}$$

where Maxload may represent the maximum load that the eNB can accommodate, and $\gamma_P$ may represent a factor that distinguishes a high power eNB from a low power eNB. As such, $\gamma_P$ may be different for a high power eNB compared to a low power eNB, but may be identical between different eNBs of the same power rating.

The power control algorithm may operate in this way after a scheduling decision in Equation 1 has been made in sub-band j to update the power ($P_j$), as follows:

$$\text{if } (dUn(i,j) > L_f * PU) \text{ else} \qquad \text{Equation 8:}$$

Since each eNB autonomously may know how heavily loaded it is (UELoad) compared to a full capacity (MaxLoad), it may calculate a $L_f$ factor. Each eNB may then distribute this power over its sub-bands in order to maximize its own utility constrained to this fairness factor. In this case, the power may be considered as a resource similar to a timeslot or an orthogonal Walsh code. The fact that each eNB assigns itself a limited power budget may be to enforce fairness between eNBs, and to ensure that each eNB assigns an unequal power distribution across different sub-bands.

In one embodiment, without this constraint, each eNB may maximize power usage by assigning an equal power distribution at maximum power level across all sub-bands. This algorithm uses implicit coordination between eNBs which may occur through channel quality indicator (CQI) feedback. For example, if UEs report higher CQI in a given sub-band (due to an interferer dropping its power), the eNB may allocate more power in that sub-band and subsequently have less available power to allocate in the other sub-band.

FIG. 2 illustrates an IPS information exchange 200, in accordance with one embodiment. As an option, the IPS information exchange 200 may be implemented in the context of any one or more of the embodiments set forth in any previous and/or subsequent figure(s) and/or description thereof. However, it is to be appreciated that the IPS information exchange 200 may be implemented in the context of any desired environment.

As shown in the IPS information exchange 200, X2 information may not necessarily be exchanged. Additionally, each NB may report its load (number of active UEs) to a central server, and the central server may report back to the NB the Lf term (the Lf term may be used in the following algorithm). In one embodiment, an IPS power update algorithm may be implemented by the IPS information exchange 200:

SINRu=SINR*(P/POld);
r=log 2(1+SINRu);
Lf=gammaP*exp(-LenUE/MaxUE);
for j0=1:J
j=mod(j0-1+NBId,J)+1;
PU=sum(P)/(J*Pmax)
[dU,i]=max{r(:,j))/X};
P(j)=1-beta)*P(j);
X=1-beta)*X;
if (dU/LenUE>=Lf*PU)
X(i)=X(i)+beta*r(i,j);
P(j)=P(j)-beta*Pmax;
end
end
P=max(P,delta);
sumP=(sum(P);
if (sumP>Pmax)
P=P/sumP*Pmax;
end Additionally, the Lf term may relate to and be associated with Equation 8.

With respect to updating SINR based on power P [and since the reported SINR was based on a given power value (POld here)], each eNB may update the reported SINRs proportional to the changes in P, at the same rate as P changes. The power update may occur in a faster loop, while the SINR reports may occur in a relatively slower loop, meaning that the power is peridocally set (e.g. updated) at a rate faster than that at which the SINR reports occur. Additionally, for purposes of this algorithm, an effect of changing interference power inside the faster loop is not included, since the eNB has no way to determine this. In one embodiment, the faster loop may occur 30 times per subframe.

With respect to randomizing the sub-band scheduling order, such order may be randomized in which sub-bands are scheduled based on the NBId. This may prevent in frequency flat fading because all eNBs may pick the same sub-bands as cell edge bands.

With respect to bounds on P, it may be beneficial to avoid the condition of P=0 since this may cause stability problems, as well as a linear loss on capacity. Further, reducing P to a minimal value (δ) may lead to a logarithmic loss in capacity.

In one embodiment, a hybrid-centralized implementation of the CPS algorithm may be considered in a network that has an multi-system co-processing unit (e.g. eCoordinator™). The eCoordinator™ may virtualize the network by effectively acting as a global scheduler. An algorithm is set forth that may operate similar to the power control implemented in Universal Mobile Telecommunications System (UMTS), where the eCoordinator™ does a large scale power control [similar to a radio network controller (RNC)] and each eNB does a small scale power adjustment similar to the eNB. The eCoordinator™ may set the global power targets that are independent of fading, and the eNB may set an adjusted local target that is dependent on fast fading.

In such an algorithm, the CPS algorithm may be run on the eCoordinator™. The eCoordinator™ may receive RSRP measurements from all the eNBs. It may then construct the SINRs for every UE given every power level used by every eNB in the cluster. It may then run the CPS algorithm many iterations (e.g. it may converge within 1000 virtual time slots, etc.) to determine every power level of every eNB on every sub-band. Such power levels may then be sent to each eNB. Each eNB may then use these eCoordinator™ power levels as an initial condition and then run regular distributed CPS.

In one embodiment, the distributed CPS may then set the powers based on the fast fading conditions (due to CQI reports), while the centralized CPS method may set the powers based on the more stable RSRP reports, while taking a global view. The eCoordinator™-based method may not necessarily need to focus on stability nor with convergence, since it may solve the global optimization problem directly.

With respect to fast fading, the power gradient calculation may be consulted:

$$\frac{\partial S_{in}}{\partial P_{nk}} = \begin{cases} +\dfrac{S_{in}}{P_{nm}} & \forall\, i \in l(m) \\ -\dfrac{S_{in}^2}{P_{nm}} \dfrac{G_{ik}}{G_{im}} & \text{otherwise} \end{cases} \qquad \text{Equation 9}$$

where a $UE_i$ may be served by $NB_m$ and may receive interference from a $NB_k$. Such an equation can be rewritten where the serving and interfering gradient terms consist of a common term (C), while the interfering gradient has an additional term of $$S_{in}\frac{G_{ik}}{G_{im}}:$$

$$\frac{\partial S_{in}}{\partial P_{nk}} = \begin{cases} +C & \forall\, i \in l(k) \\ -C\left(S_{in}\dfrac{G_{ik}}{G_{im}}\right) & \text{otherwise} \end{cases} \qquad \text{Equation 10}$$

In one embodiment, in the presence of fading, the gradient term $$\left(\frac{\partial S_{in}}{\partial P_{nk}}\right)$$

may become extremely negative (i.e. far from zero). However, a possible feature of the present algorithm is for all gradients to converge to zero, indicating that an optimum has been achieved. In other words, multiple iterations of the algorithm may result in the gradients converging at an apex of the network utility curve as set forth in FIG. 1B (where network utility is optimized), as previously described. However, oscillations may be observed and some gradients may become very large negative. It can be noted from Equation 10 that the occasions when the gradient goes much more negative than positive, may occur when $$S_{in} \frac{G_{ik}}{G_{im}} \gg 1. \qquad \text{Equation 11}$$

As such, Equation 11 applies to when the SINR is large and while the interfering cell node is close to $UE_i$. In other words:

$$\frac{G_{ik}}{G_{im}} \to 1. \qquad \text{Equation 12}$$

However, this may be construed as a contradiction, because if $G_{ik} \to G_{im}$, it may mean that $UE_i$ is a cell edge UE, and therefore the SINR must be small. Such a contradiction may occur due to fast fading (e.g. the UE can be temporarily in a good fade with the serving $NB_m$ and a weak fade with the interfering $eNB_k$). However, given the presence of fast fading, the corrected additional term may include:

$$S_{in} \frac{h_k G_{ik}}{h_{in} G_{im}}, \qquad \text{Equation 13}$$

where the fast fading term may be represented by the $h_k$ terms. From the derivation above, $G_{ik}$ and $G_{im}$ may represent the combined path loss and channel gain information. Then, in the presence of frequency selective fading:

$$\frac{\overline{G}_{ik}}{\overline{G}_{im}} = \frac{G_{ik}}{G_{im}} \frac{h_{ik}}{h_{im}} = \frac{G_{ik}}{G_{im}} G_{adj} \qquad \text{Equation 14}$$

where $G_{adj}$ may represent the (unknown at the eNB) fast fading signal-to-interference ratio (SIR) considering only $NB_k$. In additive white gaussian noise (AWGN), $G_{adj}=1$, however, under fading condition typically $G_{adj} \neq 1$. However, one problem which may surface may include how to estimate $G_{adj}$ at the eNB based on available signaling information.

If it is assumed that a UE may be a cell edge UE, the interference may be dominated by a specific $eNB_k$. As such, the inverse of this $G_{adj}$ ratio may be approximated as:

$$\frac{h_m G_{im}}{h_k G_{ik}} \approx WBCQI, \qquad \text{Equation 15}$$

where a wideband CQI (WBCQI) may represent a reported wideband CQI. Therefore, one solution may be to update the current path gain ratio (in the Gradient calculation) as such:

$$\frac{G_{ik}}{G_{im}} = \frac{G_{ik}}{G_{im}} \frac{WBCQI(\text{slow})}{WBCQI(\text{fast})}. \qquad \text{Equation 16}$$

where the WBCQI report may be either reported or estimated based on the sub-band CQI reports. More specifically, the long term WBCQI include:

$$WBCQI(\text{slow}) = \frac{G_{im}}{\sum_{k \neq m} G_{ik}}, \qquad \text{Equation 17}$$

which may be valid as long as all eNBs use approximately the same power, and that the UE is interference limited.

Further, $G_{adj}$ may be estimated based on available CQI and RSRP report information. Without loss of generality, user i may include serving base station m. The instantaneous SINR of this user is given by:

$$SINR_i = \frac{P_m G_{im} h_{im}}{N_0 + \sum_{k \neq m} P_k G_{ik} h_{ik}} \qquad \text{Equation 18}$$

In one embodiment, $RSRP(k)=P_k G_{ik}$ may include a long term average of the received signal power from $eNB_k$ and may be reported by the UE as RSRP(k). Additionally, the RSRP and the $CQI_i$ may be based on the Common Reference Signal (CRS) power which may be different to the physical downlink shared channel (PDSCH) power. As such, the reported CQI may be given by:

$$CQI_i = \frac{RSRP(m) h_{im}}{N_0 + \sum_{k \neq m} P_k G_{ik} h_{ik}} \qquad \text{Equation 19}$$

The instantaneous SINR may differ from the reported CQI by a factor:

$$CQI_i = SINR_i \frac{P_{CRS}}{P_{PDSCH}}. \qquad \text{Equation 20}$$

A first order approximation may be that the $P_k h_{ik}$ interfering terms can average out such that:

$$\sum_{k \neq m} P_k G_{ik} h_{ik} \approx \sum_{k \neq m} RSRP(k). \qquad \text{Equation 21}$$

Therefore, the instantaneous channel condition can be estimated as:

$$\hat{h}_{im} = CQI_i \frac{N_0 + \sum_{k \neq m} RSRP(k)}{RSRP(m)}. \qquad \text{Equation 22}$$

$G_{adj}$ may then be estimated as:

$$\hat{G}_{adj} = \frac{\hat{h}_{ik}}{\hat{h}_{im}} = \frac{1}{\hat{h}_{im}} = \frac{RSRP(m)}{CQI_i (N_0 + \sum_{k \neq m} RSRP(k))} \qquad \text{Equation 23}$$

Two approximations may be made where 1) $h_{ik}=1$ and 2) $P_k=P_{CRS}$. In one embodiment, such approximations may be true when large samples exist from interfering cell nodes and multiple users. The estimated $\hat{G}_{adj}$ may be more accurate if the approximations are accurate (e.g. in 57 cell nodes case 1, etc. scenarios), but it may not be so accurate for small cases.

Figure 3:
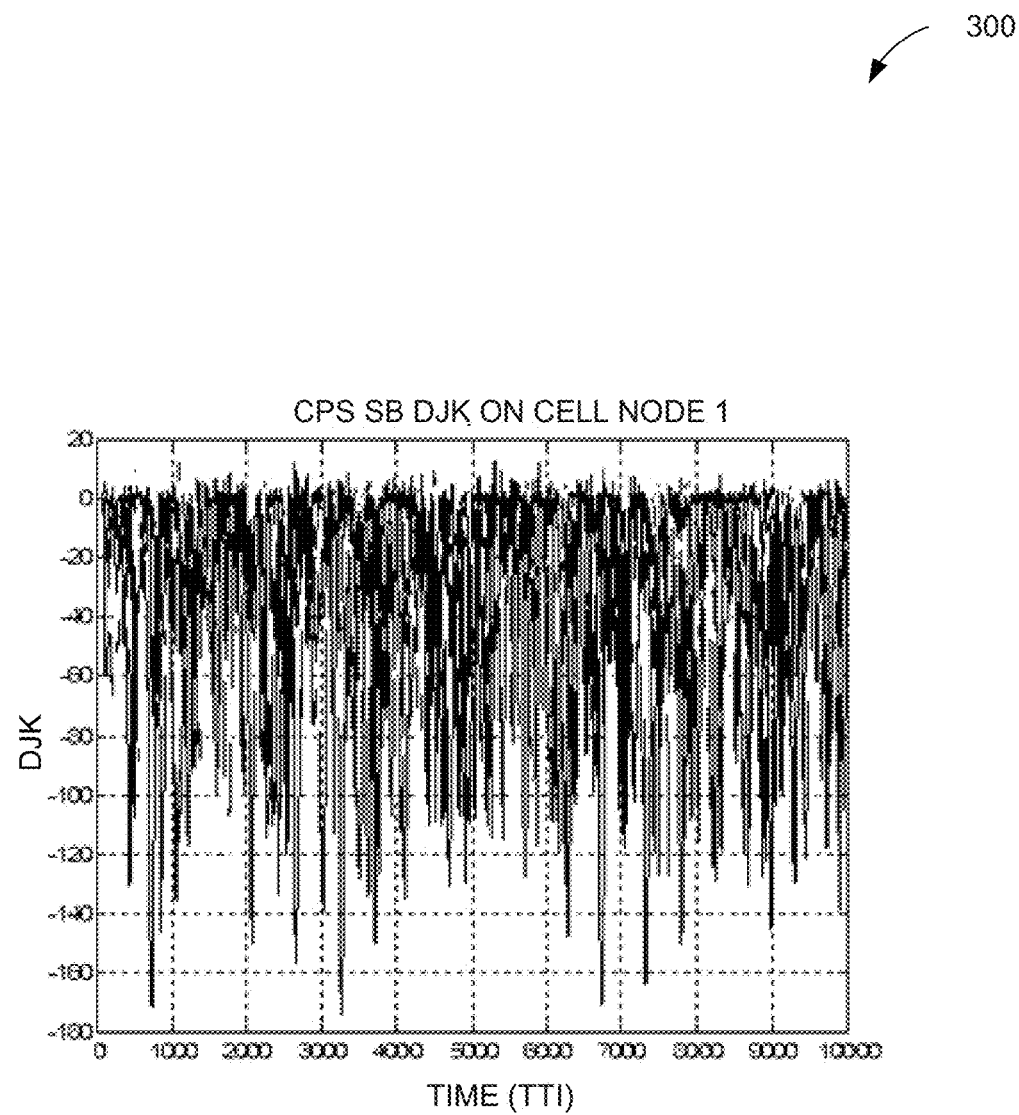
FIG. 3 illustrates a plot without an adjacent gradient (Gadj) estimation, in accordance with one embodiment.

FIG. 3 illustrates a plot 300 without a Gadj estimation, in accordance with one embodiment. As an option, the plot 300 may reflect an operation of any one or more of the embodiments set forth in any previous and/or subsequent figure(s) and/or description thereof. However, it is to be appreciated that the plot 300 may reflect an operation of any desired environment.

In one embodiment, with respect to an implementation, two (2) switch settings may be implemented. This switch setting may be applicable to an eCoordinator™-based CPS implementation, and for scenarios where a X2 link is used to exchange instantaneous sub-band power levels. When the setting "Neighbor Power Switch" is on, neighbor cell node powers may be taken into account during $G_{adj}$ computation in a CPS virtual scheduler. Additionally, for a real scheduler, eNB may calculate SINR with known neighbor cell node powers. To contrast, when "Neighbor Power Switch" is off, both the CPS virtual scheduler $G_{adj}$ calculation and the real scheduler SINR calculations may be performed without making use of neighbor cell node powers information.

With respect to Gadj simulation results, Gadj variations in simulations may confirm significant positive impact on CPS performance. For example, among different Gadj variations, Gadj PDSCH may work the best in most cases. As shown, the plot 300 includes an example of Gadj impact for Case 1 under slow fading. It can be observed that the Djk has very big negative values, which drives the sub-band (SB) power to a lower bound, and total cell node power is very low (i.e. abnormal).

Figure 4:
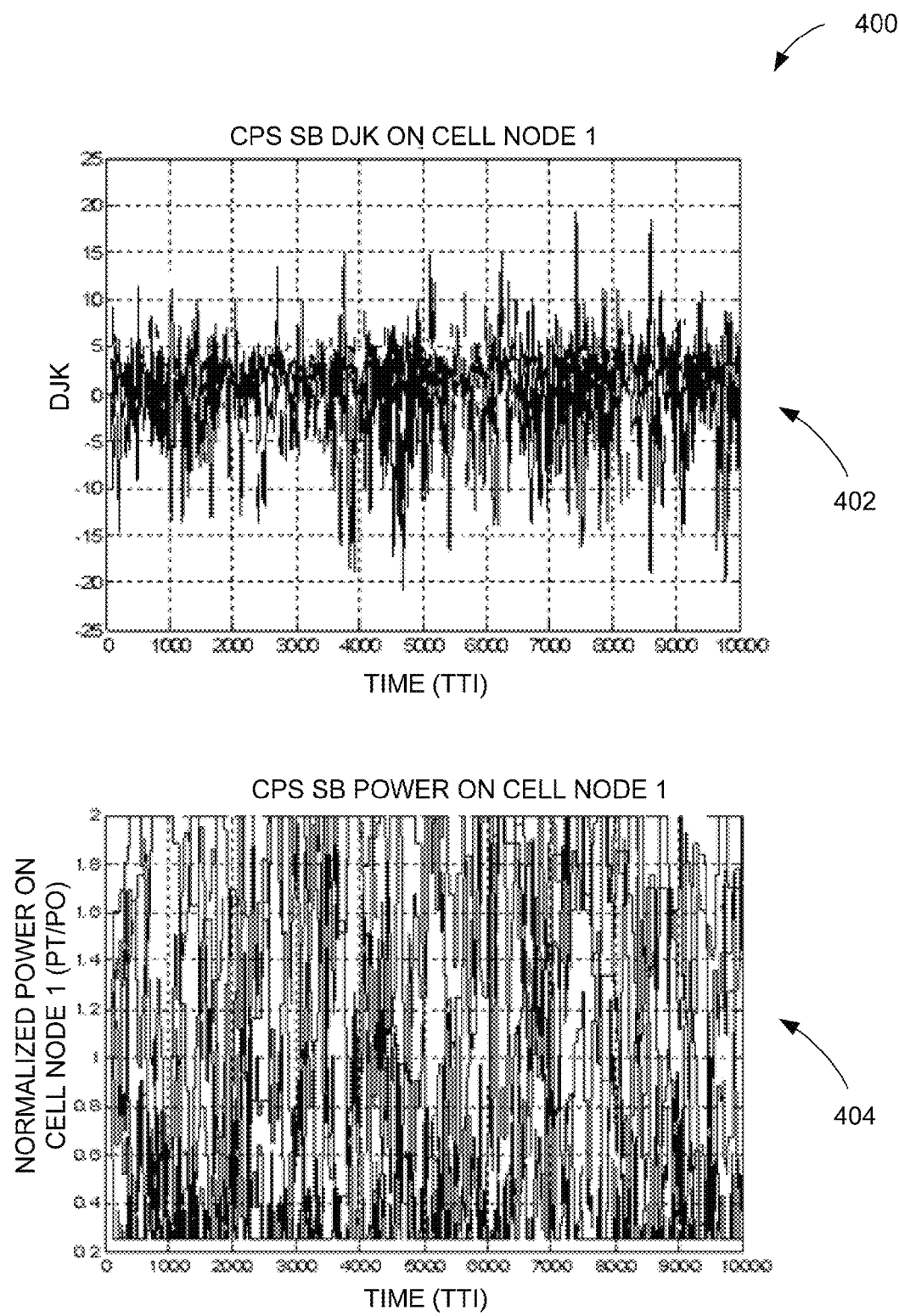
FIG. 4 illustrates a plot with a Gadj physical downlink shared channel (PDSCH), in accordance with one embodiment.

FIG. 4 illustrates a plot 400 with a Gadj PDSCH, in accordance with one embodiment. As an option, the plot 400 may reflect an operation of any one or more of the embodiments set forth in any previous and/or subsequent figure(s) and/or description thereof. However, it is to be appreciated that the plot 400 may reflect an operation of any desired environment.

As shown, a plot 402 relates to CPS SB DJK on Cell node 1 and includes a plot of Djk calculations which fluctuates less (in comparison to the plot 300) and revolves more around 0. Additionally, a plot 404 relates to CPS SB Power on Cell node 1, and includes a plot where the SB power fluctuates according to fading channels.

In simulation results, G results may include options to validate the effects of Gadj, including where: (1) Gadj: Constant (i.e. Without Gadj estimation (i.e. Gadj=1)); (2) Gadj: PDSCH; and (3) Case 1 570 Cell nodes with GAdj=Const & PDSCH.

Figure 5:
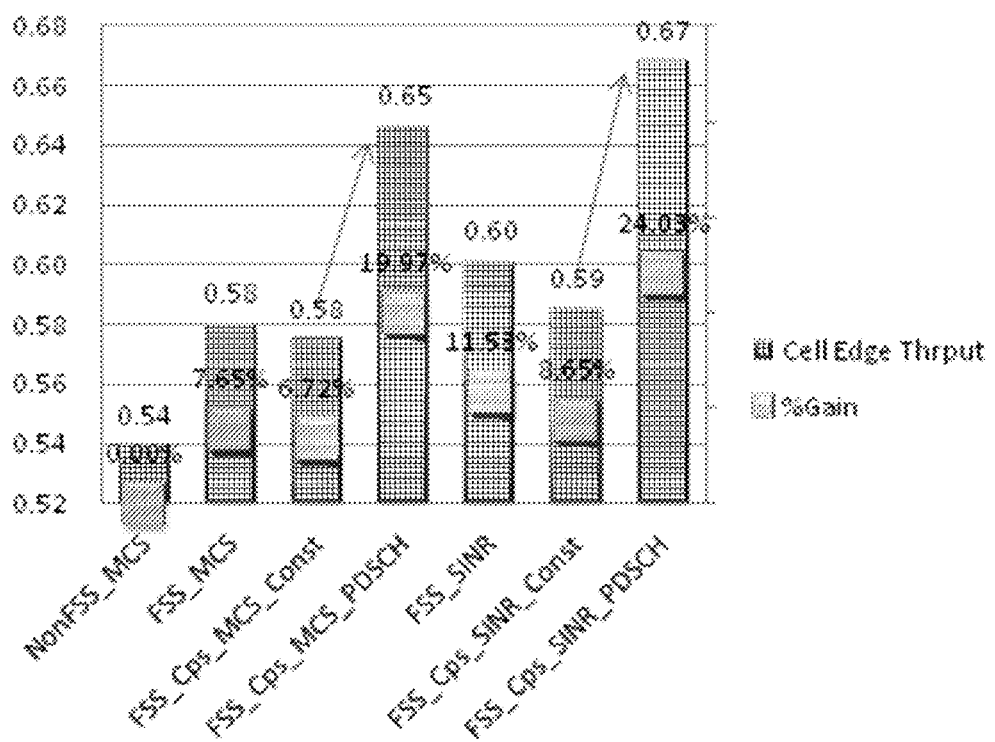
FIG. 5 illustrates a plot with cell edge improvements with a Gadj PDSCH, in accordance with one embodiment.

FIG. 5 illustrates a plot 500 with cell edge improvements with a Gadj PDSCH, in accordance with one embodiment. As an option, the plot 500 may reflect an operation of any one or more of the embodiments set forth in any previous and/or subsequent figure(s) and/or description thereof. However, it is to be appreciated that the plot 500 may reflect an operation of any desired environment.

As shown, the plot 500 shows cell edge throughput with Gadj PDSCH over constant. In one embodiment, the cell edge may be improved by use of the CPS algorithm by using Gadj=PDSCH over Gadj=Const for a spatial channel model extended (SCME) channel for case 1.

Figure 6:
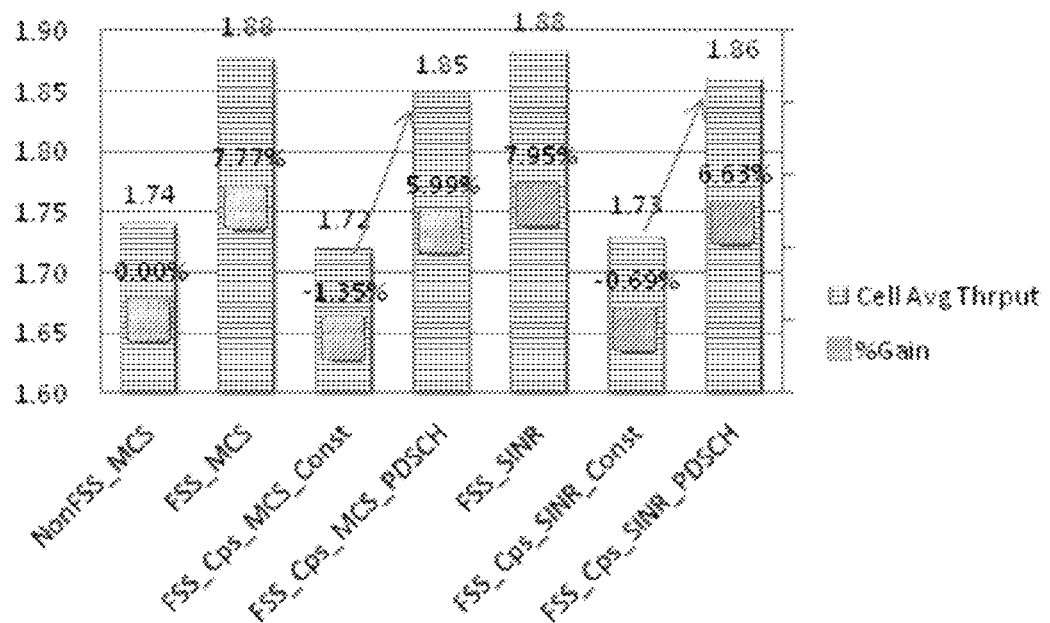
FIG. 6 illustrates a plot with cell node average improvements with a Gadj PDSCH, in accordance with one embodiment.

FIG. 6 illustrates a plot 600 with cell node average improvements with Gadj PDSCH, in accordance with one embodiment. As an option, the plot 600 may reflect an operation of any one or more of the embodiments set forth in any previous and/or subsequent figure(s) and/or description thereof. However, it is to be appreciated that the plot 600 may reflect an operation of any desired environment.

As shown, the plot 600 shows cell node average throughput with a Gadj PDSCH over constant. In one embodiment, the cell node average may be improved by use of the CPS algorithm by using Gadj=PDSCH over Gadj=Const for the SCME channel for case 1.

In one embodiment, it may be given that each eNB knows the power levels of every other eNB. Therefore, such information may be used to estimate the Gadj as follows:

$$G_{adj} = \frac{G_{im} P_{in}}{CQI_i \left( No + \sum_{k \neq m} P_k G_{ik} \right)},$$ Equation 24 and $$G_{adj} = \frac{RSRP_{im} P_{offset,m}}{CQI_i \left( No + \sum_{k \neq m} P_{offset,k} RSRP_{ik} \right)}.$$ Equation 25

Gadj may be rewritten as follows:

$$G_{ad} = \frac{SINR_{lt}}{SINR_{st}}$$ Equation 26

Additionally, if $SINR_{st} = CQI_i$, this may be the PDSCH SINR, which may be represented in short term SB SINR as:

$$SINR_{st} = CQI_{PDSCH,i}$$ Equation 27:

Further, $SINR_{lt}$ may represent long term averaged SINR as:

$$SINR_{lt} = \frac{RSRP_{im}}{No + \sum_{k \neq m} RSRP_{ik}}$$ Equation 28 where "No" is thermal noise floor (constant at −174 dBm/Hz).

In other embodiments, gradient calculations in CPS may be impacted by multi code word CQI signaling. For example, this modification may be correct for rank 1 and rank 2 transmissions where the number of codewords equal the number of layers. Therefore, it may be suitable for 2×2 and 4×2 systems. In order to improve the reliability of CQI reports, a codebookSubsetRestriction parameter may be used to force certain low geometry UEs to rank 1.

A UE operating in TM4 may report two (2) CQIs (one per codeword) when its rank indicator (RI) is larger than 1. Additionally, the basic CPS derivation may be for a single-input-single output (SISO) channel model, and therefore may only accept a single CQI or SINR. Such may need to be modified to accommodate a multi codeword CQI. In one embodiment, the SINRs that map to the two (2) CQIs of the two (2) codewords may be represented as $S_1$ and $S_2$. For higher rank UEs, the SINRs may be combined as mutual information in the following format of Equation 29 where the multiple-codeword CQI is converted to a single-codeword CQI before the cell node gradient information is generated.

$$S_{in} = 2^{log2(1+S_1) + log2(1+S_2)} - 1 = (1+S_1)(1+S_2) - 1 = S_1 + S_2 + S_1 S_2$$ Equation 29:

then the rate fed into the virtual scheduler during a virtual iteration may then be correct at:

$$R_{in} = \log_2(1 + S_{in}) = R_1 + R_2.$$  Equation 30:

It should be noted that Equation 20 may remain correct even when $S_2 = 0$, as in the case of a rank 1 transmission. Additionally, in one embodiment, a virtual scheduler may be used to select a user with the highest priority in a current virtual iteration. Further, if the utility function is U=log (X_i), then the priority=R_in/X_i, where R_in may be defined in Equation 30.

In one embodiment, the gradient calculation may be modified. The base general gradient calculation with respect to power (i.e. Dj) may include:

$$\frac{\partial U}{\partial P_{nk}} = \sum_i \frac{\partial U_i}{\partial X_i} \cdot \frac{\partial X_i}{\partial S_{inl}} \cdot \sum_{l=1}^{L} \frac{\partial S_{inl}}{\partial P_{nk}}.$$  Equation 31

Each partial derivative may be described individually. Note that $$\frac{\partial U}{\partial X_i}$$

may depend on the specific utility function, but for a proportional fair utility, it may be represented as $$\frac{\partial U}{\partial X_i} = \frac{1}{X_i}.$$

The other two terms from Equation 33 may be represented as:

$$\frac{\partial X_i}{\partial S_{inl}} = \frac{\phi_{in}}{\log(2)} \cdot \frac{1}{(1 + S_{inl})},$$  Equation 32 and $$\frac{\partial S_{inl}}{\partial P_{nk}} = \begin{cases} +\dfrac{S_{inl}}{P_{nk}} & \forall\, i \in |(k) \\ -\dfrac{S_{in}^2}{P_{nm}} \dfrac{G_{ik}}{G_{im}} & \forall\, i \notin |(k),\, i \in |(m) \end{cases}.$$  Equation 33

Such modifications therefore may include replacing all instances of $S_{in}$ with $S_{in1}$, and all instances of $P_{nk}$ with $$\frac{P_{nk}}{L},$$

where L is the transmission rank. Therefore:

$$\frac{\partial X_i}{\partial S_{inl}} = \frac{\phi_{in}}{\log(2)} \cdot \frac{1}{(1 + S_{inl})},$$  Equation 34 and $$\frac{\partial S_{inl}}{\partial P_{nk}} = \begin{cases} +L\dfrac{S_{inl}}{P_{nk}} & \forall\, i \in |(k) \\ -L\dfrac{S_{inl}^2}{P_{nm}} \dfrac{G_{ik}}{G_{im}} & \forall\, i \notin |(k),\, i \in |(m) \end{cases}$$  Equation 35

In one embodiment, with respect to power control on a multi-codeword system, the CQI report may be based on one power level (e.g. C-RS power), while the PDSCH SINR may be based on another power level (e.g. PDSCH power). However, it may be necessary to determine the PDSCH SINR from a CQI report and other apriori information. As such, without loss of generality, the definition of SINR on the 1st layer (on a rank 2 transmission) may include:

$$S_{in1} = \frac{P_{in} G_{im} |w' h_{im1}|^2}{I_0 + P_{in} G_{im} |w' h_{im2}|^2}$$  Equation 36 where $I_o$ may be the total inter-cell node interference, w may be the receiver [typically minimum-mean-square-error (MMSE)] combiner, $h_{im1}$ may be the precoded channel for the serving layer and $h_{im2}$ may be the precoded channel for the interfering layer. Additionally, $$S_{in1}(P_{pdsch}) \ne S_{in1}(P_{crs}) \frac{P_{pdsch}}{P_{crs}},$$

as is the case for the rank one transmission, due to the presence of the intra-cell node interference term $P_m G_{im} |w' h_{im2}|^2$. Specifically the SINRs for the two (2) codewords can be represented as:

$$S_{in1} = \frac{|w_1^H h_{im1}|^2}{\dfrac{I_0}{P_m G_{im}} + |w_1^H h_{im2}|^2}$$  Equation 37

$$S_{in1} = \frac{x_{11}}{x_0 + x_{12}},$$  Equation 38 and $$S_{in2} = \frac{|w_2^H h_{im2}|^2}{\dfrac{I_0}{P_m G_{im}} + |w_2^H h_{im1}|^2}$$  Equation 39

$$S_{in2} = \frac{x_{22}}{x_0 + x_{21}}.$$  Equation 40

In view of the foregoing equations, there are a total of two (2) equations and five (5) unknowns ($x_{11}, x_{22}, x_{21}, x_{12}, x_0$), and, as such, it may be necessary to rely on some a-priori information. It may be possible to estimate:

$$\hat{x}_0 = E\{x_0\} = \frac{I_0}{P_m G_{im}}.$$  Equation 41

Additionally, it may be known that:

$$\hat{x}_0 = E\{x_0\} = \frac{N_0}{P_m G_{im}} + \sum_{k \ne m} \frac{P_k G_{ik}}{P_m G_{im}}.$$  Equation 42 where $\hat{x}_0$ was used in the calculation of Gadj as well.

In one embodiment, simple scaling of the CQI may be a sufficiently accurate estimate of the PDSCH SINR given that the rank 2 SINRs are sufficiently high. This may be true for both MMSE and successive interference cancellation (SIC) receivers. Generally, rank 1 SINRs may have a lower variance (and therefore are more reliable) over time versus rank 2 SINRs. As such, it may be preferred to use the codebookSubsetRestriction to force a UE to a rank 1, given a certain level of $I_0$ as represented by Equation 42.

Figure 7:
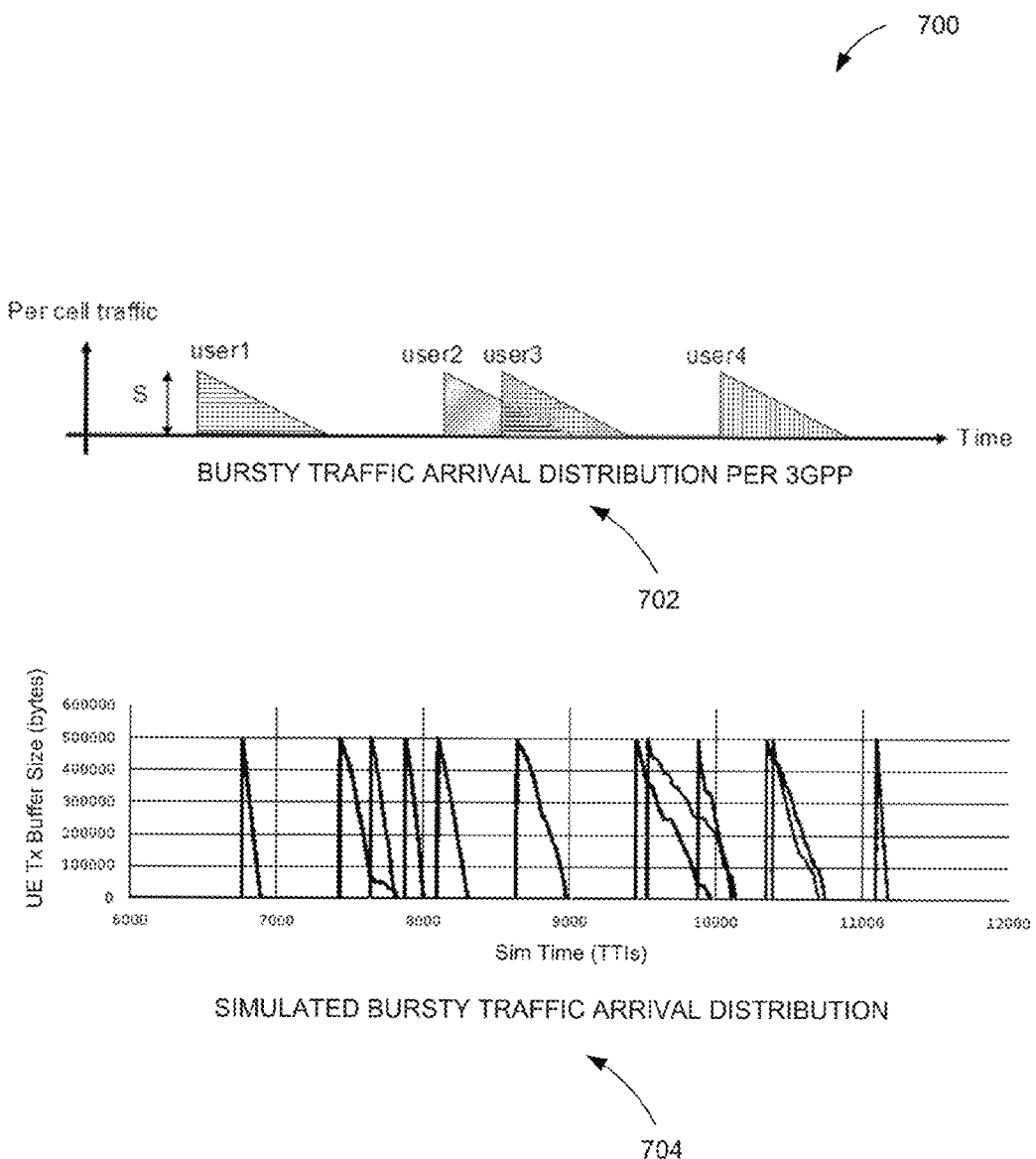
FIG. 7 illustrates a bursty traffic arrival distribution, in accordance with one embodiment.

FIG. 7 illustrates a bursty traffic arrival distribution 700, in accordance with one embodiment. As an option, the bursty traffic arrival distribution 700 may reflect an operation of any one or more of the embodiments set forth in any previous and/or subsequent figure(s) and/or description thereof. However, it is to be appreciated that the bursty traffic arrival distribution 700 may reflect an operation of any desired environment.

The current CPS algorithm may apply to a static network state (e.g. where NBs may have a constant load). However, in another embodiment, a network state may change dynamically where users have a certain arrival and departure rate (i.e. bursty traffic state), as shown in item 702. Additionally, based on simulations using the 3GPP bursty traffic models, a NB may have no users to schedule, as shown in items 702 and 704.

In one embodiment, in the situation where a NB does not have a buffer status, three approaches may work, including but not limited to: (1) a snapshot view where the network state may be represented only by UE's with active buffers; (2) a long term view where the network state may be represented by active UE (irrespective of buffer status); and/or (3) adaptive view where the network state may be represented by active UEs, (irrespective of buffer status), but adapt filtering constants ($\beta_1$) and power step sizes ($\delta_x$) based on buffer status.

Additionally, the dynamic nature of the network state may impact the current CPS algorithm, including power and gradient information, as well as potential SINR fluctuations. In one embodiment, it may be necessary to determine how the power state and Dj parameter are kept constant (i.e. frozen) while the buffers are empty (as opposed to simply resetting such factors). To determine how they are kept constant, the network utility can be maximized:

$$U(X) = \sum_i U(X_i) \qquad \text{Equation 43}$$

where the i may represent the UEs with active buffers, since the UEs without buffers do not contribute any utility to the network. Additionally, the power gradients may be calculated assuming the $P_k > 0$. However, when a NB has no data, then $P_k = 0$ and may no longer be included in the cooperating cluster.

In one embodiment, when a NB has an empty buffer, it may not receive any positive Dj values, since the virtual scheduler will stop. However, the NB may still receive negative Dj values from eNBs with data. This may force the eNB to move to a lower power state (e.g. decrease $P_{nk}$), even though it may not use the power (and therefore does not impact the network utility by doing so). However, in one embodiment where the eNB suddenly receives data, it may start from a very low $P_{nk}$ state and have to grow slowly, thereby potentially penalizing UEs. Further, the eNB may negatively impact neighboring eNBs because it may not have data at such a stage.

With respect to a snapshot view, Djk may be set to 0 (which is equivalent to not updating power and freezing the power state). Additionally, a pure snapshot mode may include freezing the power state and freezing the update of Dj, in addition to not sending/receiving Dj messages to/from other eNBs. In such a state, when data arrives, the eNB may start from exactly where it stopped in terms of power state and a state of Dj. However, in such a situation, the eNB may be prevented from moving back to a reference state.

As such, in one embodiment, the snapshot view may be used when the buffers are empty to: 1) stop a eNB from sending negative Dj values; 2) freeze power updates; and/or 3) freeze updating Dj.

With respect to an adaptive view, the power state and/or the Djk state may not be frozen, but the ($\beta_x$) and power step sizes ($\delta_x$) parameters may be modified depending on the buffer status. In view of such, pure adaptive view may include setting dLdP=0 which may gradually reduce the negative Dj sent to other eNBs. Additionally, if the power is updated, then the Djk may be negative, in which case the power state may be lowered. Further, if power is not updated, then the power state may be frozen, but the Dj state may become negative. Additionally, adaptive view may include setting $\beta_1 = 0.01$ during normal times, and setting $\beta_1 = 0.1$ during empty buffer periods.

Figure 8:
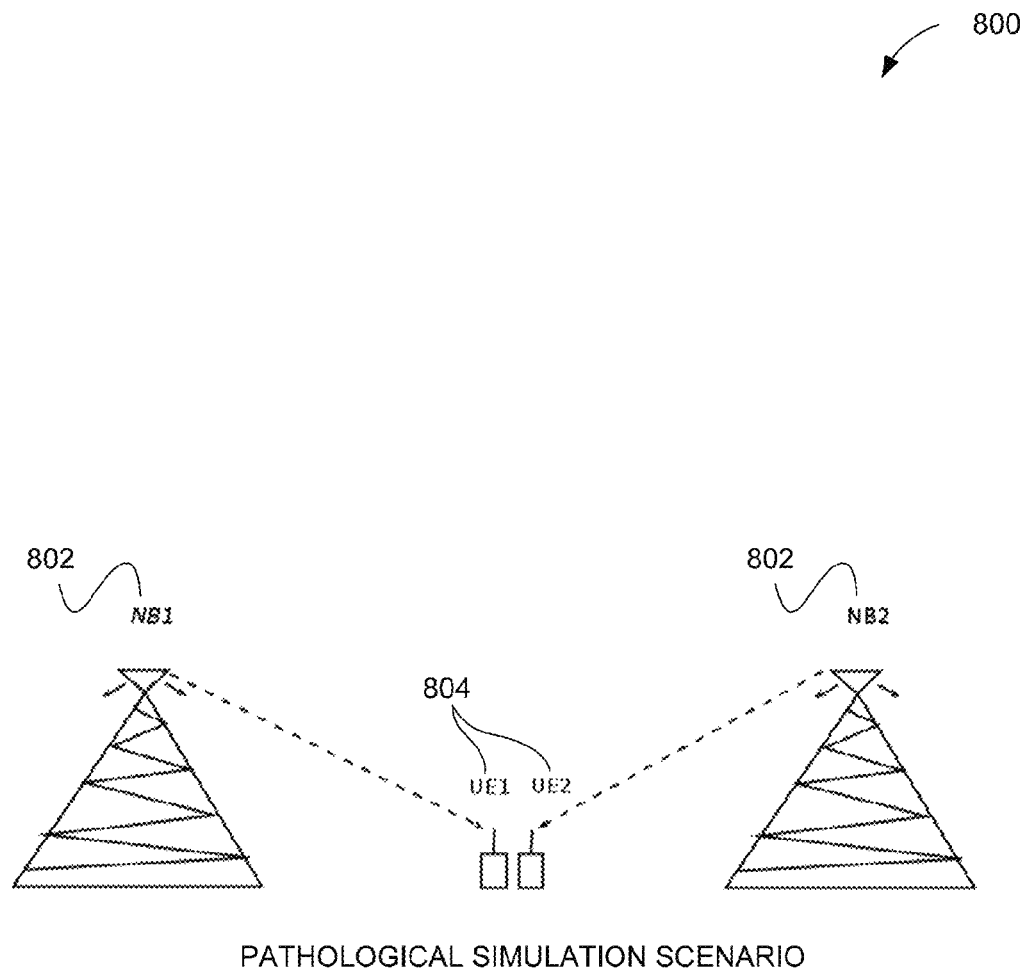
FIG. 8 illustrates a simulation scenario for full buffer modeling of a buffer state, in accordance with one embodiment.

FIG. 8 illustrates a simulation scenario 800 for a full buffer modeling of a buffer state, in accordance with one embodiment. As an option, the simulation scenario 800 may be implemented in the context of any one or more of the embodiments set forth in any previous and/or subsequent figure(s) and/or description thereof. However, it is to be appreciated that the simulation scenario 800 may be implemented in the context of any desired environment.

In one embodiment, the concept of small packet compensation may be implemented. Due to the bursty nature of the traffic, interfering NBs may switch off (or on) their PDSCH powers. This may change the SINR experienced by UEs in a neighboring cell node. In one embodiment, network utility may be improved if a NB were to suddenly switch on its power (thereby clear its buffer status as soon as possible), and then switch it off again. In another embodiment, the NB may transmit continuously at a lower power and thereby increase the (yet tolerable) delay in order to stabilize the CQI reporting in neighboring cell nodes.

Additionally, the CPS algorithm may utilize a gradient decent approach based on a full buffer modeling of the buffer state. This may include a deterministic model where all NBs transmit all the time given their current power state. To contrast, in a non full buffer scenario, the NBs may not transmit power continuously as determined by their given power state.

As shown, the simulation scenario 800 includes two NBS 802 and two UEs 804. In one embodiment, and for purposes of simplicity, each NB may only have one (1) UE attached to it since this may eliminate the need for a (virtual) scheduler (thereby permitting a focus on the power optimization aspect). In addition, in one embodiment, Orthogonal Frequency-Division Multiple Access (OFDMA) considerations may be ignored, focusing instead on a simple time-slotted system.

In one embodiment, two cell edge UEs 804 with exactly the same SIR under full load, may be positioned halfway between the two NBs 802, with all $G_{ik}$s equal. Additionally, $NB_2$ may be 100% loaded, while $NB_1$ may only have buffer for $\rho$ percent of the time. In view of such, $UE_1$'s SIR may be $S_1 = 0$ dB, while $UE_2$'s SIR may have a binomial distribution such as $S_2: B(1,\rho)$. Additionally, in such an example, $S_2 = 0$ dB may occur with probability $\rho$ and $S_2 = 20$ dB may occur with probability $1-\rho$.

Further, reported gradients may be expressed as:

$$C_{ik} = \frac{S_i}{1+S_i} \frac{1}{X_i P_k} \approx \frac{1}{X_i P_k} \forall S_i > 1 \qquad \text{Equation 44}$$

$$D_j = \begin{cases} +C_{ik} \\ -C_{ik} S_i \end{cases}. \qquad \text{Equation 45}$$

It may be noted that the $D_j$ positive term may be smaller than the negative by a factor of $S_i$ when $S_i>1$. In view of this, the algorithm may aggressively decrease the power and sluggishly increase the power given all else being equal. This may be shown in the $D_{jk}$ calculations for the 2 NBs, where:

$$D_{j1}=C_{11}-C_{22}S_2, \text{ and} \qquad \text{Equation 46:}$$

$$D_{j2}=C_{21}-C_{12}S_1. \qquad \text{Equation 47:}$$

However, when a NB is silent, the neighboring NBs may benefit in that their UEs will collectively report larger SIRs, which may lead to higher reported $D_j$s. This, in turn, may lead to a higher power state which again may lead to higher calculated $D_{jk}$ (i.e. positive feedback). As shown in Equation 44, the positive term of Dj (i.e. the $S_i$ term) may effectively cancel out, while the negative term is quadratic in $S_i$ and thus the $S_i$ may not cancel out. In fact, this additional quadratic term may dominate in the network especially when $S_i>1$ which may occur especially after a low activity period by neighboring eNBs. As such, the heavier loaded NBs may dominate the network, thereby forcing the less loaded NBs to a minimum power state. Additionally, a lightly loaded NB may struggle to recover from such a state especially when its UEs all have small packets and it comes alive for very short bursts of time.

With respect to deterministic CPS, a performance of the reference (no power control) may be compared to a deterministic CPS scheme using simulation results. In one embodiment, the deterministic CPS scheme may be a conventional full buffer CPS scheme except that the following non-full buffer modifications may be inserted during empty buffer periods: (1) the power state is frozen; and/or (2) the gradients $D_j=0$ by only the empty buffer NBs.

Figure 9:
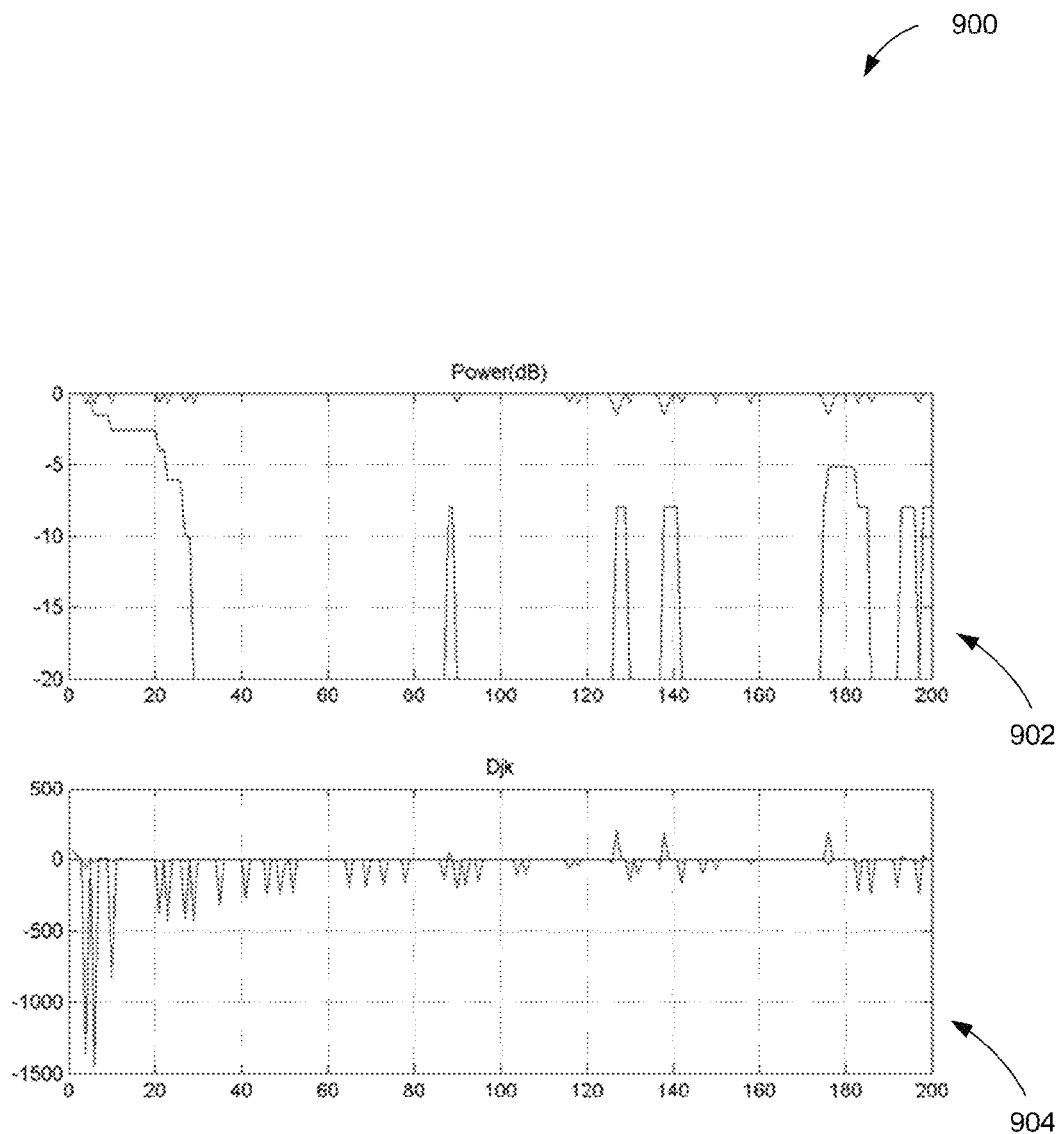
FIG. 9 illustrates a plot of power and power gradient (Djk) for a deterministic coordinated power switching (CPS) case, in accordance with one embodiment.

Simulation code may be used to simulate the comparison, where state==2 may refer to a full buffer state, and state==1 may refer to an empty buffer state. Additionally, only NB$_1$ may experience full/empty buffers in the simulation. Simulation code may include:
function Dj=calcDj(state,S,P,X)
C=S./(1+S)./(X.*P);
Dj(:,1)=C;
Dj(:,2)=-C.*S;
Dj(1,:)=Dj(1,:)*(state==2);
function Djk=calcDjk(state,Dj)
Djk(1)=Dj(1,1)+Dj(2,2)*(state==2);
Djk(2)=(Dj(2,1)+Dj(1,2));

FIG. 9 illustrates a plot 900 of power and Djk for a deterministic CPS case, in accordance with one embodiment. As an option, the plot 900 may reflect an operation of any one or more of the embodiments set forth in any previous and/or subsequent figure(s) and/or description thereof. However, it is to be appreciated that the plot 900 may reflect an operation of any desired environment.

As shown, a plot of power 902 displays a NB's power dropping quickly and staying low. Additionally, a plot of Djk 904 displays NB's Djk remaining predominately negative. In one embodiment, the power of NB may be forced down to a minimum level (e.g. 0) and all future activity may have very little impact on recovering the situation.

Figure 10:
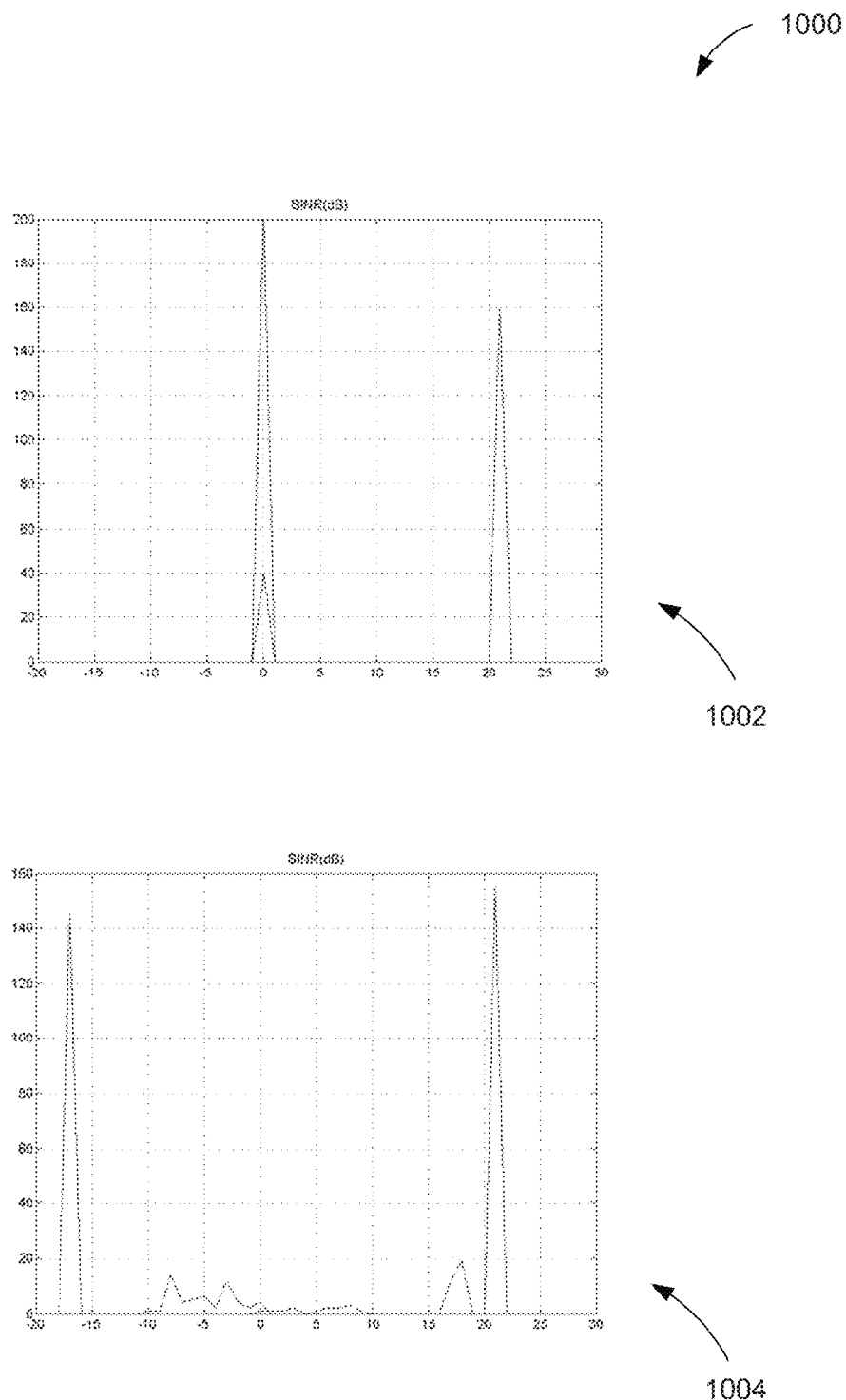
FIG. 10 illustrates a plot of signal-to-interference ratios (SIRs), in accordance with one embodiment.

FIG. 10 illustrates a plot 1000 of SIRs, in accordance with one embodiment. As an option, the plot 1000 may reflect an operation of any one or more of the embodiments set forth in any previous and/or subsequent figure(s) and/or description thereof. However, it is to be appreciated that the plot 1000 may reflect an operation of any desired environment.

The plots 902 and 904 may result in the CQI (PDSCH adjusted) reported SIRs, as shown in plot 1000. As shown, plot 1002 may include a SIR for a reference case where the SIRs are between 0 and 20 dB. Additionally, plot 1004 may include the SIR for deterministic case where, due to power control (as shown in the plot of power 902), SIR may drop to -20 dB.

In one embodiment, a NB may freeze its power state (and report $D_j=0$ to neighbors) when it has empty buffer, as well as when its buffer contains only small packets. Additionally, such a method may freeze the entire network power state while at most only one (1) NB may have large packets in its buffer. However, such a problem may remain when more than k>1 NBs have large buffer packets. In such a situation, heavier loaded NB may dominate the entire network and force all other NBs into a minimum power state.

In view of such, the power state may be reset back to max power after a period of inactivity, a "warm-up" time may be used after buffer growth before a NB starts to adjust its own power state, and/or the up and down power steps may be modified based on a given Djk (which may be similar to Outer Loop Link Adaptation (OLLA) process which may use different step sizes).

With respect to a stochastic CPS, a positive feedback loop may be utilized. For example, given that a neighboring NB may benefit from the silence of another NB, for a once silent NB, when the NB re-enters the network it should compensate its gradient ($D_j$) reports by the same amount that the other NBs benefited from the silence. However, a NB may not know how much neighbors eNBs benefited from its silence. As such, this value of benefit may need to be estimated.

In one embodiment, a simple estimate may include an inversely proportional relationship between the benefit conferred and a NB's activity factor $\rho_k$. For example, every NB may track its own activity factor by calculating an average buffer status over a period of time. This NB may then be entitled to report a modified $\overline{D}_j$, by modifying its gradient $D_j$ as follows:

$$\overline{D}_j = \frac{D_j}{\rho_k}, \qquad \text{Equation 48}$$

which may result in a modified $\overline{D}_{jk}$, as follows:

$$\overline{D}_{j1} = \frac{C_{11}}{\rho_1} - \frac{C_{22}S_2}{\rho_2} \qquad \text{Equation 49}$$

$$\overline{D}_{j2} = \frac{C_{21}}{\rho_2} - \frac{C_{12}S_1}{\rho_1}. \qquad \text{Equation 50}$$

In one embodiment, the modified simulation code for this calculation may include:
function Dj=calcDj(state,S,P,X,rho)
C=S./(1+S)./(X.*P);
Dj(:,1)=C;
Dj(:,2)=-C.*S;
Dj(1,:)=Dj(1,:)*(state==2)/rho;

Given that $\rho_2=1$, and $\rho_1<1$ in this example, an increased probability may result where the instantaneous $\overline{D}_{j1}>0$ and also $\overline{D}_{j2}<0$. In one embodiment, this increased probability may assist in breaking the positive feedback loop.

Figure 11:
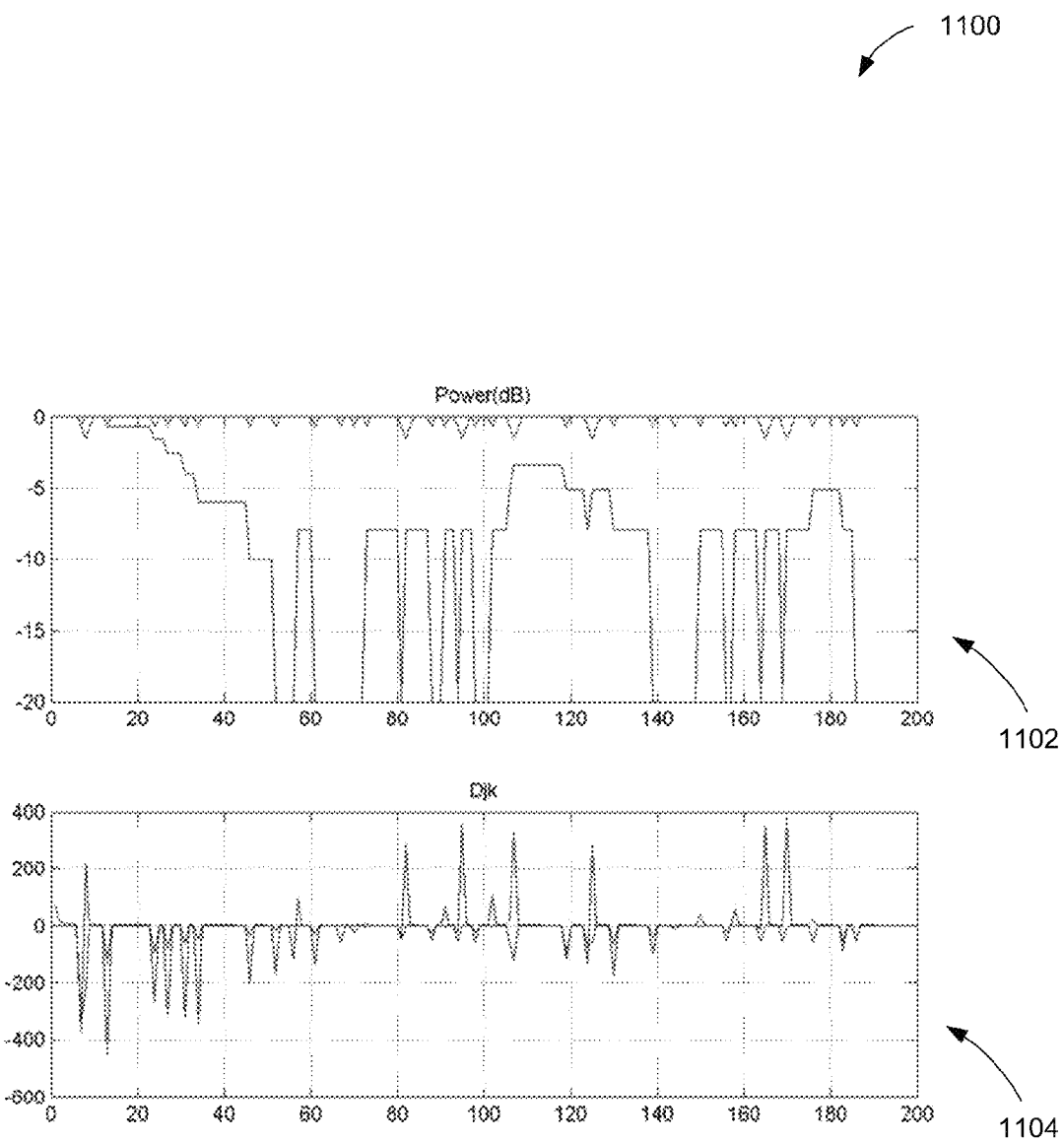
FIG. 11 illustrates a plot of power and Djk for a stochastic CPS case, in accordance with one embodiment.

FIG. 11 illustrates a plot 1100 of power and Djk for a stochastic CPS case, in accordance with one embodiment. As an option, the plot 1100 may reflect an operation of any one or more of the embodiments set forth in any previous and/or subsequent figure(s) and/or description thereof. However, it is to be appreciated that the plot 1100 may reflect an operation of any desired environment.

As shown, a plot of power 1102 may display a NB's power and a plot of Djk 1104 may displays a NB's Djk. In comparing FIG. 11 to FIG. 9, the plot of power in FIG. 11 is larger, resulting in a larger perceived throughput.

Figure 12:
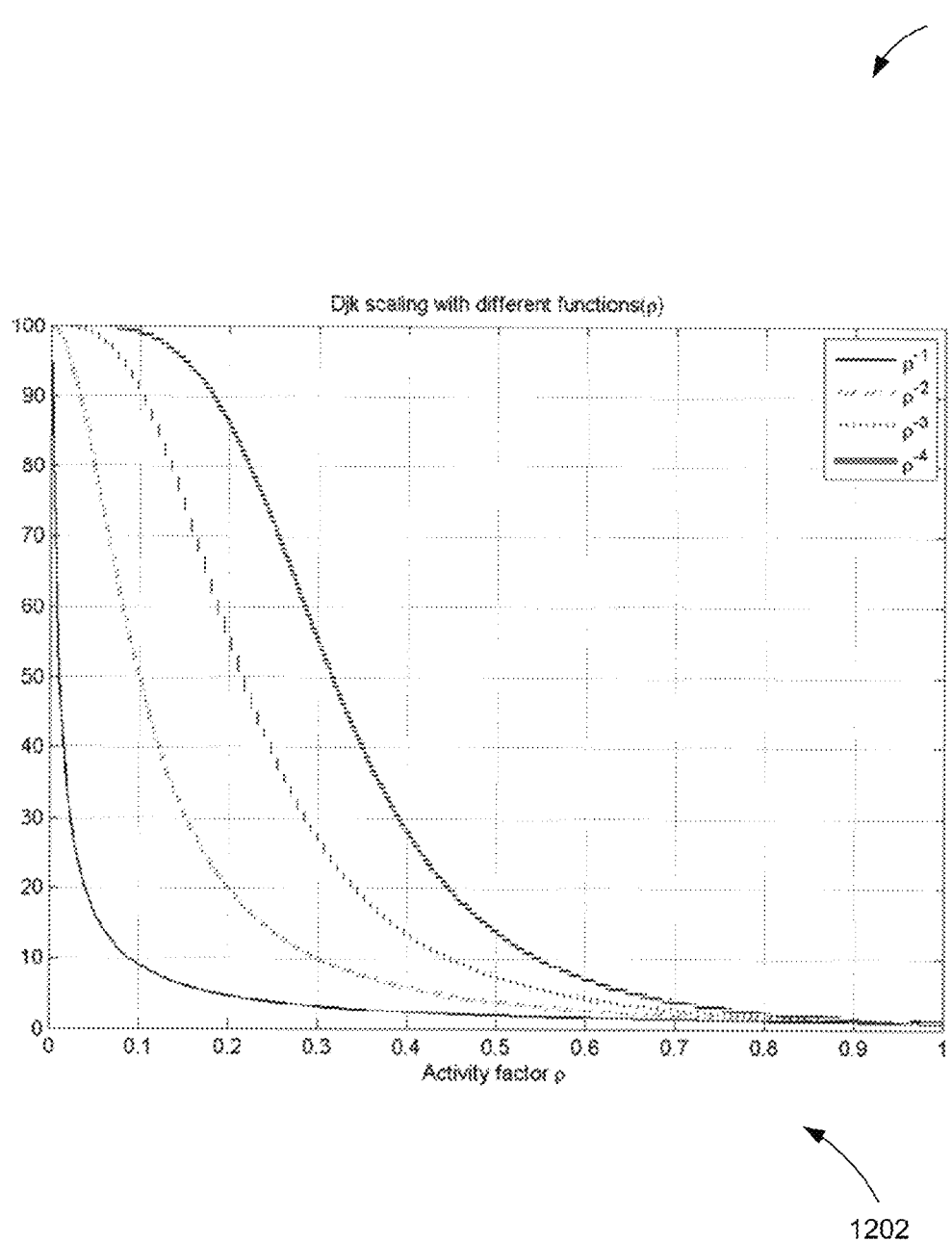
FIG. 12 illustrates a plot of scalings of Djk, in accordance with one embodiment.
Figure 13:
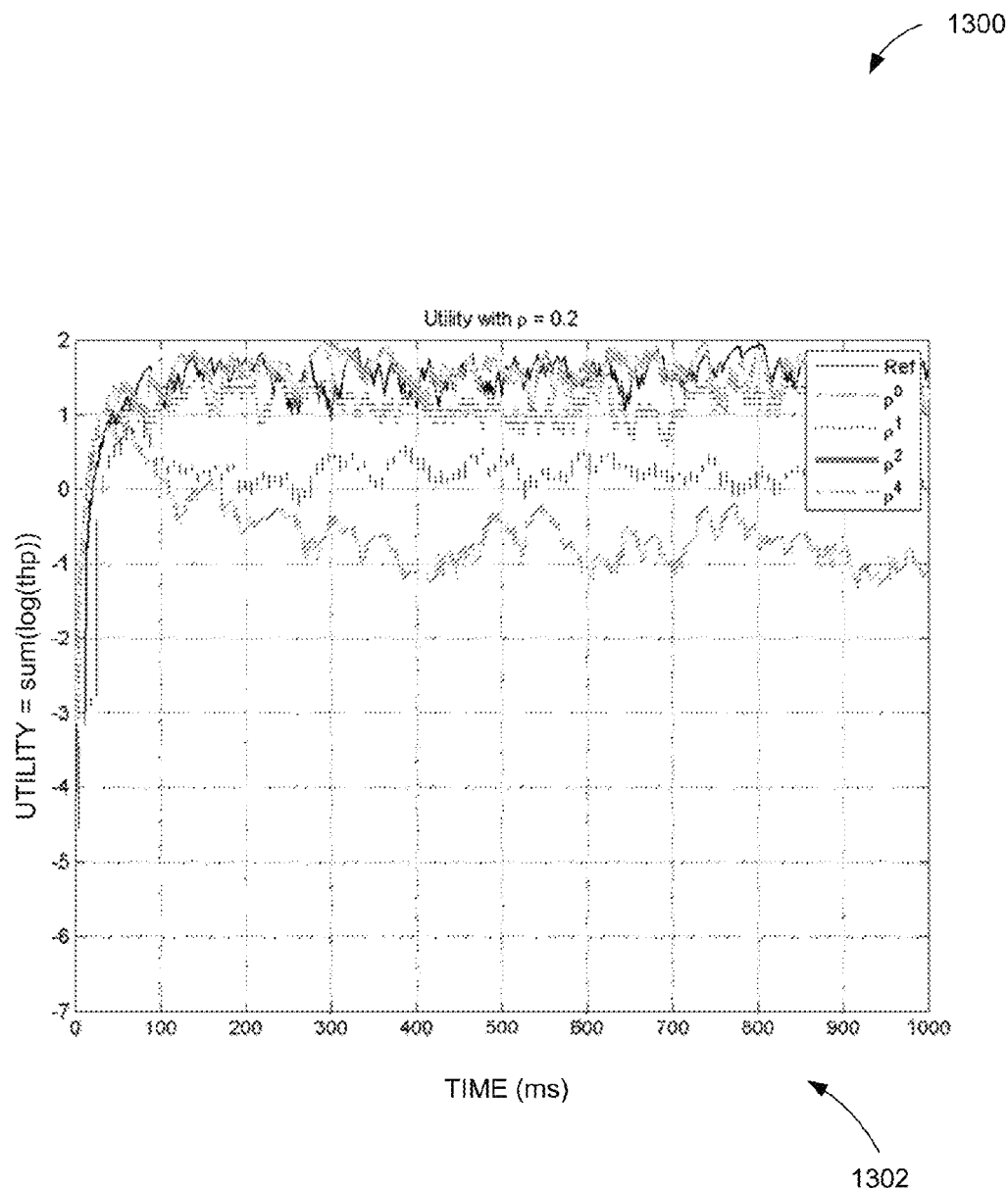
FIG. 13 illustrates a plot of utilities, in accordance with one embodiment.
Figure 14:
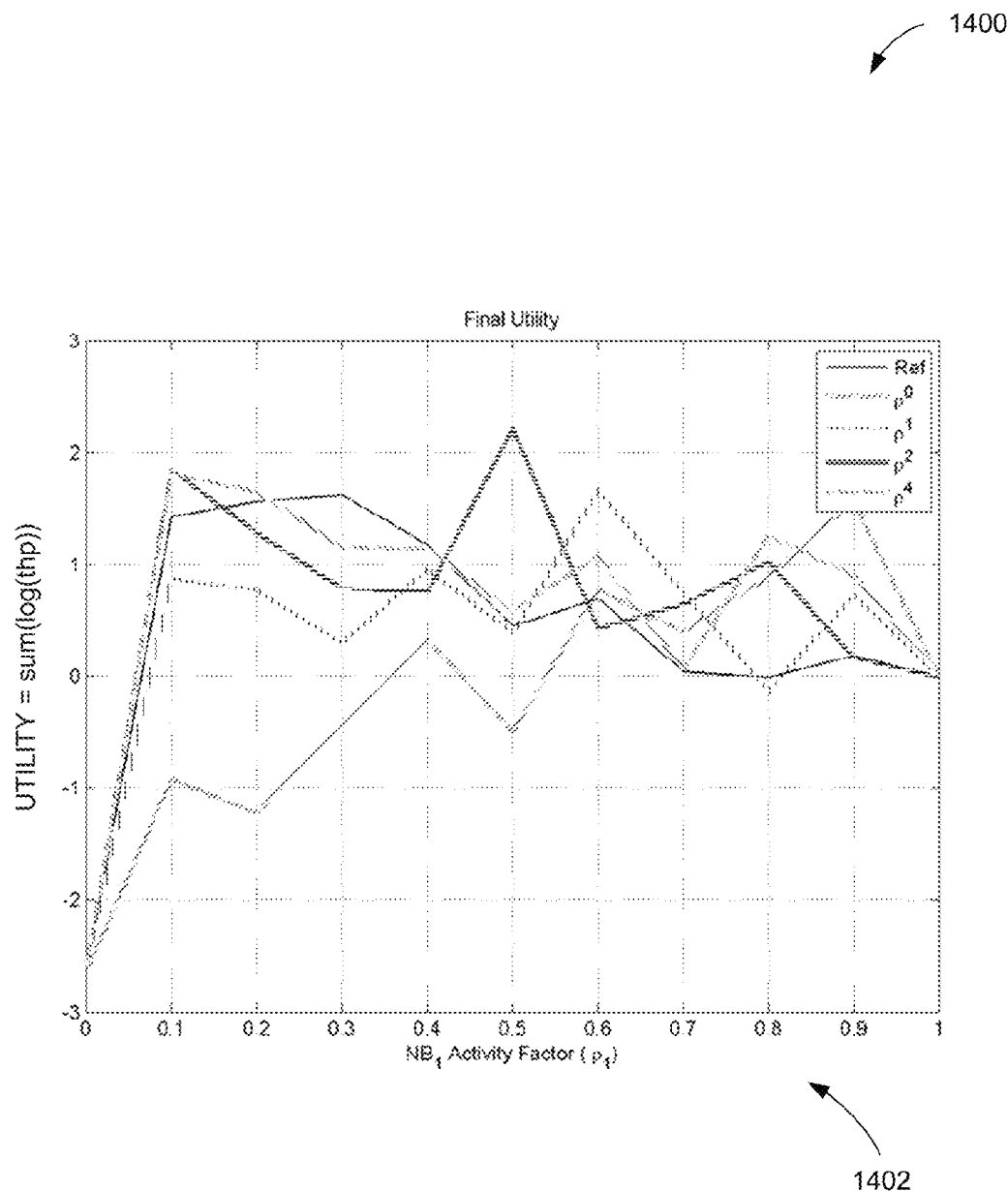
FIG. 14 illustrates a plot of utilities of reference, deterministic, and stochastic CPS, in accordance with one embodiment.

With respect to a generalized approach, Equation 48 may be modified as follows:

$$\overline{D}_{jk} = \frac{D_j}{\rho^p} \qquad \text{Equation 51}$$

where p>0 can be any positive value. In one embodiment, a range of values of 0<p<5 may be considered. Different values of p may make the algorithm more or less aggressive, as shown in FIG. 12. These different levels of aggression may result in different utility plots over time, as shown in FIG. 13. Additionally, as shown in FIG. 14, overall final utility between the reference, deterministic (p=0) CPS and stochastic (p>0) CPS values may be compared for different activity factors $\rho_1$. As shown, the stochastic CPS may improve the result. However, the perceived throughput of the stochastic CPS UE1 may still be lower than the reference UE1.

FIG. 12 illustrates a plot 1200 of scalings of Djk, in accordance with one embodiment. As an option, the plot 1200 may reflect an operation of any one or more of the embodiments set forth in any previous and/or subsequent figure(s) and/or description thereof. However, it is to be appreciated that the plot 1200 may reflect an operation of any desired environment.

As shown, a plot of different scalings of Djk 1202 is displayed for different values of 0<p<5.

FIG. 13 illustrates a plot 1300 of utilities, in accordance with one embodiment. As an option, the plot 1300 may reflect an operation of any one or more of the embodiments set forth in any previous and/or subsequent figure(s) and/or description thereof. However, it is to be appreciated that the plot 1300 may reflect an operation of any desired environment.

As shown, a plot of utilities 1302 is displayed for different values of $0 \geq p \geq 4$ In one embodiment, p=0 may be considered the deterministic CPS.

FIG. 14 illustrates a plot 1400 of utilities of reference, deterministic, and stochastic CPS, in accordance with one embodiment. As an option, the plot 1400 may reflect an operation of any one or more of the embodiments set forth in any previous and/or subsequent figure(s) and/or description thereof. However, it is to be appreciated that the plot 1400 may reflect an operation of any desired environment.

As shown, a plot of utilities 1402 is displayed for reference vs. deterministic (p=0) vs. stochastic (p>0) CPS with varying activity factor $\rho_1$. Note that the three utilities are identical at zero and full load as expected. In one embodiment, stochastic CPS may be better than Deterministic CPS for $0<\rho_1<1$.

In various embodiments, the CPS algorithm may be modified (e.g. Equation 48) to accommodate bursty traffic. Equation 48 may further illustrate that $NB_k$ modifies its $D_j$ by its own historical activity factor $\rho_k$. Under the conditions where bursty NB is heavily penalized, stochastic CPS may improve network conditions compared to the deterministic CPS.

With respect to non full buffer (NFB) aspects, a variation of "Adaptive View" may be implemented via two configurable capabilities. For example, "DiscardSmallDataSwitch" may exclude small-data users (determined based on a threshold) from CPS virtual scheduling and gradient computation. Additionally, when all users are small-data users, a computed dL/dP may become zero resulting in gradual reduction of negative Djs sent to other NBs.

Further, a "PowerRecoverSwitch" may freeze NB power to full-power when no active users are present. However, this may not impact anything as such a NB may not transmit traffic in absence of active users. When used in conjunction with the "DiscardSmallDataSwitch", this may result in NB operating at full power when only small data users are present.

Additionally, "RBUsageSwitch" may adjust the reported Dj (e.g. based on Equation 48), in order to compensate for SINR fluctuations due to bursty interference. In one embodiment, "PowerRecoverSwitch" and "RBUsageSwitch" may be used together. The "AvgClusterRBUtilizationSwitch" may be a cluster wide modification of the "RBUsageSwitch" which may reset the power state to full power whenever the average cluster wide RB utilization drops below a certain threshold (e.g. 50%). Still yet, aggressive OLLA settings may be used to quickly recover from inaccuracy caused by extreme SINR fluctuations.

Figure 15:
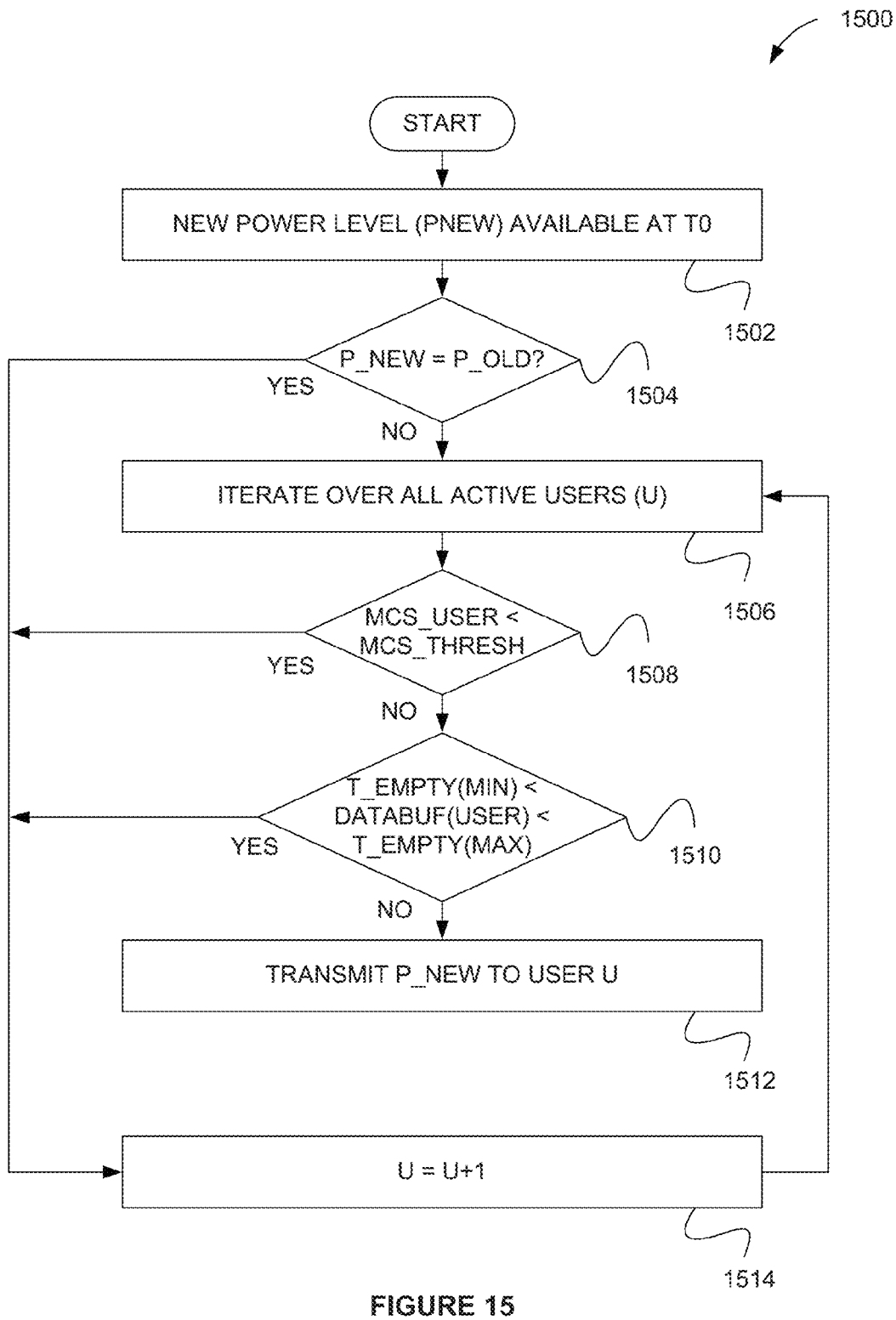
FIG. 15 illustrates a method for signaling a power update to users, in accordance with one embodiment.

FIG. 15 illustrates a method 1500 for signaling a power update to users, in accordance with one embodiment. As an option, the method 1500 may be implemented in the context of any one or more of the embodiments set forth in any previous and/or subsequent figure(s) and/or description thereof. However, it is to be appreciated that the method 1500 may be implemented in the context of any desired environment.

As shown, the method 1500 begins at operation 1502 with a new power level ($P_{new}$) available at $T_0$. It is determined, in decision 1504, whether $P_{new}$ is equal to $P_{old}$. If $P_{new}$ does not equal $P_{old}$, then $P_{new}$ is iterated over all active users (U). See operation 1506. If $P_{new}$ does equal $P_{old}$, then in operation 1514, U=U+1.

After iterating over all active users (U) in operation 1506, it is determined in decision 1508 whether MCS_user<MCS_thresh. If MCS_user is not less than MCS_thres, then it is determined in decision 1510 whether T_Empty(min)<Databuf (user)<T_empty(max). If T_Empty (min)<Databuf (user)<T_empty(max) is not valid, then the $P_{new}$ is transmitted to user U in operation 1512.

If MCS_user<MCS_thresh is valid (decision 1508) and/or if T_Empty(min)<Databuf (user)<T_empty(max) is valid (decision 1510), then in operation 1514, U=U+1. After adding on one additional user (operation 1514), the results are fed back to operation 1506 where the $P_{new}$ is iterated over all active users (U).

One possible problem that may be solved by one embodiment relates to power coordination for LTE and more specifically for the downlink shared data channel (PDSCH). In one embodiment, two eNBs may each serve two UEs on two sub-bands in a symmetric configuration. In such an embodiment, an optimal algorithm can seamlessly move between a frequency reuse of one (1) when all the UEs are at the cell center, to a frequency reuse of ½ when all the UE's are at the cell edge. In one embodiment, there may be no gains from coordination when the UEs are at the cell center, while the gains may be very large (more than 600%) when all the UEs are at the cell edge.

A variety of algorithms may be used to overcome such potential problems. For example, a first algorithm may follow a more conventional greedy-primal-dual optimization approach and may assume that all required information would be available to each eNB to make optimal decisions. However, the problem may be separable, and the information required to be exchanged may not be that much. In contrast, a conventional Primal Dual optimization on both the network state and the power vector may assist in reaching a provable optimal solution. Such an algorithm may be ideal for anycentralized Cloud-RAN (C-RAN) platform, or for a single vendor cluster that supports proprietary signaling on the X2 interface. In various embodiment, such an algorithm may be referred to as the Coordinated Power Switching (CPS) algorithm.

A second algorithm may not require explicit inter-eNB communication but the coordination may be implicit in the CQI feedback as reported by the UEs. This algorithm may be heuristic based and may seek to achieve an inter-eNB "fairness" where each eNB may need to "justify" (to itself), in terms of utility increase, each time it increases the power on a sub-band. Due to a maximum power constraint, however, any increase in power on one sub-band may inevitably lead to a reduction in power on another. This may lead to an effect where each eNB effectively chooses a number of desired sub-bands for cell edge traffic while leaving the rest for cell center traffic. Such an algorithm may be referred to as the Independent Power Switching (IPS) algorithm.

A third algorithm may revisit the CPS algorithm considering the presence of a centralized eCoordinator™. Since this is a centralized approach, effects on stability and convergence time may be minimized, since a single global scheduler may use techniques (e.g. such as a line search or a bi-section search method) to search for global optimum directly. Also, since it assumes that only slowly changing RSRP values will be available at the eCoordinator™, it may only need to update power levels when the user distribution changes significantly. However, due to the absence of CQI and buffer status reports, it may not be capable of tracking fast fading.

In one embodiment, the Coordinated Power Switching (CPS) algorithm may be derived, which may optimize power settings on all eNBs by directly maximizing the cluster wide utility measure.

With respect to deriving the algorithm, a cluster of eNBs may serve a UE population $\{1 \ldots i \ldots I\}$, where the $i^{th}$ UE may experience an average rate of $X_i$, and $X=\{X_1 \ldots X_I\}$ may be the vector of all average rates. The $k^{th}$ eNB may serve a unique UE population defined by the set $I(k)$. A single global scheduler may maximize a Utility function $U(X)$. With such constraints, a proportional fair algorithm may be as follows:

$$U(X) = \sum_i U_i = \sum_i \log(X_i). \qquad \text{Equation 52}$$

In one embodiment, each $\text{eNB}_k$ may try to find an optimum power value of $P_{jk}$, and $\Sigma_j P_{jk} \leq P_{max}$, on the $0 < j^{th} \leq J$ sub-band where $P_{max}$ may be the maximum power available to the power amplifier. The average user rate may be demonstrated by the Shannon capacity formula:

$$X_i = \sum_{j=1}^{J} \phi_{ij} \log_2(1 + SINR_{ij}), \text{ where } 0 \leq \phi_{ij} \leq 1 \qquad \text{Equation 53}$$

which may represent the probability that a user i will be scheduled in sub-band j. The slowfading $SINR_{ij}$ of the $i^{th}$ UE on the $j^{th}$ sub-band may be defined as follows:

$$SINR_{ij} = \frac{G_{im} P_{jm}}{N_0 + \sum_{k \neq m} G_{ik} P_{jk}}, \forall i \in I(m), \forall m \qquad \text{Equation 54}$$

where $P_{jm}$ may be the power of the serving $\text{eNB}_m$ and $P_{jk}$ may be the powers of the interfering eNBs, and $G_{ik}$ may represent the $i^{th}$ UE's slowfade path gain to $\text{eNB}_k$. As such, the optimization problem may then be formulated as follows:

$$\text{maximize} \quad U(X) \qquad \text{Equation 55}$$

$$\text{subject to} \quad \sum_j P_{jk} \leq P_{max}, \forall k$$

$$\sum_{l \in I(k)} \phi_{lj} \leq 1, \forall j, k$$

where the sum over $l \in I(k)$ may represent a summation over all UEs connected to $\text{eNB}_k$. The Lagrangian equivalent may be represented as follows:

$$L(P, \phi, \lambda, \mu) = \sum_i U_i(X_i) - \qquad \text{Equation 56}$$

$$\sum_k \sum_j \mu_{jk} \left( \sum_{l \in I(k)} \phi_{lj} - 1 \right) - \sum_k \lambda_k \sum_j (P_{jk} - P_{max}).$$

With respect to the gradients, the following may be used:

$$\frac{\partial L}{\partial P_{jk}} = \frac{1}{\log(2)} \sum_i \frac{\partial U_i}{\partial X_i} \frac{\phi_{ij} C_{ijk}}{(1 + SINR_{ij})} - \lambda_k \qquad \text{Equation 57}$$

$$\frac{\partial L}{\partial \phi_{ij}} = \frac{\partial U_i}{\partial X_i} \log_2(1 + SINR_{ij}) - \mu_{jk} \qquad \text{Equation 58}$$

$$\frac{\partial L}{\partial \mu_{jk}} = \sum_{l \in I(k)} \phi_{lj} - 1 \qquad \text{Equation 59}$$

$$\frac{\partial L}{\partial \lambda_k} = \sum_j P_{jk} - P_{max} \qquad \text{Equation 60}$$

where $$C_{ijk} = \begin{cases} +\dfrac{SINR_{ij}}{P_{jm}} & \forall i \in I(m), k = m \\[2mm] -\dfrac{SINR_{ij}^2}{P_{jm}} \dfrac{G_{im}}{G_{ik}} & \forall k \neq m \end{cases} \qquad \text{Equation 61}$$

In one embodiment, the summation over i in Equation 57 may be the summation over all the $UE_i s$ in a cluster.

Additionally, these calculations may be separable and may be only necessary for an eNB to calculate this value for its own connected UEs, since the rest of the information may get exchanged. Using the steepest descent approach, the equations may be updated as follows:

$$P_{jk}(t+1) = P_{jk}(t) + \beta \frac{\partial L}{\partial P_{jk}} \quad \text{Equation 62}$$

$$\phi_{ij}(t+1) = \phi_{ij}(t) + \beta \frac{\partial L}{\partial \phi_{ij}} \quad \text{Equation 63}$$

$$\lambda_k(t+1) = \lambda_k(t) - \beta \frac{\partial L}{\partial \lambda_k} \quad \text{Equation 64}$$

$$\mu_{jk}(t+1) = \mu_{jk}(t) - \beta \frac{\partial L}{\partial \mu_{jk}} \quad \text{Equation 65}$$

where each variable may be projected back onto its own feasible set. The projection method for $\phi_{ij}$ may be the projection on the intersection of a hyperplane and a rectangle (i.e. first a clipping, and then a normalization).

In one embodiment, when each eNB acts autonomously, and no explicit inter-eNB information is exchanged, the slowfading $SINR_{ij}$ may be represented as the product of the Interference to Noise Ratio ($INR_{ij}$) and the power, as follows:

$$SINR_{ij} = INR_{ij} \cdot P_j \quad \text{Equation 66:}$$

which may lead to a value of:

$$C_{ijk} = \begin{cases} \frac{SINR_{ij}}{P_{jm}} & \forall i \in I(m), k = m \\ 0 & \forall k \neq m \end{cases} \quad \text{Equation 67}$$

The summation over i in Equation 57 may now be effectively the summation over only the UEs connected to this $eNB_k$. In comparing Equation 67 to CPS, the second term of $C_{ijk}$ may be one of the main differences. Additionally, the $$\frac{\partial L}{\partial P_{jk}}$$

may be positive while for the CPS it could be both positive and negative.

In one embodiment, such an algorithm may only allow for increasing the power (not decreasing), while the CPS algorithm may be capable of doing both. Therefore, this (no information exchange) algorithm may simply move to the no-coordination case of using maximum power on all sub-bands. In one embodiment, such an algorithm may work because it assumes a symmetrical system and the initial power vectors are biased to point the algorithm in the right direction.

Additionally, all the variables above may decouple according to k such that the subscript k can be dropped and each calculation can occur per eNB. The only exception is for the calculation of the $$\frac{\partial L}{\partial P_{jk}}$$

term that may need to be exchanged among eNBs. In one embodiment, the present algorithm may be split between a fast scheduling iteration, an inter-NB information exchange, and/or a slow power update.

With respect to the primal dual update in Equation 63, it may work well for small problems, but in general it may tend to be not very stable, since the search domain size (e.g. NumUEs×NumSubBands, etc.) can be quite large. Instead, each $eNB_k$ may run a Proportional Fair scheduler virtually in order to calculate $\phi_{ij}$. The scheduler may maximize the given Utility function by selecting the $i^{th}$ UE in subframe j that would maximize the following:

$$\hat{i} = \max_i \{\nabla U_X \cdot r_j(i)\} \quad \text{Equation 68}$$

where $r_j(i)$ may be the "commodity amount generated" or instantaneous rate improvement, in sub-band j, if the $\hat{i}^{th}$ UE is selected. Since both X and $r_j(i)$ may be measured in bps/Hz, the "rate" may be proportional to spectral efficiency. Then each eNB may update Equation 57 where:

$$\phi_{ij} = \begin{cases} 1 & i = \hat{i} \\ 0 & i \neq \hat{i} \end{cases} \quad \text{Equation 69}$$

which may lead to:

$$\frac{\partial L}{\partial P_{jk}} = \frac{1}{\log(2)} \frac{\partial U_{\hat{i}}}{\partial X_{\hat{i}}} \frac{C_{\hat{i}jk}}{(1 + SINR_{\hat{i}j})}, \forall k, j \quad \text{Equation 70}$$

and this value may be averaged before it gets exchanged among eNBs, as follows:

$$\overline{\frac{\partial L}{\partial P_{jk}}} = \overline{\frac{\partial L}{\partial P_{jk}}}(1-\beta) + \beta \frac{\partial L}{\partial P_{jk}}, \forall k, j. \quad \text{Equation 71}$$

In one embodiment, Equation 73 may not represent a pure averaging of $$\frac{\partial L}{\partial P_{jk}},$$

but rather a conjugate gradient update. It may be noted that each eNB may need to calculate the effect that every other eNBs' Power $$\frac{\partial L}{\partial P_{jk}}$$

(including itself) has on the currently scheduled $\hat{i}^{th}$ UE. Therefore, $$\frac{\partial L}{\partial P_{jk}}$$

and subsequently $$\frac{\overline{\partial L}}{\partial P_{jk}}$$

as calculated by the $m^{th}$ eNB may be a matrix of size J×K, when there are K eNBs in the cluster.

In one embodiment, the total size of the information exchanged may be an array of size J×K×K, namely $$\frac{\overline{\partial L}}{\partial P_{jk}}(n),$$

where n=1 ... K. In another embodiment, an additional array may be approximately J×K×4, and its value may change slowly over time. The $m^{th}$ eNB may be calculated as follows:

$$\frac{\hat{\partial} L}{\partial P_{jm}} = \sum_{n=1}^{K} \frac{\overline{\partial L}}{\partial P_{jm}}(n) \qquad \text{Equation 72}$$

In one embodiment, Equation 72 may be used to update the power vector.

With respect to a slow power update (which may be more stable), a simplified algorithm may update the power vector by fixed increments:

$$P_{jm}(t+1) = P_{jm}(t) + \text{sign}\left(\frac{\hat{\partial} L}{\partial P_{jm}}\right)\delta. \qquad \text{Equation 73}$$

In various embodiments, such coordination algorithms may rely on CQI reports that may track the changes in both serving power levels as well as changes in interference power levels. Additionally, in one embodiment, an "intelligent" eNB may not only rely on a CQI report to perform MCS (Modulation and Coding Selection), but additionally may monitor the HARQ retransmission rate in order to maintain a IBLER (Initial Block Error Rate) of about 10%.

The eNB may adjust the reported CQI based on it own known different power setting. Therefore if the eNB can rely on the fact that all eNBs in a cluster would respect the cyclic nature of the power control, it may assume that any UE SINR experience would follow a similar pattern.

Although this algorithm would primarily allocate different powers on different sub-bands, it may allocate powers over both subframes and sub-bands. For example, in the case where it schedules a particular UE in a particular sub-band of a subframe, it may estimate the actual subframe based SINR (based on the reported CQI and the IBLER statistics) and estimate the allocated power quite accurately given that the UE is moving slowly. It may also over time "scan" the subframes for a better subframe by scheduling the UE in another subframe and then monitoring the IBLER statistics.

Figure 16:
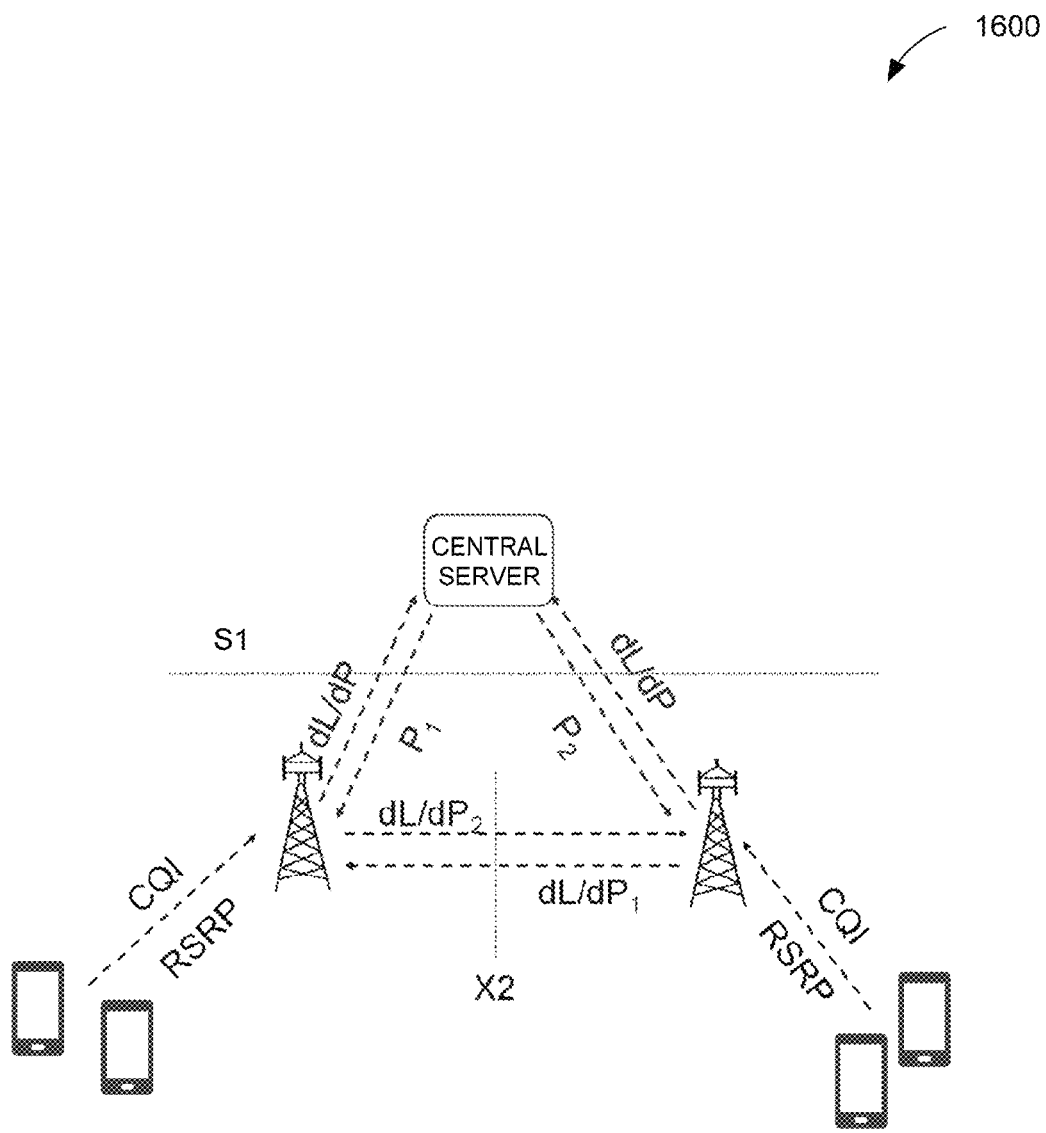
FIG. 16 illustrates a CPS information exchange, in accordance with one embodiment.

FIG. 16 illustrates a CPS information exchange 1600, in accordance with one embodiment. As an option, the CPS information exchange 1600 may be implemented in the context of any one or more of the embodiments set forth in any previous and/or subsequent figure(s) and/or description thereof. However, it is to be appreciated that the CPS information exchange 1600 may be implemented in the context of any desired environment.

As shown in CPS information exchange 1600, power coordination for CPS algorithm may include how the information may be exchanged between eNBs, including using the existing X2 interface between eNBs, and/or a "S1" interface between an eNBs and a central server. Both methods are shown in CPS information exchange 1600 and require a standards change. However, it may be possible to use proprietary signaling on the X2 interface if all the eNBs in the cluster are from the same vendor.

Figure 17:
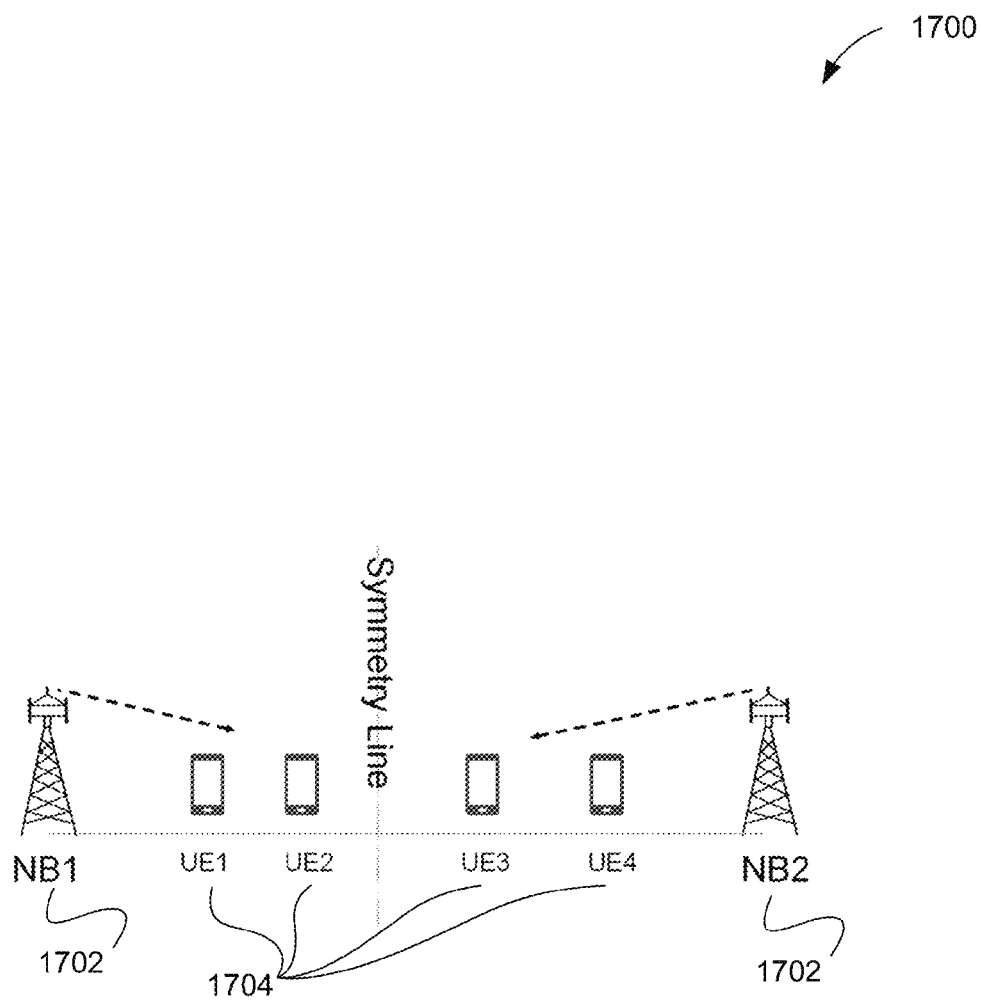
FIG. 17 illustrates a layout of a two cell node simulation, in accordance with one embodiment.

FIG. 17 illustrates a layout of two cell node simulation 1700, in accordance with one embodiment. As an option, the layout of two cell node simulation 1700 may be implemented in the context of any one or more of the embodiments set forth in any previous and/or subsequent figure(s) and/or description thereof. However, it is to be appreciated that the layout of two cell node simulation 1700 may be implemented in the context of any desired environment.

In one embodiment, the performance of the CPS algorithm may be evaluated where the optimal results are well known. For example, a one dimensional two eNB scenario may be simulated (as shown in layout of two cell node simulation 1700) where the two eNBs 1702 face each other directly, separated by a 2 km site to site distance, resulting in a 1 km coverage range for each eNB. The four UEs 1704 (two per eNB) may move along the single radial dimension between the two eNBs 1702. In one embodiment, the scenario may be completely symmetric in that UE1 may be the same distance from its serving eNB (eNB 1) as UE4 is from eNB2, and similarly for UE's 2 & 3. The UE positions (in meters away from their serving eNB) may be represented as follows:

$$\begin{bmatrix} Indx \\ UE_{1,4} \\ UE_{2,3} \end{bmatrix} = \begin{bmatrix} 1 & 2 & 3 & 4 & 5 & 6 & 7 & 8 & 9 & 10 & 11 \\ 50 & 50 & 50 & 50 & 50 & 50 & 100 & 250 & 500 & 750 & 950 \\ 50 & 100 & 250 & 500 & 750 & 950 & 950 & 950 & 950 & 950 & 950 \end{bmatrix} \qquad \text{Equation 74}$$

In one embodiment, each eNB may include two sub-bands (or more) which may be individually labeled.

Figure 18:
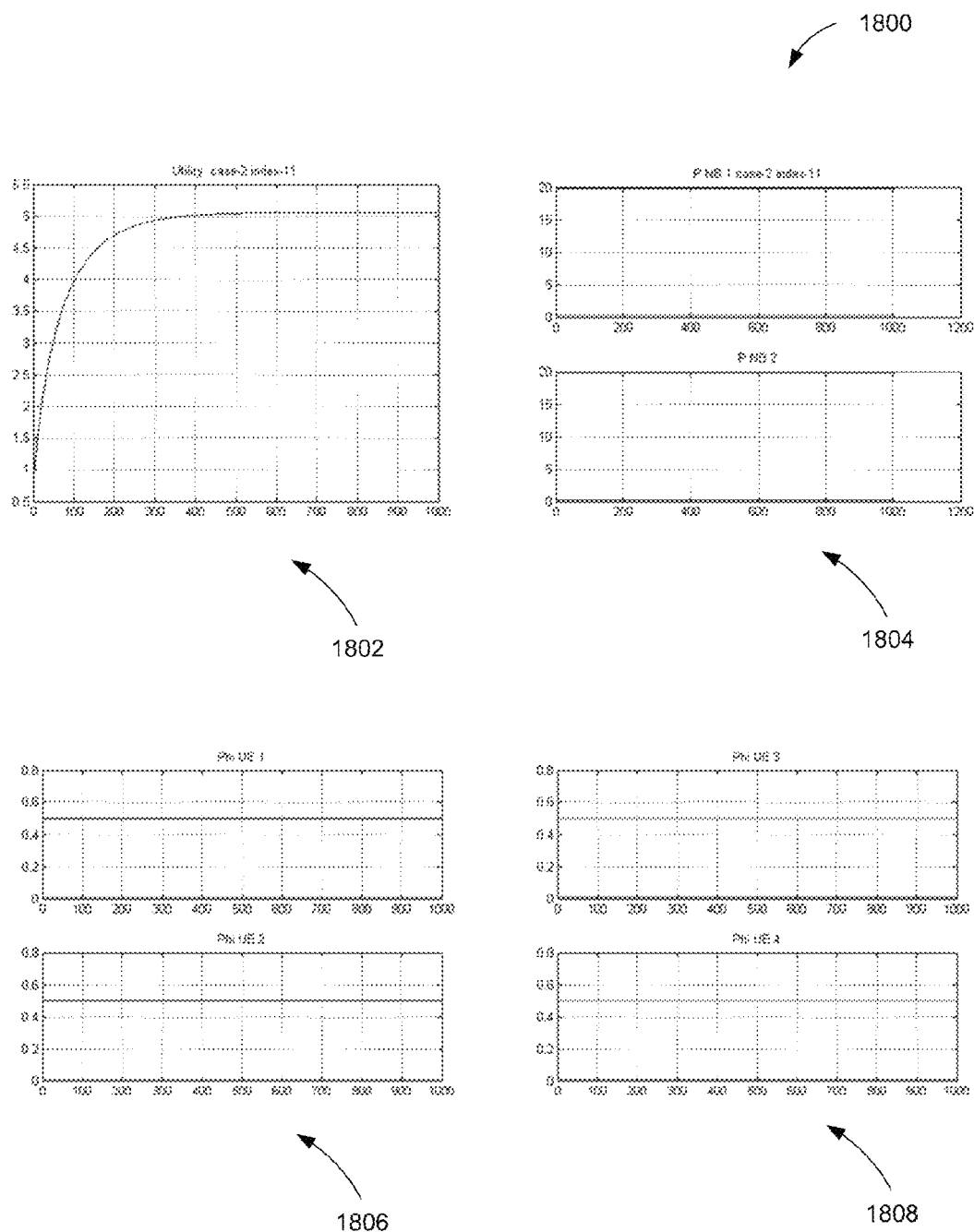
FIG. 18 illustrates result plots for a CPS method, in accordance with one embodiment.

FIG. 18 illustrates result plots 1800 for the CPS method, in accordance with one embodiment. As an option, the result plots 1800 may reflect an operation of any one or more of the embodiments set forth in any previous and/or subsequent figure(s) and/or description thereof. However, it is to be appreciated that the result plots 1800 may reflect an operation of any desired environment.

In one embodiment, sample intermediate may results for the CPS algorithm when the Indx=11 in Equation 74 scenario may be simulated (i.e. all UEs are cell edge UEs). As shown, the values of the utility 1802 and $P_j$ 1804 over time may be for the CPS method. In view of such, system wide utility may increase with time, and eNB1 may use full power on a first sub-band (represented at the top of the plot) and may switch off the power completely on a second sub-band (represented at the bottom of the plot). In the case for eNB 2, the first sub-band is switched off and the second sub-band may be shown with full power. In one embodiment, this may represent a frequency reuse scheme of half of the eNBs which may provide the optimal result. Further, as shown, the values of $\phi_{ij}$ 1806 and 1808 may include eNB 1 UEs (1 & 2) 1806 probability for scheduling may be one (1) on the first sub-band and zero (0) on the second sub-band, while for eNB two (2) UEs 1808 the probability for scheduling may be one (1) on the second sub-band and zero (0) on the first sub-band.

Figure 19:
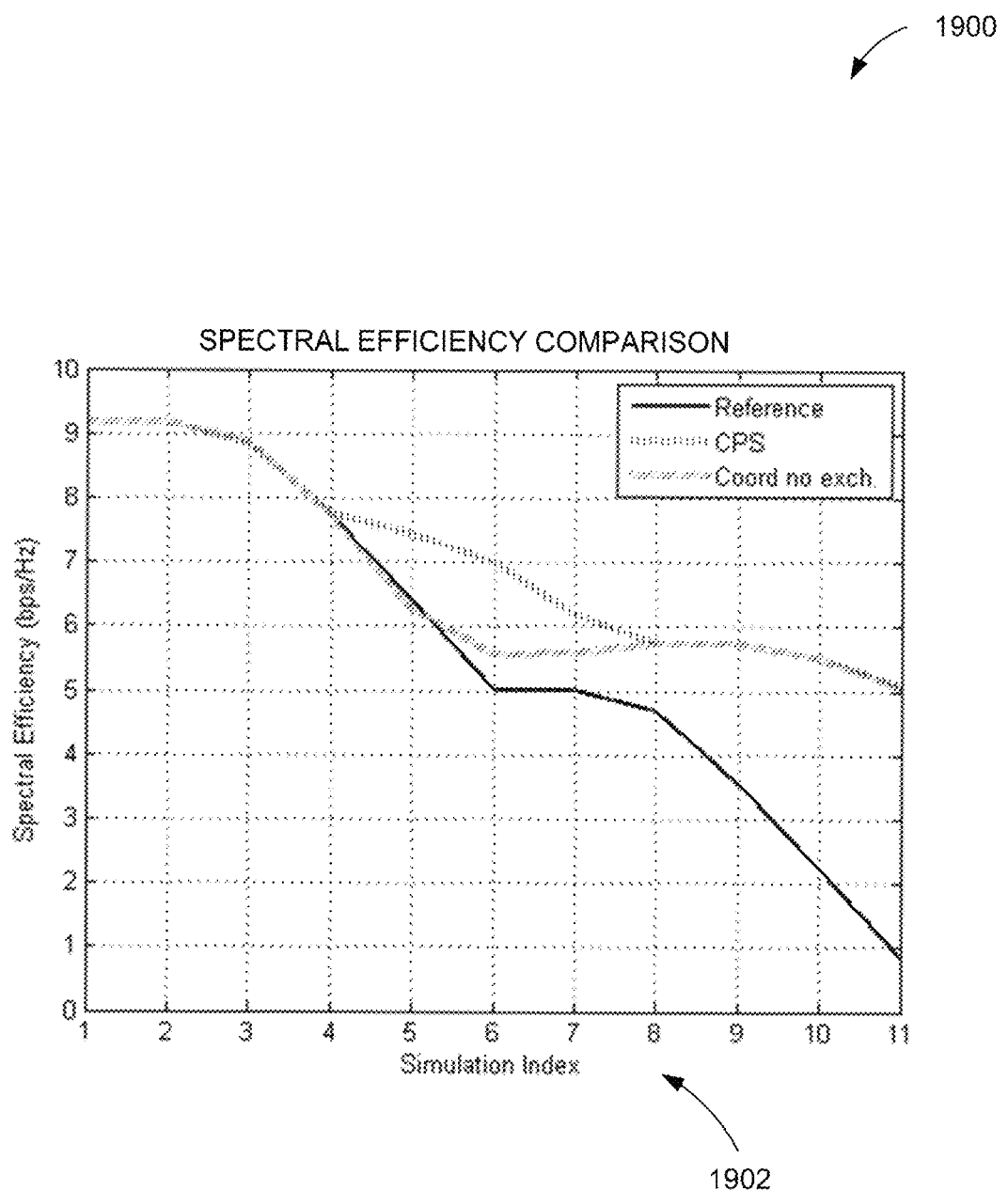
FIG. 19 illustrates capacity results for a CPS method, in accordance with one embodiment.

FIG. 19 illustrates capacity results 1900 for a CPS method, in accordance with one embodiment. As an option, the capacity results 1900 may reflect an operation of any one or more of the embodiments set forth in any previous and/or subsequent figure(s) and/or description thereof. However, it is to be appreciated that the capacity results 1900 may reflect an operation of any desired environment.

As shown, final capacity results 1902 may include results for three different methods: reference (no coordination), power control method without information exchange as defined by Equation 67, and CPS (power control with full information $$\left(\frac{dL}{dP}\right)$$

exchange). The x-axis (simulation index) may be specified as indicated in Equation 74. Additionally, final capacity results 1902 may show that the value of the information exchange (the difference between CPS and Coordination without information exchange) may be primarily in cases 5 to 7, or according to the following UE positions:

$$\begin{bmatrix} UE_{1,3} \\ UE_{2,4} \end{bmatrix} = \begin{bmatrix} 50 & 50 & 100 \\ 750 & 950 & 950 \end{bmatrix}.$$  Equation 75

Additionally, final capacity results 1902 indicate that there may be no gain from power coordination if all UEs are at the cell center, and most gain (almost 500%) if all UE's are at the cell edge.

Figure 20:
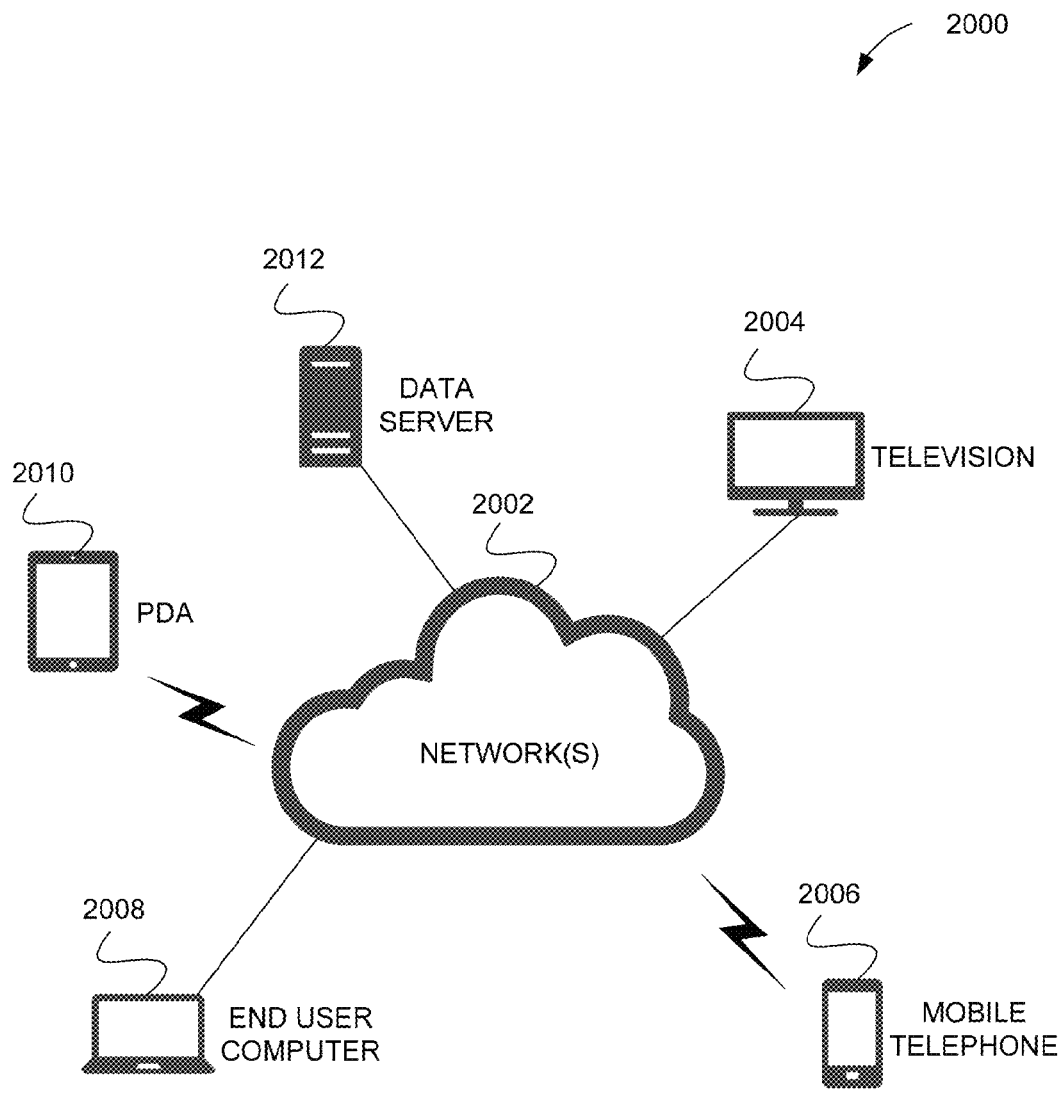
FIG. 20 illustrates a network architecture, in accordance with one embodiment.

FIG. 20 illustrates a network architecture 2000, in accordance with one embodiment. As shown, at least one network 2002 is provided. In the context of the present network architecture 2000, the network 2002 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 2002 may be provided.

Coupled to the network 2002 is a plurality of devices. For example, a server computer 2012 and an end user computer 2008 may be coupled to the network 2002 for communication purposes. Such end user computer 2008 may include a desktop computer, lap-top computer, and/or any other type of logic. Still yet, various other devices may be coupled to the network 2002 including a personal digital assistant (PDA) device 2010, a mobile phone device 2006, a television 2004, etc.

Figure 21:
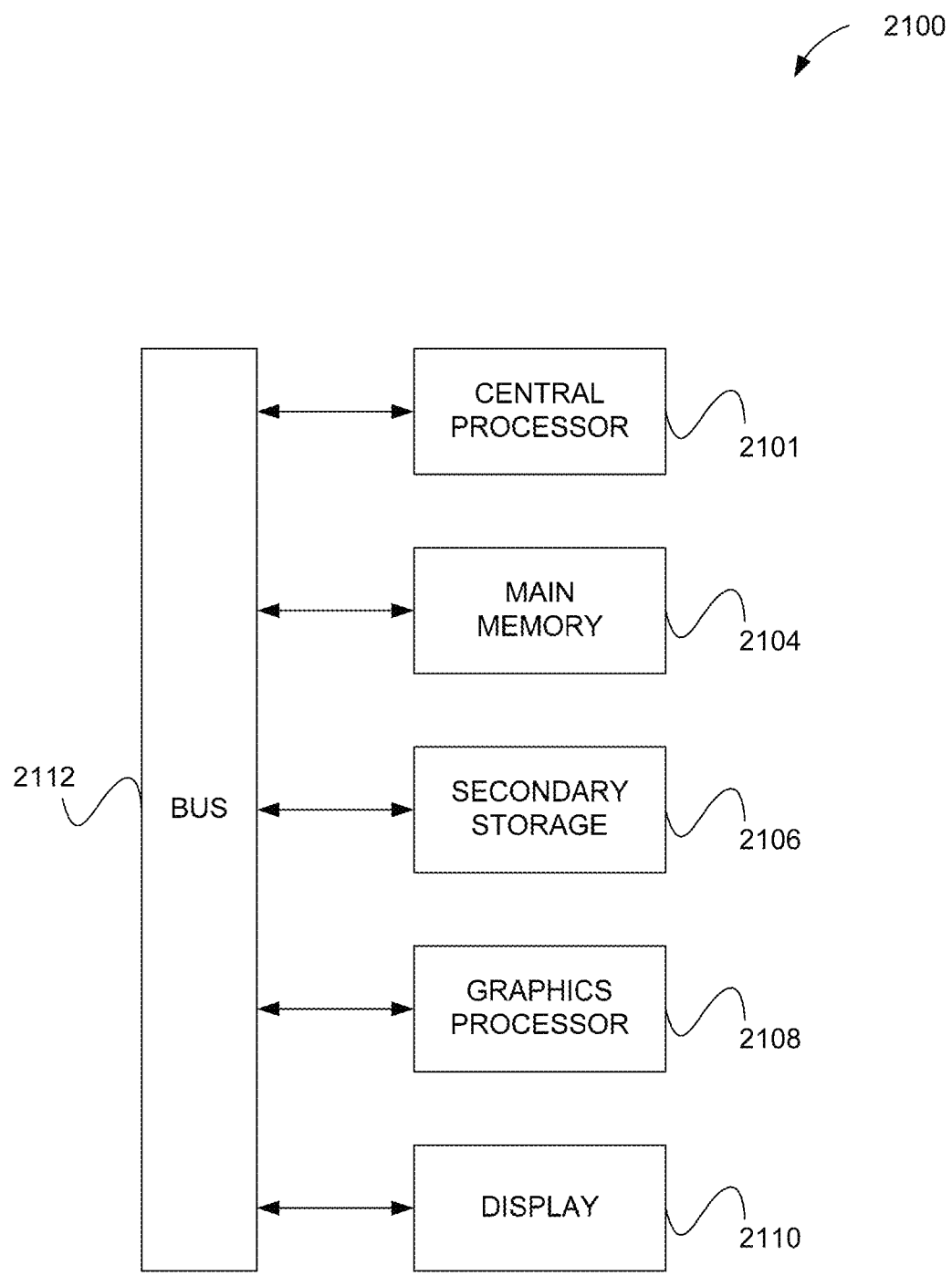
FIG. 21 illustrates an exemplary system, in accordance with one embodiment.

FIG. 21 illustrates an exemplary system 2100, in accordance with one embodiment. As an option, the system 2100 may be implemented in the context of any of the devices of the network architecture 2000 of FIG. 20. However, it is to be appreciated that the system 2100 may be implemented in any desired environment.

As shown, a system 2100 is provided including at least one central processor 2102 which is connected to a bus 2112. The system 2100 also includes main memory 2104 [e.g., hard disk drive, solid state drive, random access memory (RAM), etc.]. The system 2100 also includes a graphics processor 2108 and a display 2110.

The system 2100 may also include a secondary storage 2106. The secondary storage 2106 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 2104, the secondary storage 2106, and/or any other memory, for that matter. Such computer programs, when executed, enable the system 2100 to perform various functions (as set forth above, for example). Memory 2104, secondary storage 2106 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method performed by a multiple-input-multiple-output (MIMO)-capable cell node in a network configured for communicating with a plurality of MIMO-capable user equipment, comprising:
setting a transmission power level of the MIMO-capable cell node, by:
generating cell node gradient information based on a multiple-codeword channel quality indicator (CQI),
receiving other cell node gradient information generated for a plurality of other MIMO-capable cell nodes,
processing the generated cell node gradient information and the other cell node gradient information to determine an impact of a current transmission power level of the MIMO-capable cell node on an overall effectiveness of the MIMO-capable cell node and the plurality of other MIMO-capable cell nodes in communicating data with the plurality of MIMO-capable user equipment, and
setting the transmission power level of the MIMO-capable cell node based on the determined impact, for improving the overall effectiveness of the MIMO-capable cell node and the plurality of other MIMO-capable cell nodes in communicating data with the plurality of MIMO-capable user equipment; and adjusting a rate at which the transmission power level of the MIMO-capable cell node is set.

2. The method of claim 1, wherein the generated cell node gradient information is generated utilizing fading information that is measured utilizing at least one of the plurality of MIMO-capable user equipment.

3. The method of claim 1, and further comprising adjusting the generated cell node gradient information.

4. The method of claim 3, wherein the generated cell node gradient information is adjusted if the generated cell node gradient information exceeds a predetermined threshold.

5. The method of claim 3, wherein the generated cell node gradient information is adjusted if the generated cell node gradient information exceeds a predetermined negative threshold.

6. The method of claim 3, wherein the generated cell node gradient information is adjusted utilizing a factor.

7. The method of claim 6, wherein the factor involves at least one of: a power utilization factor, a factor that distinguishes a higher power cell node from a lower power cell node, a fairness factor, or an activity factor.

8. The method of claim 1, wherein the other cell node gradient information is received, utilizing a backhaul communication between the MIMO-capable cell node and the other MIMO-capable cell nodes.

9. The method of claim 1, wherein the other cell node gradient information is received from a centralized system that received the other cell node gradient information from the other MIMO-capable cell nodes.

10. The method of claim 1, and further comprising identifying a busyness of the MIMO-capable cell node.

11. The method of claim 10, wherein the rate at which the transmission power level of the MIMO-capable cell node is set is accelerated based on the busyness of the MIMO-capable cell node.

12. The method of claim 1, wherein the network includes at least one of a long term evolution (LTE) network, an LTE-Advanced network, or an advanced permutation of an LTE network.

13. The method of claim 1, wherein the network operates utilizing a frequency division duplex (FDD) protocol.

14. The method of claim 1, wherein at least one of the processing or the setting is conditionally performed based on a presence of bursty traffic.

15. The method of claim 14, wherein the MIMO-capable cell node freezes at least one state based on the presence of the bursty traffic.

16. The method of claim 1, wherein adjusting the rate at which the transmission power level of the MIMO-capable cell node is set includes increasing the rate at which the transmission power level of the MIMO-capable cell node is set.

17. The method of claim 1, wherein adjusting the rate at which the transmission power level of the MIMO-capable cell node is set includes freezing a power state of the MIMO-capable cell node.

18. A computer readable media comprising computer executable instructions stored on a non-transitory computer readable medium that, when executed by one or more processors of a multiple-input-multiple-output (MIMO)-capable cell node in a network configured for communicating with a plurality of MIMO-capable user equipment, prompt the one or more processors to control the MIMO-capable cell node, so that the MIMO-capable cell node:

sets a transmission power level of the MIMO-capable cell node, by:

generating cell node gradient information based on a multiple-codeword channel quality indicator (CQI), receiving other cell node gradient information generated for a plurality of other MIMO-capable cell nodes, processing the generated cell node gradient information and the other cell node gradient information to determine an impact of a current transmission power level of the MIMO-capable cell node on an overall effectiveness of the MIMO-capable cell node and the plurality of other MIMO-capable cell nodes in communicating data with the plurality of MIMO-capable user equipment, and setting the transmission power level of the MIMO-capable cell node, based on the determined impact, for improving the overall effectiveness of the MIMO-capable cell node and the plurality of other MIMO-capable cell nodes in communicating data with the plurality of MIMO-capable user equipment; and adjusts a rate at which the transmission power level of the MIMO-capable cell node is set.

19. The computer readable media of claim 18, wherein the computer executable instructions prompt the one or more processors to cause the MIMO-capable cell node to freeze at least one state based on a presence of bursty traffic.

20. The computer readable media of claim 18, wherein the computer executable instructions prompt the one or more processors to cause the MIMO-capable cell node to generate the cell node gradient information utilizing fading information including at least one of a wideband channel indicator (CQI) or per MIMO layer information.

21. An apparatus, comprising:

a multiple-input-multiple-output (MIMO)-capable cell node operable for communicating with a plurality of MIMO-capable user equipment in a network, the MIMO-capable cell node configured to:

set a transmission power level of the MIMO-capable cell node, by:

generating cell node gradient information based on a multiple-codeword channel quality indicator (CQI), receiving other cell node gradient information generated for a plurality of other MIMO-capable cell nodes, processing the generated cell node gradient information and the other cell node gradient information to determine an impact of a current transmission power level of the MIMO-capable cell node on an overall effectiveness of the MIMO-capable cell node and the plurality of other MIMO-capable cell nodes in communicating data with the plurality of MIMO-capable user equipment, and setting the transmission power level of the MIMO-capable cell node based on the determined impact, for improving the overall effectiveness of the MIMO-capable cell node and the plurality of other MIMO-capable cell nodes in communicating data with the plurality of MIMO-capable user equipment; and adjust a rate at which the transmission power level of the MIMO-capable cell node is set.

22. The apparatus of claim 21, wherein the MIMO-capable cell node is further configured to freeze at least one state based on a presence of bursty traffic.

23. The apparatus of claim 21, wherein the MIMO-capable cell node is further configured to generate the cell node gradient information utilizing fading information including at least one of a wideband channel indicator (CQI) or per MIMO layer information.

24. The apparatus of claim 21, wherein the MIMO-capable cell node is further configured to generate the cell node gradient information independent of data packets based on a size thereof.

25. The apparatus of claim 21, wherein the MIMO-capable cell node is further configured to reset a cell node power if at least one of a load or a utilization drops below a threshold.

26. The apparatus of claim 21, wherein the MIMO-capable cell node is further configured to inform at least one of the plurality of MIMO-capable user equipment of a new power level when one or more criteria is met.

27. The apparatus of claim 26, wherein at least one of the one or more criteria involves a buffer of the at least one of the plurality of MIMO-capable user equipment not being empty.

28. The apparatus of claim 26, wherein at least one of the one or more criteria involves a modulation and coding scheme (MCS) level being above a threshold.

29. The apparatus of claim 26, wherein at least one of the one or more criteria involves the new power level being different than an old power level.

30. The apparatus of claim 21, wherein the MIMO-capable cell node is further configured to perform a combine operation in connection with the multiple-codeword CQI.

31. A system including the apparatus of claim 21, and further comprising: the plurality of other MIMO-capable cell nodes and the plurality of MIMO-capable user equipment.

* * * * *